United States Patent [19]

Whiteside et al.

[11] 4,356,546

[45] Oct. 26, 1982

[54] FAULT-TOLERANT MULTI-COMPUTER SYSTEM

[75] Inventors: Arliss E. Whiteside, Royal Oak; Morris D. Freedman, Southfield; Alexander M. Rothschild, Ann Arbor, all of Mich.; Ömür Tasar, Harvard, Mass.

[73] Assignee: The Bendix Corporation, Southfield, Mich.

[21] Appl. No.: 118,692

[22] Filed: Feb. 5, 1980

[51] Int. Cl.³ .................... G06F 11/18; G06F 15/16
[52] U.S. Cl. .................................. 364/200; 371/36; 371/67
[58] Field of Search ............ 364/200 MS File; 371/9, 371/11, 67, 36

[56] References Cited

U.S. PATENT DOCUMENTS

| | | | |
|---|---|---|---|
| 3,343,135 | 9/1967 | Freiman et al. | 364/200 |
| 3,419,849 | 12/1968 | Anderson et al. | 364/200 |
| 3,815,095 | 6/1974 | Wester | 364/200 |
| 3,876,987 | 4/1975 | Dalton et al. | 364/200 |
| 3,905,023 | 9/1975 | Perpiglia | 364/200 |
| 3,921,141 | 11/1975 | Wilber et al. | 364/200 |
| 4,015,246 | 3/1977 | Hopkins, Jr. et al. | 364/200 |

OTHER PUBLICATIONS

Katsuki D., et al., "Pluribus-An Operational Fault-Tolerant Multiprocessor", Proc. of IEEE, vol. 66, No. 10, Oct. 1978, pp. 1146-1159.
Wensley J. H. et al., "SIFT: Design and Analysis of a Fault-Tolerant Computer for Aircraft Control", Proc. of IEEE, vol. 66, No. 10, Oct. 1978, pp. 1240-1255.

*Primary Examiner*—Mark E. Nusbaum
*Assistant Examiner*—Thomas M. Heckler
*Attorney, Agent, or Firm*—James R. Ignatowski; Russel C. Wells

[57] ABSTRACT

A Fault-Tolerant Multi-Computer System for control applications is disclosed. The system has a plurality of Computers (10a–10n), each having an assigned set of tasks which it is capable of executing. No one Computer in the system acts as a master and no one Computer executes all of the tasks. Communication between the Computers is by individual communication links (16, 18, 20) over which each Computer sends information directly to all other Computers in the system. Each Computer comprises an Applications Computer (100) and an Operations Controller (200). The Operations Controller receives messages over the communication links and selects, from the assigned tasks, the tasks to be performed by the associated Applications Computer. Each Operations Controller includes a fault handler which checks the messages received from the other Computers. The fault handlers send and receive error messages, over the communication links, to assist in the identification of a faulty Computer. Subsequent messages from the Computers deemed to be faulty are ignored, and the tasks assigned to the faulty Computer are executed by alternate Computers in the system.

52 Claims, 28 Drawing Figures

APPLICATIONS COMPUTER

OPERATIONS CONTROLLER

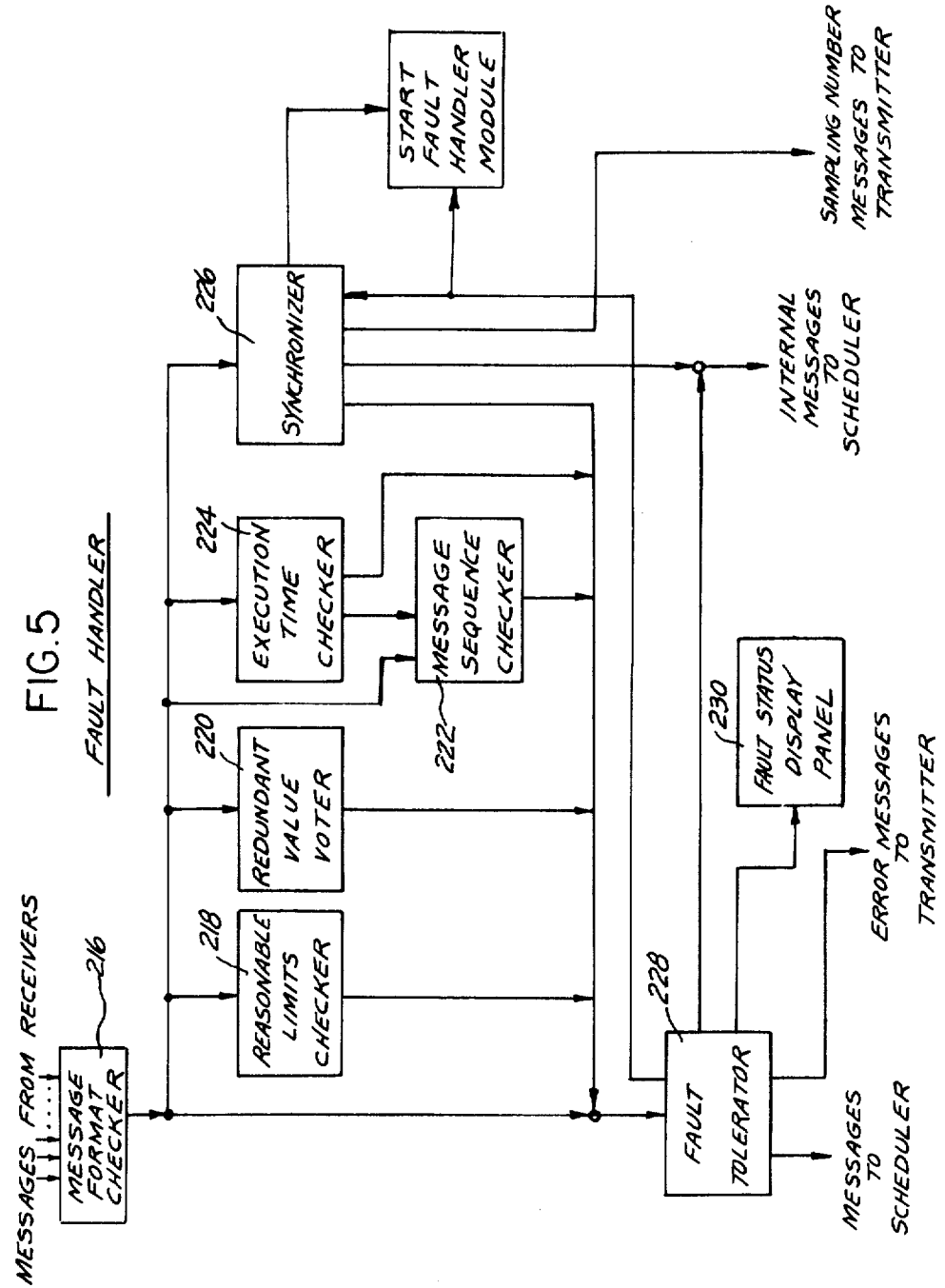

MESSAGE FORMAT CHECKER

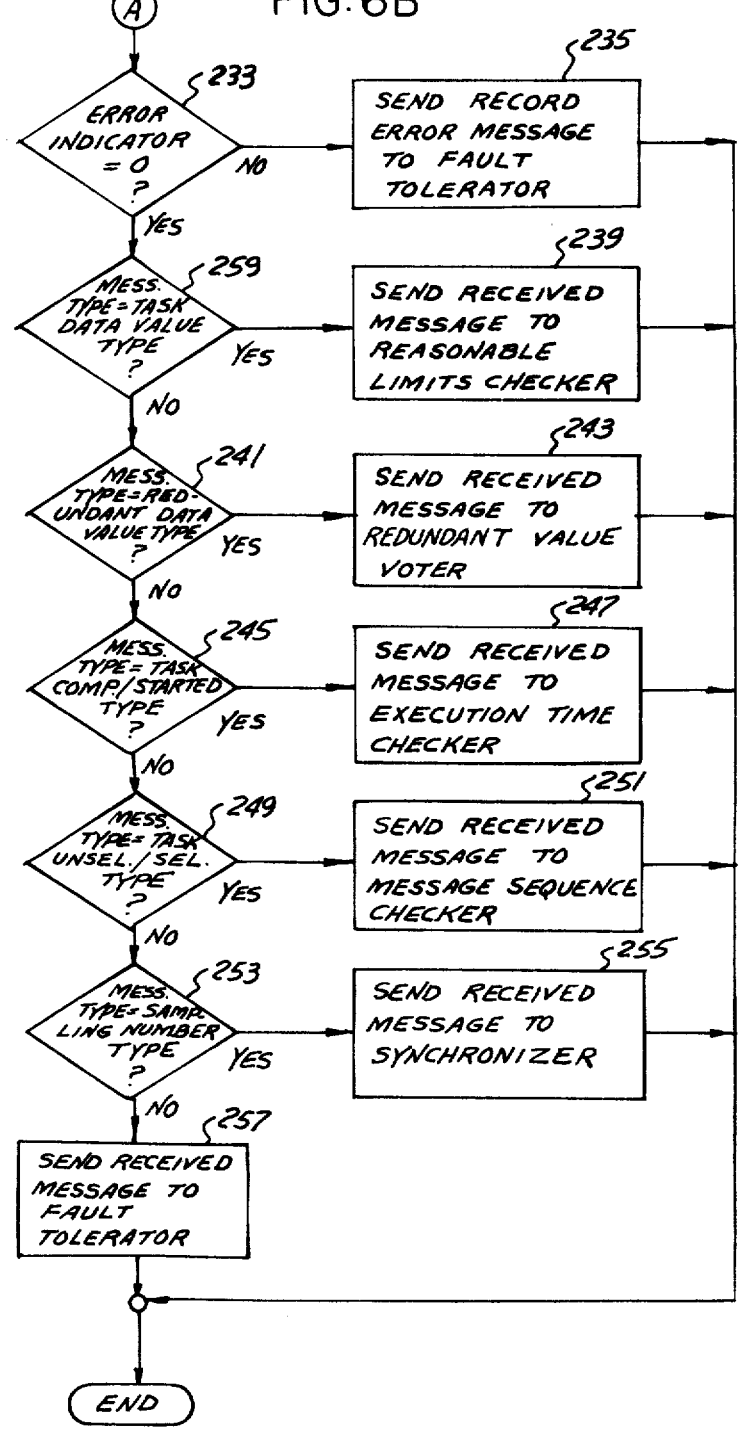

MESSAGE FORMAT CHECKER

REASONABLE LIMITS CHECKER

TIMING SIGNALS

FIND VALUES THAT AGREE

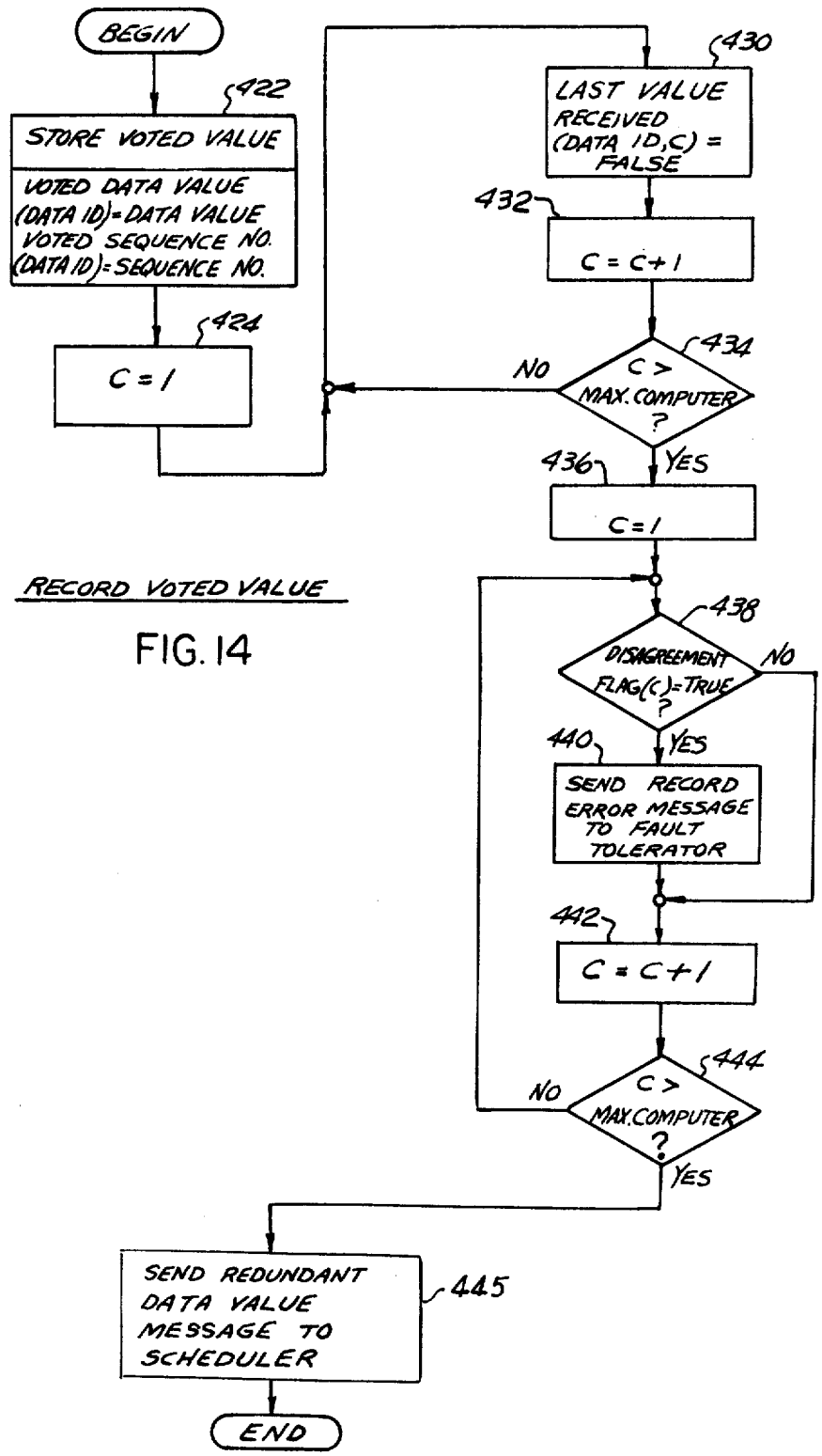
FIG. 14 RECORD VOTED VALUE

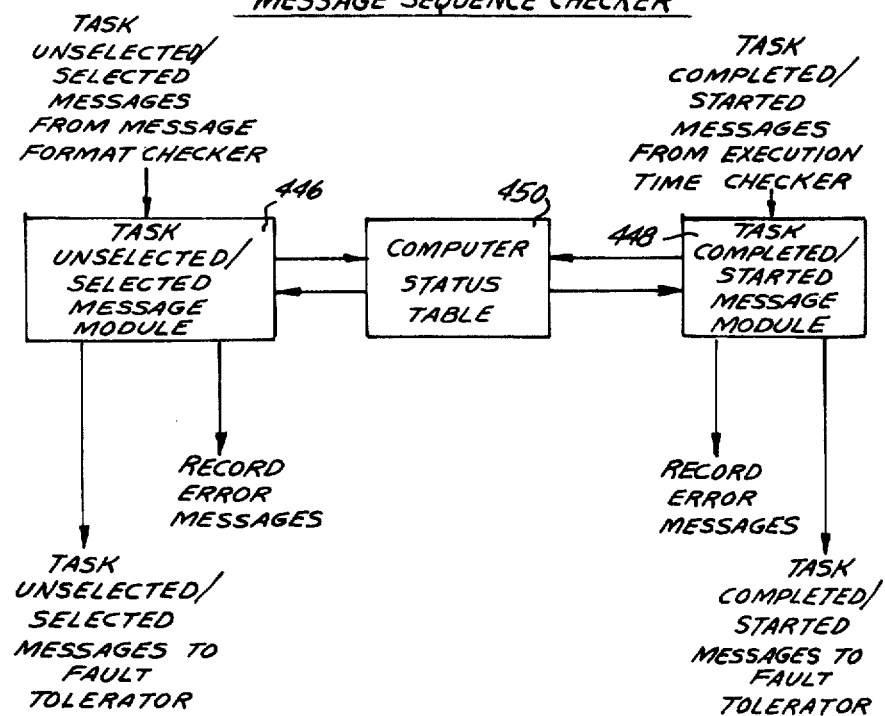
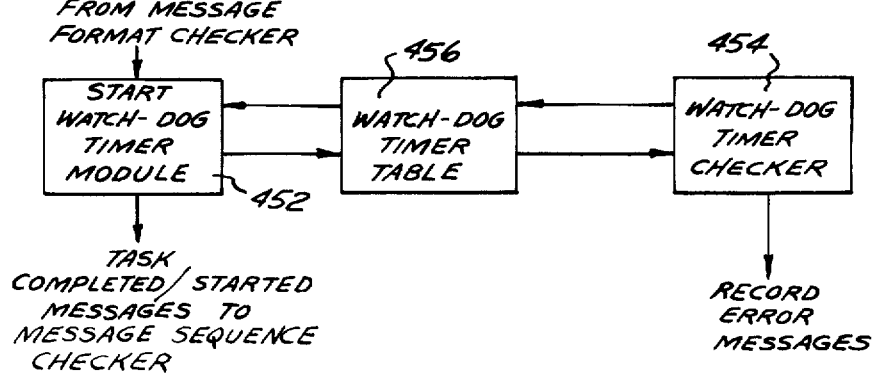

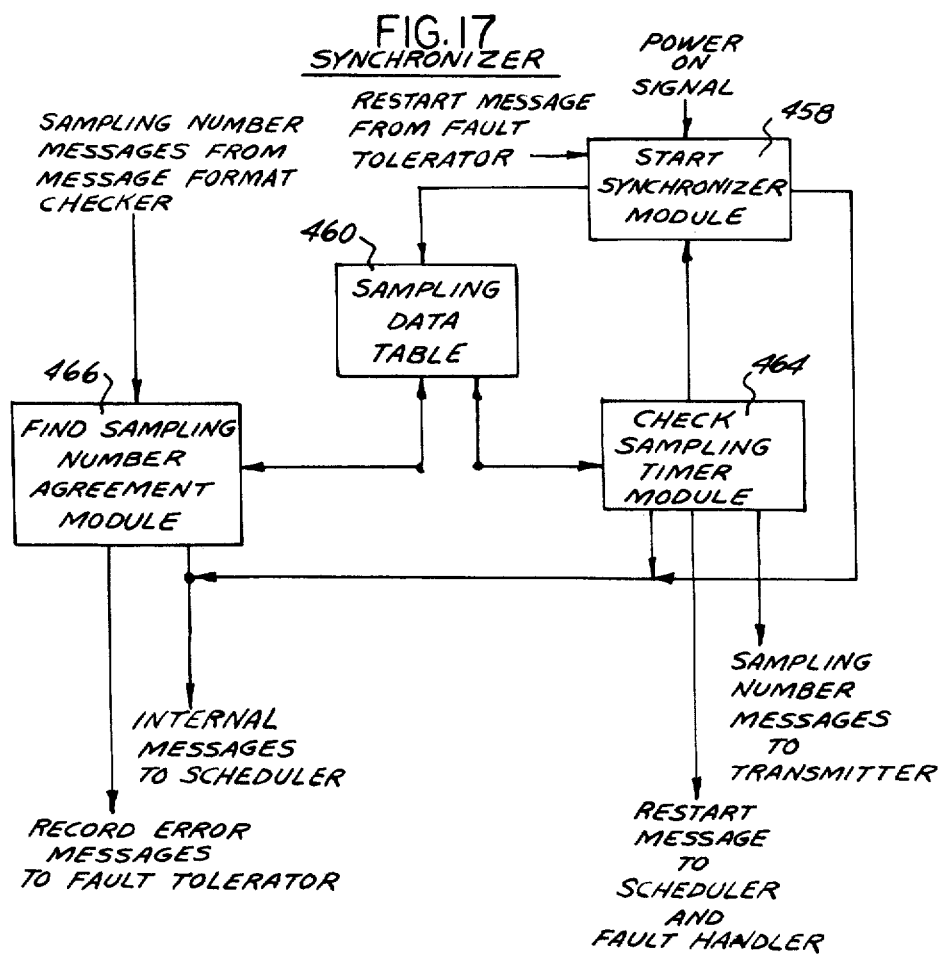
FIG. 17 SYNCHRONIZER
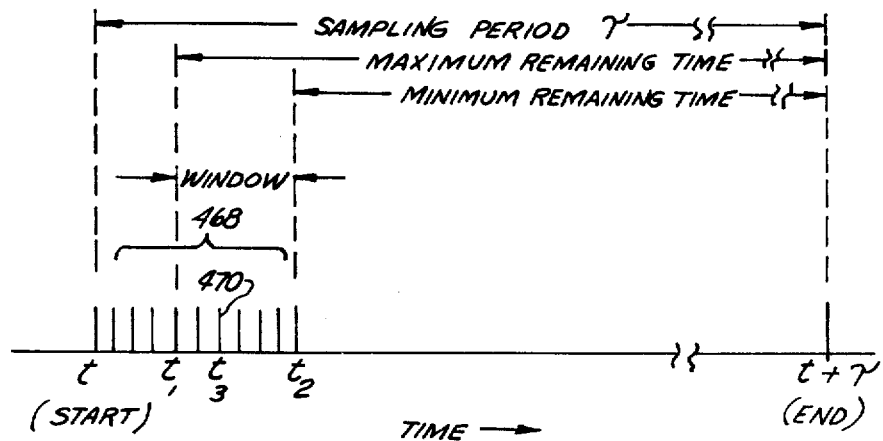
FIG. 18

STATUS TABLE

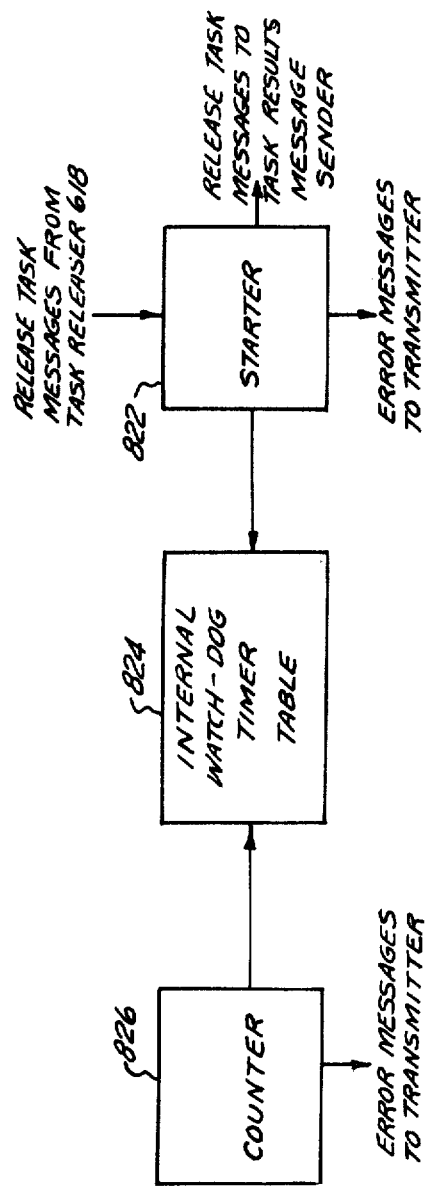

FAULT-TOLERANT MULTI-COMPUTER SYSTEM

CROSS REFERENCE

The disclosed invention is related to the commonly assigned co-pending applications Applications, Ser. Nos. 118,691, now U.S. Pat. No. 4,330,820, 118,693, now U.S. Pat. No. 4,323,966, 118,694, now U.S. Pat. No. 4,342,083, 118,811, now U.S. Pat. No. 4,321,666, 118,812, now U.S. Pat. No. 4,318,173, and 118,813 now U.S. Pat. No. 4,333,144 filed concurrently herewith.

BACKGROUND OF THE INVENTION

1. Field of the Invention

The invention is related to Multiple Computer Systems, and in particular to Fault-Tolerant Multiple Computer Systems not having multiple Computers performing each system function.

2. Prior Art

The earliest attempts to produce Fault-Tolerant Control Systems provided redundant computers in which each computer simultaneously executed every task required for the control operation. Voting circuits monitoring the outputs of the multiple computers determined the "correct" system output, the "correct" system output being the output produced by the majority of computers. When a faulty computer produces an output which differs from the "voted" output, the differing output is discarded and does not affect the "voted" or "correct" output of the control system. In this type of Fault-Tolerant System, the failure of a computer may or may not be detected and that computer may or may not be turned "off."

This method, though highly successful, is expensive since it requires multiple equivalent computers, each simultaneously performing the same function. These systems require relatively powerful computers, since each computer has to perform every task required for the operation of the system.

As an alternative, a master-slave concept was introduced in which the operation of several computers was coordinated through a master control. The master designated which tasks were to be executed by the individual computers. This reduced the execution time of the control operation since the good computers no longer were required to execute each and every task. When a fault was detected in the operation of one of the computers, that computer was disconnected and the master distributed the tasks among the good or operative computers. The master-slave concept is dependent upon the continued operation of the master and if the master failed, the system failed. This situation may be rectified by using redundant masters, however, the increased cost of redundant masters limit the applicability of these types of systems to situations where the user is willing to pay for the added reliability, such as in space exploration, nuclear energy facilities, or any other situation where failure of the system would endanger lives.

Recent efforts to improve upon master-slave and redundant execution Fault-Tolerant Multiple Computer Systems are exemplified in the October, 1978 Proceedings of the IEEE, Volume 66, No. 10, which is dedicated to fault-tolerant control systems. Of particular interest are the papers entitled "Pluribus: An Operational Fault-Tolerant Multiprocessor" by D. Katsuki et al., pp. 1146–1159 and "SIFT: The Design and Analysis of A Fault Tolerant Computer for Aircraft Control" by J. H. Wensley et al., pp. 1240–1255. The Pluribus and SIFT control systems are believed to represent the present state of the art. The SIFT system uses redundant execution of each system task, and of the master control functions. The Pluribus system has a single "master" copy of most current information, which can be lost when a fault occurs. Such loss of current information can cause interruption of system operation for several seconds or minutes.

SUMMARY OF THE INVENTION

The invention is a fault-tolerant multiple computer system for executing a set of tasks. Each computer has an assigned subset of the set of tasks which it is capable of executing, and each task is included in more than one subset. No one computer in the system acts as a master and no one computer need be capable of executing all of the tasks. Communications between the individual computers is by means of individual communication links, one link associated with each computer, by means of which only the associated computer can send messages to all other computers in the system.

Each computer comprises an applications computer and an operations controller. The operations controller receives the messages from the other computers over the communication links. It also selects the tasks which its computer will execute, from its assigned subset of tasks. The applications computer executes the tasks selected by its associated operations controller. The results of the executed tasks are either applied to output devices or transmitted via its operations controller and its associated communication link to all of the other computers in the system. The results are transmitted when required for a task to be subsequently executed by itself or another computer.

The operations controller comprises a fault handler, a scheduler, a task communicator, a transmitter and requisite receivers.

The fault handler checks each message received from the other computers, and determines which computer(s) are faulty when a failure occurs. The fault handler discards messages received from computers deemed to be faulty and forwards to the scheduler only messages received from non-faulty computers. The fault handler sends messages to all of the other computers in the system identifying each computer it has deemed to be faulty.

The scheduler maintains a status table in which it stores the current status of each task in its assigned subset. The status table is continuously updated by the messages forwarded by the fault handler. The scheduler selects from the status table the highest priority task which is ready for execution and which has not been selected by another computer. The task selected by the scheduler is forwarded to the task communicator, and a message is sent informing all of the other computers that the computer has selected the identified task.

The task communicator assembles the data variable values required for the execution of the selected task and makes them available to the applications computer. After the execution of the selected task by the applications computer, the task communicator sends messages containing the value of the data variables computed by the completed task. It then sends a message to all of the other computers identifying the task just completed and the next task started.

The object of the invention is a fault-tolerant multiple computer system for cooperatively executing a set of tasks in a fault tolerant manner. Each computer in the system selects and executes tasks so that each task required to be executed by the system is executed in a correct sequence. Each computer detects which, if any, computers in the system are faulty, and ignores the selection and execution of tasks by the faulty computer(s), thereby permitting the tasks to be selected and executed by the remaining non-faulty computers.

One advantage of the system is that each computer selects its own tasks, from its assigned subset of tasks, without the intervention of a master or controlling scheduling device or computer. Another advantage is that each task is assigned to more than one computer so that, in the event a computer fails, the tasks assigned to the failed computer may be selected and executed by an alternate good or operational computer. Another advantage is that no one computer is required to execute all of the tasks, reducing the memory size requirements of each computer and permitting the use of lower cost microcomputers. Still another advantage is that each computer decides which computers in the system are faulty, and effectively excludes the faulty computer from participating in the operation of the system.

These and other advantages will become apparent from reading the detailed description in conjunction with the drawings and tables.

BRIEF DESCRIPTION OF THE DRAWINGS

FIG. 5 is a block diagram of the Fault Handler.

FIGS. 6A and 6B are a flow diagram for the Message Format Checker.

FIG. 14 is a flow diagram for the "Record Voted Value" subroutine of the Redundant Value Voter.

FIG. 15 is a block diagram of the Message Sequence Checker.

FIG. 16 is a block diagram of the Execution Time Checker.

FIG. 17 is a block diagram of the Synchronizer.

FIGS. 18, 19 and 20 are time-sequence charts used in the discussion of the Synchronizer.

FIG. 27 is a block diagram of the Internal Watch-Dog Timer.

BRIEF DESCRIPTION OF THE TABLES

Figure 1:
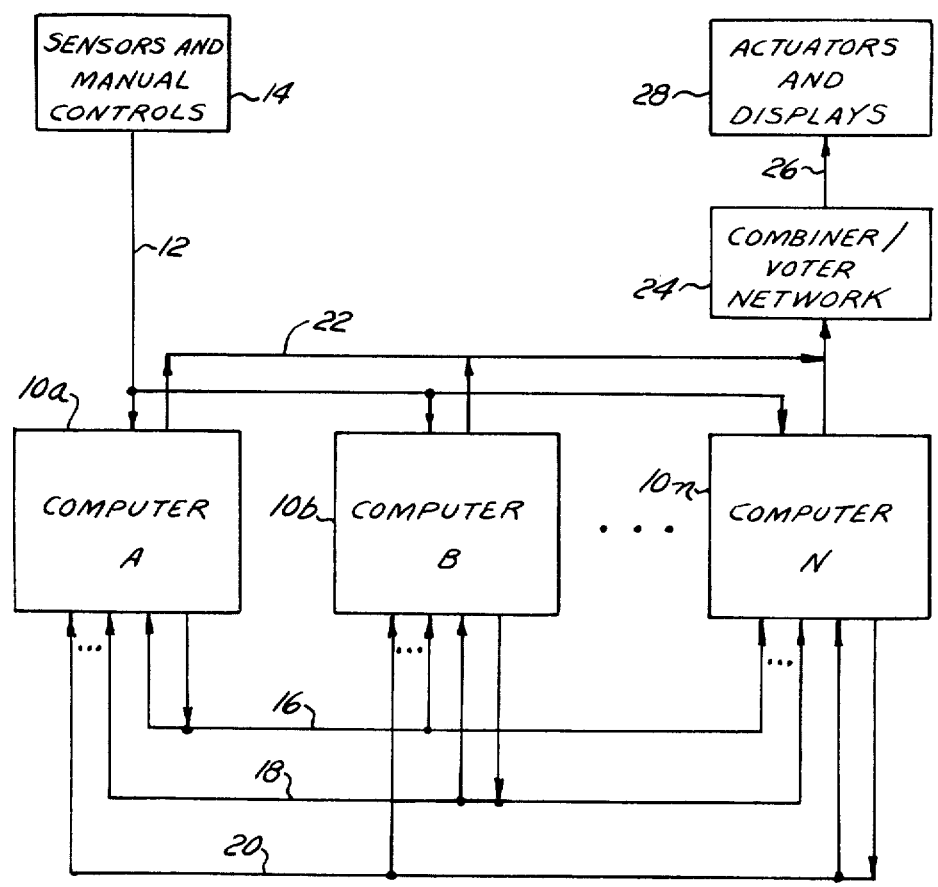
FIG. 1 is a block diagram showing the basic architecture of the Fault-Tolerant Multiple Computer System.

| ARCHITECTURE OF THE FAULT-TOLERANT MULTIPLE COMPUTER SYSTEM | |
|---|---|
| TABLE | DESCRIPTION |
| Table I | Tables used in the System |
| *Messages* | |
| Table II-A | *Inter-Computer Messages |
| Table II-B | Internal Messages |
| *Fault Handler* | |
| Table III-A | Message Format Checker |
| Table III-B | Reasonable Limits Checker |
| Table III-C | Redundant Data Table |
| Table III-D | *Redundant Value Voter |
| Table III-E | *Check Agreement |
| Table III-F | *Find Values That Agree |
| Table III-G | *Record Voted Value |
| Table III-H | *Task Unselected/Selected Message Module |
| Table III-I | *Task Completed/Started Message Module |
| Table III-J | *Watch Dog Timer Checker |
| Table III-K | *Start Watch Dog Timer Module |
| Table III-L | Sampling Data Table |
| Table III-M | *Start Synchronizer Module |
| Table III-N | *Check Sampling Timer Module |
| Table III-O | *Find Sampling Number Agreement Module |
| Table III-P | *Find Computers That Agree |
| Table III-Q | *Reset Sampling Timer |
| Table III-R | *Record Voted Sampling Number |
| Table III-S | Fault State Table |
| Table III-T | *Send Good Message Module |
| Table III-U | *End Time Period Module |
| Table III-V | *Check Error Message Agreement Module |
| Table III-W | *Record Error Module |
| Table III-X | *Display Faulty Computer |
| Table III-Y | *Start Fault Handler Module |
| *Scheduler* | |
| Table IV-A | Task Status Table |
| Table IV-B | Task Index Table |
| Table IV-C | Scheduling Status Table |
| Table IV-D | Awaiting Task Table |
| Table IV-E | *Record Data Ready |
| Table IV-F | *Find Awaiting Execution Number |
| Table IV-G | *Test If Health Check Selected |
| Table IV-H | Special Tasks Table |
| Table IV-I | *Record Special Tasks |
| Table IV-J | *Task Selector |
| Table IV-K | *Record Task Selected By Own Computer |
| Table IV-L | *Completed Task Recorder |
| Table IV-M | *Test If Last Completed Task |
| Table IV-N | *Unselected/Selected Task Recorder |
| Table IV-O | *Record Task Selected |
| Table IV-P | *Test If Selected Task |
| Table IV-Q | *Task Unselector |
| Table IV-R | *Task Releaser |
| Table IV-S | *System Status Monitor |
| Table IV-T | *Start Scheduler Module |
| *Task Communicator* | |
| Table V-A | Data Values Table |
| Table V-B | Task Input Table |
| Table V-C | Task Output Table |
| Table V-D | *Store Data Value Module |
| Table V-E | Task Data Table |
| Table V-F | *Task Dispatcher |

-continued

| ARCHITECTURE OF THE FAULT-TOLERANT MULTIPLE COMPUTER SYSTEM | |
|---|---|
| TABLE | DESCRIPTION |
| Table V-G | *Release Task Module |
| Table V-H | *Task Results Message Sender |
| Table V-I | *Starter |
| Table V-J | *Counter |
| Table V-K | *Start Task Communicator |
| | Applications Computer |
| Table VI | *Applications Computer Executive Program |
| | Microprocessor Based Implementation of Operations Controller |
| Table VII-A | *General Executive Program |
| Table VII-B | Conditions for Module Execution |
| Table VII-C | *General "Task" Program |
| Table VII-D | *Fault Handler Executive Program |
| Table VII-E | Module Modifications |

The tables indicated with asterisks (*) are pseudo code programs

DETAILED DESCRIPTION OF THE INVENTION

ARCHITECTURE OF THE FAULT-TOLERANT MULTI-COMPUTER SYSTEM

The architecture of the disclosed Fault-Tolerant Multi-Computer System is illustrated in FIG. 1. The system comprises a plurality of Computers 10 connected by means of input lines 12 to various sensors and manual inputs collectively represented by block 14.

The outputs of Computers 10 are transmitted by means of output lines 22 to a Combiner/Voter Network 24, which selects and/or combines the output data generated by the various Computers. The Combiner/Voter Network 24 distributes this data, by designated line 26, to the appropriate actuators and displays collectively represented by block 28.

Each Computer 10 has its own private communication link, such as Communication Links 16, 18, and 20, over which it can transmit messages containing data to every other Computer. For example, messages originating in Computer A are transmitted to all the other Computers via Communication Link 16. All the other Computers connected to Communication Link 16 can only receive messages over Communication Link 16. To transmit a message back to Computer A, they must use their own communication link, i.e., Computer B would use Communication Link 18 and Computer N would use Communication Link 20. The messages and data sent over the communication links are sent in serial form; therefore, each link may be a single pair of wires or other serial transmission medium such as an optical fiber. Each communication link is also connected back to the transmitting Computer, permitting verification that the message sent on the communication link is correct. This is part of the fault detection features of the system to be discussed later.

Each Computer such as Computer 10a through 10n consists of one or more computers (or processors), depending upon the number of tasks to be executed by that particular Computer for a particular application and upon the fault-tolerant sophistication of the system. Each Computer 10a through 10n is hereinafter referred to as Computer 10 without the identifying subscript.

Each Computer has an assigned set of tasks which it is capable of executing, where the set of tasks assigned to each Computer 10 is less than the total set of tasks to be executed by the system. One feature of the system, however, is that each task to be executed is assigned to at least two different Computers. Certain tasks critical to the operation of the system are assigned to several or possibly all of the Computers. Each Computer in the system is capable of individually executing each assigned task.

For example, consider a relatively simple system having three Computers and required to execute fifteen (15) different tasks, of which the tasks designated Tasks 7 and 11 are critical to the operation of the system. Further, consider each Computer in the system to be capable of executing at least eleven (11) of the required tasks. In this example, Computer A may be assigned Tasks 1 through 11, Computer B assigned Tasks 5 through 15 and Computer C assigned Tasks 11 through 15, Tasks 1 through 5, and Task 7. In the example, Tasks 7 and 11 are assigned to each Computer; however, in a system having more than three Computers, Tasks 7 and 11 would have been assigned to more than two Computers but not necessarily to all of them.

The execution of each assigned task in each of the Computers 10 is data driven, i.e., when all of the data required for the execution of a particular task is available, each Computer to which the task is assigned is capable of selecting and executing the task. The data is usually the results of one or more previously executed tasks. When execution of a task is completed, the task results are communicated to each of the computers by sending messages via the communication link. When the task results are received by Computers which require the particular data for the performance of a subsequent assigned task, the receiving Computer will store the received data. The Computers which have no assigned task requiring the particular data may discard the received data.

The selection of each task to be executed by each Computer is made dynamically by each Computer. This is done in such a manner that all Computers assigned a task will not necessarily proceed to execute that task. Stated alternatively, a Computer may not execute all tasks which are assigned to that Computer. Each Computer makes its own decisions, based upon knowledge of previous decisions by all Computers, as communicated in messages received via the communication links.

The task selection is performed by a Schedular described in detail hereinafter with reference to FIG. 24. Briefly, the selection of each task to be executed by each Computer is made dynamically on a priority basis. To this end, a priority number is assigned to each Computer and a priority number is assigned to each task within a given Computer. When a given Computer needs to select a task, the task status information is scanned to determine which of the assigned tasks are ready for execution. A task is ready for execution when all of the data necessary for the execution of the task is available. The Computer selects the ready task having the highest task priority and sends out a message on its communication link signifying to the other Computers that it has selected the task. When a Computer receives a message indicating that another Computer has selected a task, the selected task is removed from the ready status in all of the other Computers capable of performing the same task.

In the time interval between task selection and starting the execution of the selected task, the computer checks to determine if another Computer has selected the same task. If the Computer which selected a task does not receive a message indicating that another Computer has selected the same task, the Computer initiates the execution of the selected task.

In the event another Computer selects the same task before the first Computer initiates the execution of the task, the priority of each Computer which selected the task is analyzed, and the task remains selected by the Computer having the highest priority. The remaining Computers unselect the previously selected task, and proceed to select the next highest priority task ready for execution. When it is desirable that certain identified tasks be executed by more than one Computer, the same functional task is duplicated for scheduling purposes, one copy for each execution desired.

Fault detection in the system is accomplished by a combination of methods. Faults may be detected by comparing the results of each executed task with stored range limits, by comparing the results of the same task executed by two or more different computers, by error detecting codes on information communicated, by analyzing the scheduling sequence or by the use of watchdog timers. The system may embody all five fault detection methods, any lesser number of the above methods in combination, or in special applications, any one of the above listed methods.

The messages sent by a Computer are received and analyzed in every Computer in the system to determine if an error exists. If an error is detected, each Computer detecting the error sends out an error message via its communication link to all of the other Computers. An error message signals the detection of an error and identifies the Computer which made the error. The error messages received are analyzed in each Computer. When a Computer receives error messages from two or more Computers, the computer which is identified as making the error is assumed to be faulty.

When a Computer is deemed faulty by another Computer, the messages signaling task selection and containing data results of any task executed by the faulty Computer are discarded or ignored. The receipt of messages signifying an error detected by two or more Computers also reinstates the ready status of the tasks presently selected and being executed by the Computer which is deemed to be faulty. The tasks selected and being executed by the faulty Computer are subsequently reselected and re-executed by other Computers capable of executing those tasks.

In the disclosed system, a Computer determined to be faulty is not turned off or disabled, but is permitted to remain active and to continue to execute each of the assigned tasks, if it can. The remaining Computers continue to check the messages sent by the faulty Computer to determine if the malfunction is temporary or permanent. If the malfunction is temporary, the faulty Computer will eventually return to normal operation and the results of the tasks executed in that Computer will be correct. After a Computer deemed to be faulty correctly executes its assigned tasks for a predetermined period of time, the malfunction is assumed to have been temporary and the excluded Computer is restored to full participation in task selection and task execution.

If a faulty Computer sends incorrect information to Actuators and Displays, the faulty information is corrected by the Combiner/Voter Network 24. The output or task results of any task used for actuator activation or display purposes are generated by the Computers 10 to which the specific tasks are assigned. The output of each Computer 10 is transmitted on lines 22 to the Combiner/Voter Network 24. The Combiner/Voter Network 24 combines the appropriate output data for actuator activation or display purposes as required. When duplicate outputs are provided by multiple Computers, the output data to be used is selected by a voting process.

Figure 2:
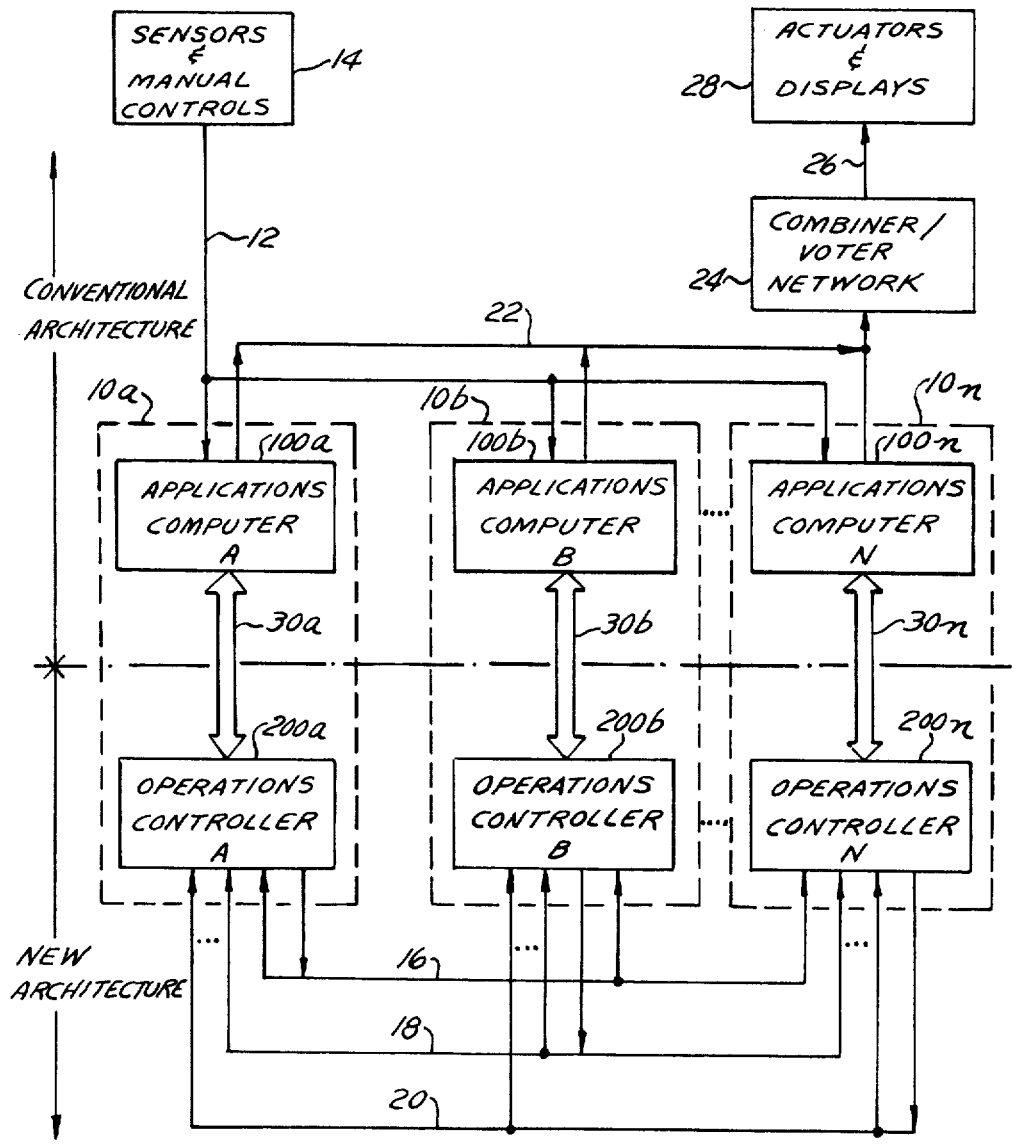
FIG. 2 is a block diagram of the Fault-tolerant Multiple Computer System showing further detail of the system.

FIG. 2 shows in greater detail the architecture of the multi-computer system, shown in FIG. 1. Each Computer 10 comprises an Applications Computer 100, such as Applications Computers 100a through 100n, and an Operations Controller 200, such as Operations Controllers 200a through 200n. Each Applications Computer 100 and its associated Operations Controller 200 are interconnected by a buss 30, as indicated by busses 30a through 30n.

The data from the sensors and manual controls, indicated by block 14, are received directly by the Applications Computers 100. Similarly, the data to the Actuators and Displays 28, via the Combiner/Voter Network 24, are obtained directly from the outputs of the Applications Computers. Only the Operations Controllers are interconnected by the communication links 16 through 20.

Figure 3:
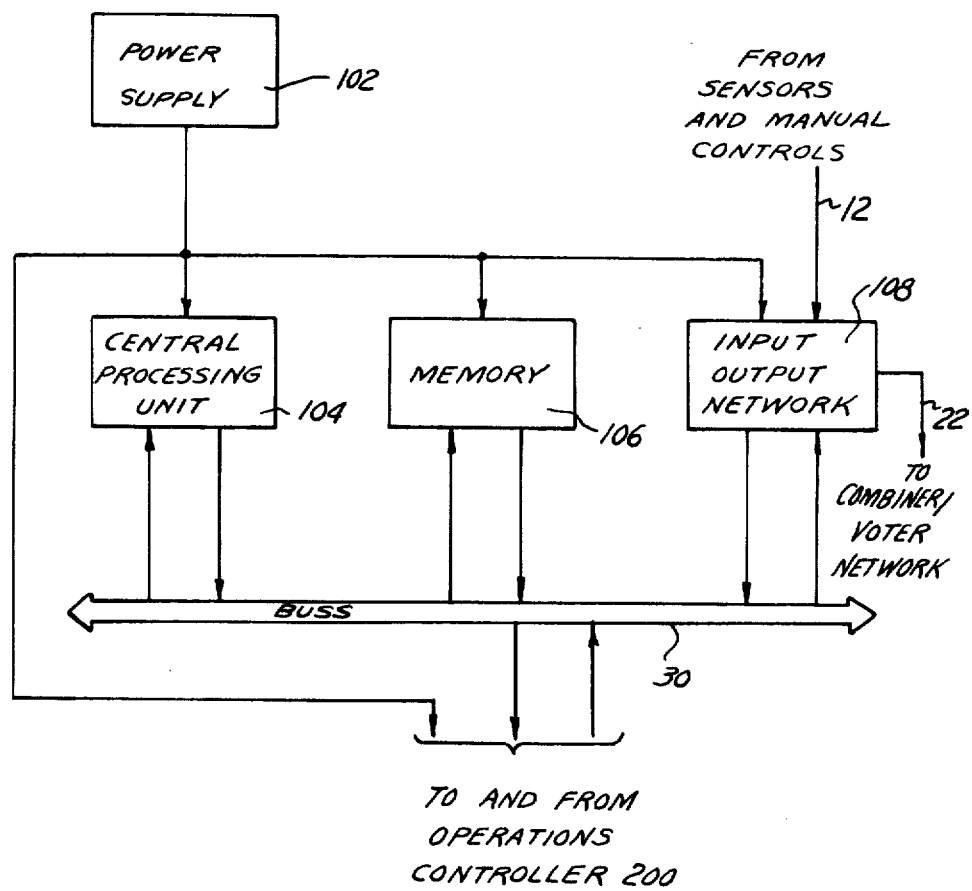
FIG. 3 is a block diagram of the Applications Computer.

The Applications Computers 100 are of conventional architecture as shown on FIG. 3. Each Applications Computer comprises a Power Supply 102, a Central Processing Unit (CPU) 104, a Memory 106, and an Input-Output Network 108. The Operations Controllers 200 each comprise a plurality of Receivers 202, a Fault Handler 204, a Scheduler 206, a Task Communicator 208, and a Transmitter 212, as shown on FIG. 4.

The structure of the Operations Controllers 200a through 200n shown in FIG. 2, including the interconnecting communication links 16 through 20, represent the novel aspects of the disclosed Fault-Tolerant MultiComputer System. The system does not contain a master controller to determine or control which Computer 10 will execute a designated task. Further, the system is not a fully redundant system wherein each Computer 10 is capable of executing and does execute every task.

APPLICATIONS COMPUTER

FIG. 3 shows the structure of a typical Applications Computer 100. Each Applications Computer 100 has a Power Supply 102, which supplies electrical power to the Central Processing Unit 104, the Memory 106, the Input-Output Network 108, and the associated Operations Controller 200, as indicated. The Central Processing Unit 104, Memory 106 and Input-Output Network 108 are connected by the buss 30. The Input-Output Network 108 is further connected to the Sensors and Manual Controls 14 by line 12, and to the Combiner/Voter Network by line 22. As previously indicated, the Operations Controller 200 is also connected to the buss 30.

The Central Processing Unit 104 may comprise one or more microcomputers, such as Central Processor 8086 manufactured by Intel Corporation of Santa Clara, Calif. The Memory 106 may comprise one or more read only memories, such as Erasable PROM 8708 also manufactured by Intel Corporation, which store the programs to be executed by the Central Processing Unit. The Memory 106 may also include one or more read-write (RAM) memories, such as Static RAM 8102A also manufactured by Intel Corporation. The Input-Output Network 108 may comprise one or more commercially available integrated circuits, such as Programmable Peripheral Interface 8255A manufactured by Intel Corporation, with attendant A/D and D/A converters. Alternatively, the Central Processing Unit 104, Memory 106 and Input-Output Network 108 may be incorporated in a single integrated circuit such as Microcomputer 8748 manufactured by Intel Corporation.

The operation of the Applications Computer 100 is as follows. The Operations Controller 200 generates a task signal indicative of the task to be executed by the Central Processing Unit 104, and sends the task signal along with the requisite data to the Central Processing Unit over Buss 30. The Central Processing Unit 104 responds to the task signal, accesses the appropriate program in the Memory 106, executes the task with the provided data, and outputs the results on Buss 30. Data from the Sensors and Manual Controls are received over lines 12 at the input of the Input-Output Network 208, which makes the received data available for use in the execution of an assigned task. The results of those executed tasks which are used for actuator control or display are output to the appropriate actuator and/or display through the Input-Output Network 108. Other results from a task executed by the Central Processing Unit 104, which are required for further computation within the system, are transmitted to all other Computers via the Operations Controller 200 and the communications link. When the execution of the task is completed, the Central Processing Unit initiates execution of the next task selected by the Operations Controller.

OPERATIONS CONTROLLER

Figure 4:
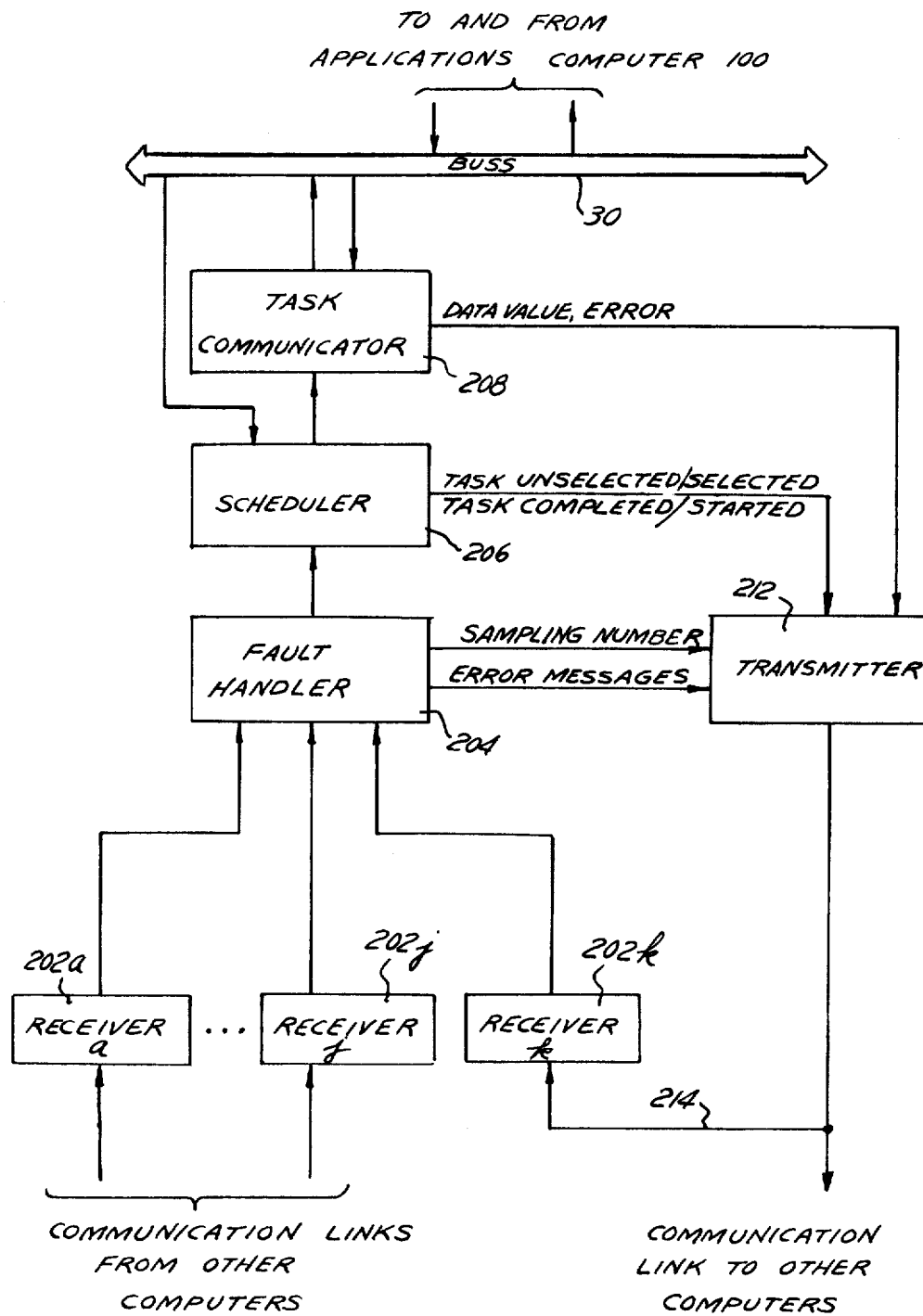
FIG. 4 is a block diagram of the Operations Controller.

FIG. 4 shows the structure of the Operations Controller 200 in block diagram form. The Operations Controller 200 has a plurality of Receivers 202a through 202k, each connected to a communication link associated with one of the Computers 10. There may be as many Receivers 202 as there are Computers 10, or there may be fewer Receivers if the computer associated with this Operations Controller has no need to receive communications from one or more other Computers in the system, i.e., the results of none of their tasks are needed by this Computer for the execution of its assigned tasks.

The input to one of the receivers, designated Receiver 202k, is connected by means of line 214 to the output of Transmitter 212, which sends the messages and data over the communication link from the associated Operations Controller. This feedback connection between the Transmitter 212 and Receiver 202k is part of the fault detection system to check the message sent over the communication link, and also permits the task results to be input back into the generating Computer for subsequent task execution. This feedback connection may be direct, or preferably in the form of a loop connection from Transmitter 212 to the appropriate Receivers in each other Computer and finally back to Receiver 202k in the same Computer.

The Receivers 202a through 202k receive the messages serially transmitted over the communication links and convert them to a parallel format for subsequent utilization in the Operations Controller and Application Computer. As used hereinafter, the term "messages" will include all messages, such as Task Completed/Started, Task Unselected/Selected, Error, Task Data Values, and other messages communicating information between the Computers via the communication links.

The Receivers 202 also include circuits which establish message protocol and perform other necessary format conversions. The Transmitter 212 performs the reverse function, receiving parallel data and converting it to a serial format for transmission over the communication link. The format conversion may strip or add carriers, provide padding or add special codes for transmission error control as is known in the art.

The Receivers 202 and Transmitter 212 each contain buffers permitting a message to be received some time before it can be output. Each buffer is capable of holding more than one message; for example, each buffer may be capable of holding up to ten (10) messages. Receivers 202 and Transmitter 212 may be commercially available integrated circuits incorporating both a receiver and transmitter, such as the Programmable Communications Interface (PCI) 2651 manufactured by Signetics of Sunnyvale, Calif. or the SDLC Protocol Controller 8273 manufactured by Intel Corporation of Santa Clara, Calif. These circuits are supplemented with additional buffering using commercially available integrated circuits such as FIFO 33512 manufactured by Fairchild Corporation of Mountain View, Calif.

The parallel data outputs of the Receivers 202 are transmitted to a Fault Handler 204, where each received message is analyzed to determine if it is good or faulty. The Fault Hander 204 may be a micro-computer having storage capabilities, a part of a micro-computer, or a special purpose circuit. The Fault Handler 204 performs one or more of the following fault detection checks:

1. Compare the received data value with predetermined limit values to determine if it is reasonable, i.e., has a value between predetermined minimum and maximum values.

2. Compare the received data with the results of other Computers performing the same task, to determine the most probable value, and to identify Computers providing values which differ significantly from the most probable value, 3. Determine if the scheduling information was received in a proper sequence, 4. Determine by means of watch-dog timers if the task execution was completed within a predetermined time period after the execution was started, or 5. Check error detecting codes, determined over other information communicated and included in each message.

In addition to performing fault detection checks, the Fault Handler 204 also performs the following functions:

1. Transmits an Error message to the Transmitter 212 when an error is detected.

2. Stores Error messages received from all Computers.

3. Decides if one or more of the Computers is faulty.

4. Discards all messages received from the Computers determined to be faulty.

5. Transmits to the Scheduler 206 error-free messages from non-faulty Computers.

6. Generates a fault display indicating the Computers which have been determined to be faulty.

7. Decides that a Computer is no longer faulty and readmits the Computer previously determined faulty, after the faulty Computer sends good messages for a predetermined period of time, 8. Generates the required input/output sampling commands, and 9. Initiates startup of the Applications Computer and Operations Controller, when the Computer is first turned on or power is returned after a temporary power failure.

The function of the Scheduler 206 is to schedule the task to be executed by its own Applications Computer 100. The Scheduler performs the following functions:

1. Keeps track of the status of all assigned tasks and determines which of the tasks are ready for execution, i.e., all the data needed for execution is available.

2. Selects the ready task having the highest task priority for next execution and generates a signal indicative of the task selected, and 3. Unselects the selected task and selects the next highest priority task when it receives a task selection message for the same task from another Computer having a higher assigned Computer priority.

The Scheduler 206 may be implemented by means of a micro computer or a part thereof, or with special purpose hardware, depending upon the number of assigned tasks and complexity of the system.

The Task Communicator 208 stores the current values of the data required for the execution of each task assigned to the associated Applications Computer 100. The Task Communicator responds to each task signal generated by the Scheduler 206 and makes available to the associated Applications Computer 100 the data required for the execution of the task identified by the task signal. Upon completion of each task, data values produced by the executed task, or an error message if an error was detected in the execution of the task, are sent by the Task Communicator 208 to the Transmitter 212.

The Transmitter 212 also receives the Task Complete/Started messages from the Task Communicator, Task Unselected/Selected messages from the Scheduler 206, and Sampling Number and Error messages from the Fault Handler 204. The Transmitter 212 converts the received messages to a serial format which is sent to the other computers via the associated communication link.

The data sent over the associated communication link is also received by Receiver 202k over line 214. The messages received by the Fault Handler 204 from Receiver 202k are treated in the same way as any other message received from the other Computers in the system. In this way, the data generated by the associated Applications Computer, required for the execution of a subsequent task, is communicated to and stored in the associated Task Communicator 208 of each Computer 10.

The operation of the Operations Controller 200 requires the maintenance of various tables of information. These tables store the recent actions of all Computers, including itself. Table I below lists the various tables used in the system and the elements to which these tables are assigned.

TABLE I

| TABLES USED IN THE SYSTEM | |
|---|---|
| TABLE | ELEMENT |
| Redundant Data | Fault handler 204 |
| Computer Status | Fault Handler 204 |
| Sampling Data | Fault Handler 204 |
| Fault State | Fault handler 204 |
| Scheduling Status | Scheduler 206 |
| Task Status | Scheduler 206 |
| Data Values | Task Communicator 208 |
| Internal Watch-Dog Timer | Task Communicator 208 |

MESSAGES

The operation of the Fault-Tolerant Multi-Computer System requires that various items of information be transmitted in messages between the multiple Computers in the system. Table II-A is a tabulation of the message types used in the following description of the system. Each message is assumed to comprise a fixed integer number of 8-bit bytes or characters. It is recognized that the various items of information in the messages listed in Table II-A may be presented in various other ways and may use different numbers of bytes and/or bits. The message types given in Table II-A, and their contents, represent a specific format that may be used.

TABLE II-A

| INTER-COMPUTER MESSAGES | | |
|---|---|---|
| Message Type | Byte No. | Byte Contents |
| Task Data Value | 1 | Message Type |
| | 2 | Sending Computer |
| | 3 | Data I.D. |
| | 4 | Sequence number |
| | 5-12 | Data Value |
| | 13-14 | Error Detecting Code |
| Redundant Data Value | 1 | Message Type |
| | 2 | Sending Computer |
| | 3 | Data I.D. |
| | 4 | Sequence Number |
| | 5-12 | Data Value |
| | 13-14 | Error Detecting Code |
| Task Completed/ Started | 1 | Message Type |
| | 2 | Sending Computer |
| | 3 | Completed Task |
| | 4 | Completed Execution Number |
| | 5 | Started Task |
| | 6 | Started Execution Number |
| | 7-8 | Error Detecting Code |
| Task Unselected/ Selected | 1 | Message Type |
| | 2 | Sending Computer |
| | 3 | Unselected Task |
| | 4 | Unselected Execution Number |
| | 5 | Selected Task |
| | 6 | Selected Execution Number |
| | 7-8 | Error Detecting Code |
| Error | 1 | Message Type |
| | 2 | Sending Computer |
| | 3 | Faulty Computer |
| | 4 | Error Type Code |
| | 5-6 | Null (not used) |
| | 7-8 | Error Detecting Code |
| Sampling Number | 1 | Message Type |
| | 2 | Sending Computer |
| | 3 | Sampling Number |
| | 4 | Starting Flag |
| | 5-6 | Excluded Bits |
| | 7-8 | Error Detecting Code |

The first two and last two bytes of all the intercomputer messages listed on Table II-A contain similar information. The first and second bytes of each message identify the message type and sending Computer respectively. The last two bytes are an error detecting code determined and checked over all other bytes of the message. The form of error detecting code used depends upon the communication link protocol selected; a 16 bit Cyclic Redundancy Check (CRC) code or any other code having similar error detection coverage may be used. In addition to these error detecting code bytes, each byte or character may be transmitted with additional bits which are used solely for error detection and/or correction. The error detecting bits and bytes are generated by the Transmitter 212 and checked by the Receivers 202, and are not passed along with the rest of the message for subsequent handling in the Operations Controller.

Task Data Value and Redundant Data Value messages differ only in whether or not the data values contained in the messages are redundantly computed by more than one Computer, and thus must be processed by majority voting as discussed hereinafter. Task Data Value Messages and Redundant Data Value Messages are sent by a Computer after completing the execution of a task, in which new values for some task data variables have been computed.

A Task Data Value or Redundant Data Value message comprises 14 bytes as indicated on Table II-A. The first byte identifies the message as a Task Data Value or Redundant Data Value message, which contains a new data variable value. The second byte identifies the Computer in which the new data value was computed. The third byte identifies the particular data variable for which a new value was computed by the sending Computer. The fourth byte provides the sequence number of the new data value. The sequence number distinguishes this particular value of the data variable from previous and subsequent values of the same data variable, computed by the same Computer or by any other Computer in the system. The sequence numbers are assigned sequentially (0 to 255 decimal) in circular fashion, i.e., 0 follows 255. The next 8 bytes, bytes 5 through 12, contain the new value for the data variable. The final two bytes contain the error detecting code.

The Task Completed/Started message is sent after a task has been completed, and follows the Task Data Value and Redundant Data Value messages from the completed task. The Task Completed/Started message informs the other Computers in the system that the sending Computer has completed the execution of the task identified in Byte 3, and identifies the new task started in Byte 5. Bytes 4 and 6 give the execution numbers of the completed and started tasks, respectively. Each execution number distinguishes the particular execution of a task from previous and subsequent executions of the same task. The execution number corresponds to the sequence number of the data values being used or being computed in the execution of the task.

The Task Unselected/Selected message is sent when the Scheduler has selected the next task to be executed by the Applications Computer. Bytes 5 and 6 of the Task Unselected/Selected message identify the newly selected task and its execution number. Bytes 3 and 4 identify the previously selected task and its execution number; this task is now unselected and replaced by the selected task.

When a Computer starts executing its selected task, it tentatively selects a known, fixed task, namely the Health Check task, so that a task is always selected. The selection of this Health Check task is not explicitly communicated to other Computers; its selection is assumed by all Computers when a Task Completed/Started message is received. Later, if the Computer selects another task, it sends out a Task Unselected/Selected message. Bytes 3 and 4 identify the unselected Health Check task, and bytes 5 and 6 identify the task selected in place of the Health Check task.

If prior to initiating the execution of the selected task, the Operations Controller receives a Task Unselected/Selected message from another Computer having a higher priority, indicating that it also has selected the same task (not Health Check) with the same execution number, the Operations Controller of the lower priority Computer unselects the task and selects a new task. The Operations Controller then generates a Task Unselected/Selected message informing all of the other Operations Controllers that it has unselected the previously selected task and identifying the newly selected task and its execution number.

An Error message is generated when an Operations Controller detects an error in a message received from another Computer, or detects an error committed by its own Computer. The first byte identifies the message as an Error message. The second byte identifies the Computer which detected the error, while the third byte identifies the Computer from which the erroneous message originated. The fourth byte contains an error type code which identifies the type of error detected. The fifth and sixth bytes contain null codes (not used). As previously indicated, bytes 7 and 8 contain an error detecting code. It should be noted that null bytes are included in some messages so that most message types are the same length and thus simplify message handling. Alternately, these null bytes could be omitted from the messages.

A Sampling Number message is sent by each Computer at the end of each sampling period. The first byte identifies the message type, and the second byte identifies the Computer sending the message. The third byte provides the new sampling number, which distinguishes the present sampling period from previous and subsequent sampling periods. Like the data value sequence numbers and task execution numbers, the sampling numbers are assigned sequentially (from 0 to 255 decimal) in circular fashion, i.e., 0 follows 255. The fourth byte is a starting flag signifying if the sending Computer is starting or restarting operation. The fifth and sixth bytes contain one bit for each possible Computer in the system, and indicate if the Computer associated with each bit is currently excluded by the sending Computer or not. The seventh and eighth bytes contain the error detecting code.

As previously stated, these messages are transmitted between the multiple Computers of the system. The same messages are also transmitted between some subsystems of the Operations Controller. Within one Operations Controller, not all bytes of a message may be transmitted. In particular, the error detecting code bytes are not communicated beyond the receivers.

Within each Operations Controller, additional internal messages are used to communicate information between the subsystems or modules of the Operations Controller. These messages are listed in Table II-B and will be discussed in conjunction with the modules that produce and/or use such internal messages.

TABLE II-B

| MESSAGE TYPE | INTERNAL MESSAGES | |
|---|---|---|
| | BYTE NO. | BYTE CONTENTS |
| EXCLUDE COMPUTER | 1 | MESSAGE TYPE |

TABLE II-B-continued

| MESSAGE TYPE | INTERNAL MESSAGES BYTE NO. | BYTE CONTENTS |
|---|---|---|
| | 2 | EXCLUDED COMPUTER |
| | 3-4 | EXCLUDED BITS |
| INITIATE SPECIAL TASKS | 1 | MESSAGE TYPE |
| | 2 | TASK TYPE |
| | 3 | EXECUTION NUMBER |
| RESTART | 1 | MESSAGE TYPE |
| DISPATCH TASK | 1 | MESSAGE TYPE |
| | 2 | TASK |
| | 3 | EXECUTION NUMBER |
| RELEASE TASK | 1 | MESSAGE TYPE |
| | 2 | COMPLETED TASK |
| | 3 | COMPLETED EXECUTION NUMBER |
| | 4 | STARTED TASK |
| | 5 | STARTED EXECUTION NUMBER |
| TASK DONE | 1 | MESSAGE TYPE |
| | 2 | TASK |
| RECORD ERROR | 1 | MESSAGE TYPE |
| | 2 | NEW FAULTY COMPUTER |
| | 3 | ERROR INDICATOR |
| TASK INPUT | 1 | MESSAGE TYPE |
| | 2-3 | TASK ADDRESS |
| THE FOLLOWING SET OF BYTES ARE REPEATED FOR EACH DATA VARIABLE USED AS A TASK INPUT. SEE TASK COMMUNICATOR DISCUSSION FOR MORE DETAIL. | | |
| | 4-11 | INPUT VALUE |
| | 12 | ACTUAL DELAY INTEGER |
| TASK OUTPUT | 1 | MESSAGE TYPE |
| THE FOLLOWING SET OF BYTES ARE REPEATED FOR EACH DATA VARIABLE COMPUTED AS A TASK OUTPUT. SEE TASK COMMUNICATOR DISCUSSION FOR MORE DETAIL. | | |
| | 2 | DATA I.D. |
| | 3 | REDUNDANT DATA |
| | 4-11 | OUTPUT VALUE |

FAULT HANDLER

The details of the Fault Handler 204 are shown in FIG. 5. The Fault Handler 204 comprises a Message Format Checker 216, Reasonable Limits Checker 218, Redundant Value Voter 220, Message Sequence Checker 222, Execution Time Checker 224, Synchronizer 226, Fault Tolerator 228, Fault Status Display Panel 230, and Start Fault Handler Module 231.

The Message Format Checker 216 receives the outputs from the Receivers 202a through 202k, merges the messages received into a single stream of data, and performs selected message format checks. The Message Format Checker 216 checks each received message to determine if the message type is valid, if the sending Computer identified in the message corresponds to the Receiver that received the message, and if the error detecting code is correct (checked in conjunction with the Receivers). A Record Error message is sent to a Fault Tolerator 228 when the message type is not valid, when the Computer identified in the message does not correspond to the Receiver receiving the message, or when an error is detected through use of the error detecting code.

The error-free messages passed by the Message Format Checker are received by one of a plurality of error detection modules or checkers, such as the Reasonable Limits Checker 218, Redundant Value Voter 220, Message Sequence Checker 222 or Execution Time Checker 224. The error detection module to which a message is communicated is determined by the message type; each message is usually further checked for errors by only one of the error detection modules.

The Reasonable Limits Checker 218 checks if the data value of a Task Data Value message is between predetermined minimum and maximum limits. It generates a Record Error message when the data value is outside the predetermined limits. Error-free Task Data Value messages are forwarded to the Fault Tolerator 228.

The Redundant Value Voter 220 receives the Redundant Data Value messages and generates a "voted data value" when a predetermined number of Redundant Data Value messages are received having the same sequence number and same data value for a given task data variable. The "voted data value" is the value of that data variable that will be used in the execution of any subsequent task requiring this data. The "voted data value" obtained is communicated in a Redundant Data Value message forwarded to the Task Communicator via the Fault Tolerator and Scheduler. After the "voted data value" is determined, a Record Error message is generated for any received message having a data value which does not agree with the "voted data value" for that sequence number of that data variable.

The Execution Time checker 224 comprises a plurality of "watch-dog timers", one for each Computer 10. Each "watch-dog timer" is started in response to a Task Completed/Started message received from the associated Computer. The "watch-dog timer" monitors the execution time of the task started by that Computer. A Record Error message is generated when the "watchdog timer" expires before a subsequent Task Completed/Started message is received, which indicates that the previously started task has been completed and another task has been started. Expiration of the watchdog timer indicates that the task was improperly executed. The Task Completed/Started messages are always forwarded to the Message Sequence Checker 222.

The Message Sequence Checker 222 checks that the Task Completed/Started and Task Unselected/Selected messages are received from each Computer in a correct sequential order. For example, a Task Completed/Started message, indicating that a particular task has been started, should have been preceded by a Task Unselected/Selected message from the same Computer indicating that the same task with the same execution number had been selected. In a like manner, a Task Completed/Started message should be preceded by a Task Completed/Started message from the same Computer in which the started task and execution number of the first message are the same as the completed task and execution number in the subsequent message. If the task numbers or execution numbers do not agree, a Record Error message is generated. Error-free Task Unselected/Selected and Task Completed/Started messages are forwarded to the Fault Tolerator.

Each Record Error message generated by the various fault detection modules is sent to the Fault Tolerator 228. Each Record Error message includes the identity of the Computer 10 which sent the message, and an identification of the particular error detected.

The error-free Sampling Number messages, after passing through the Message Format Checker, are received by the Synchronizer 226. The Synchronizer generates "initiate input/output tasks" messages in synchronization with the Synchronizer modules in other Computers in the system. At the end of each sampling period, the Synchronizer generates a Sampling Number message containing the current sampling number of the associated Computer. The Sampling Number messages are sent to all of the Computers in the system via the Transmitter 212, and are used to synchronize operations of like Synchronizers 226 in the other Computers 10.

In the event the Synchronizer's own Computer is starting after a momentary power interruption or other failure, the Synchronizer will also generate an "initiate start-up task" message and "initiate fail-safe task" messages. The "initiate input/output tasks", "initiate start-up task" and "initiate fail-safe task" messages are internal messages used by the Synchronizer's own Operations Controller. These messages are sent to the Scheduler 206 and are not communicated to the other Computers. Each of these messages is a particular version of the Initiate Special Tasks message listed in Table II-B.

The "initiate input/output tasks" message is sent to the Scheduler 206 to initiate scheduling of the input/output tasks assigned to its own Computer, in synchronization with all of the other Computers in the system. These input/output tasks perform sampling of system inputs and outputs, where the sampling must be synchronized between Computers. The sampling number generated by the Synchronizer becomes the execution number of the input/output tasks.

The "initiate start-up task" message initiates scheduling of the system start-up task(s) assigned to its own Computer, in synchronization with all the other Computers in the system. These start-up tasks perform any functions needed to properly start the operation of the other application tasks.

Finally, the "initiate fail-safe task" message initiates scheduling of the fail-safe task or tasks assigned to the Synchronizer's own Computer. The fail-safe tasks send out "safe" data values during a start or restart, to all actuators and displays connected to the Computer.

In addition, the Synchronizer 226 and Fault Tolerator 228 generate Restart messages when operation of the associated Operations Controller needs to be restarted. The Restart messages initiate start-up procedures within the Scheduler 206, Task Communicator 208, and Fault Handler 204, which initializes the variable data used within those units. Within the Fault Handler, the Restart messages are sent to the Start Fault Handler Module 231, which initialize variable data within the checkers and the Fault Tolerator 228.

The error-free Task Data Value messages, the Redundant Data Value messages which convey a "voted data value", the Task Completed/Started messages, the Task Unselected/Selected messages, and the Error messages are received by the Fault Tolerator 228. The Fault Tolerator also receives the Record Error messages generated by the Message Format Checker 216, Reasonable Limits Checker 218, Redundant Value Voter 220, Execution Time Checker 224, Message Sequence Checker 222, and Synchronizer 226.

The function of the Fault Tolerator 228 is to pass on to the Scheduler 206 only those error-free messages received from Computers which are not deemed to be faulty. The Fault Tolerator maintains, for each Computer in the system, an indication of whether or not that Computer is currently deemed to be faulty. Whenever an error-free message is received from a Computer which is not considered faulty, that message is forwarded to the Scheduler. Messages from faulty Computers and erroneous messages are discarded. These actions are performed for Task Data Value, Task Completed/Started, and Task Unselected/Selected messages. Redundant Data Value messages which convey a "voted data value" are always forwarded to the Scheduler, even though the sending Computer may be deemed faulty. Error and Record Error messages are used and not forwarded by the Fault Tolerator.

When a Record Error message is received from the Message Format Checker 216, Reasonable Limits Checker 218, Redundant Value Voter 220, Message Sequence Checker 222, Execution Time Checker 224, or Synchronizer 226, the Computer which sent the erroneous message is recorded as being faulty, and an Error message is generated identifying the Computer which sent the message. The Error message is sent out to all Computers via the Transmitter 212. An internal Exclude Computer message identifying the faulty Computer is sent to the Scheduler 206.

The Fault Tolerator 228 also responds to the Error messages received from other Computers, and will conclude that a Computer is faulty when a predetermined number of Computers have sent Error messages identifying that particular Computer as faulty, even though an error has not been detected by an error detection module in its own Computer. As before, when the Fault Tolerator decides that a Computer is now faulty, it sends an Exclude Computer message to the Scheduler.

If the number of Computers sending Error messages identifying a particular Computer as faulty is less than the predetermined number, the Computer is assumed to be healthy since the received Error message(s) may be the result of malfunctions in the Computers sending the Error messages or their associated communication links. The Computer or Computers which sent these Error messages will discard messages from the Computer deemed faulty; however, the remaining Computers will treat that same Computer as healthy and will accept the messages as if no Error messages were received. In all cases where one of the Computer's own checkers or the Synchronizer send an internal Record Error message indicating a detected error or fault, that Computer will deem the Computer faulty and will discard all messages received from that Computer; this continues until it is concluded that the fault was temporary and the faulty Computer has recovered.

Although the Fault Tolerator 228 will discard messages received from Computers deemed to be faulty, the Message Format Checker 216, Reasonable Limits Checker 218, Redundant Value Voter 220, Message Sequence Checker 222, Execution Time Checker 224, and Synchronizer 226 will continue to check each message received from all Computers. The Fault Tolerator continues to monitor the messages received from the Computer deemed to be faulty. The Fault Tolerator will decided that a Computer is no longer faulty when, during a predetermined time period, its own checkers do not detect an error and simultaneously the number of Computers generating Error messages identifying the faulty Computer is less than the required predetermined number. When it is determined that a Computer is no longer faulty, the Fault Tolerator will generate an "Exclude Computer" message which shows that the previously excluded Computer is no longer excluded. The "Exclude Computer" message is communicated to the Scheduler 206, where it cancels the current exclusion status of the identified Computer, and the previously excluded Computer is thus readmitted to full participation in the system.

The Fault Tolerator 228 further generates signals activating a Fault Status Display Panel 230 identifying the Computers deemed to be faulty or excluded. The Fault Status Display Panel 230 may be an externally mounted display panel readily visible to the operator, and/or may be placed inside the Computer cabinet adjacent to the particular Operations Controller hardware. Each Computer in the system has its own display panel, and each display panel has at least two lamps or indicators for each Computer in the system. Both of the lamps are activated when the corresponding Computer has been deemed to be faulty by the Operations Controller associated with the particular display, and the faulty Computer is presently excluded from the system. The first lamp is turned "off" when the Computer is readmitted; however, the second lamp is left on indicating that the Computer had previously been excluded. The in-cabinet mounting of the display panel is desirable, since the display will be conveniently available to service personnel during maintenance or servicing of the system.

The operation of the Fault Handler 204 is as follows: Messages from the Computers in the Fault-Tolerant Multi-Computer System are received by the individual Receivers 202 connected to the respective communication links. The Receivers 202 check the error detection code, the length of the message, etc. The received message is then forwarded to the Message Format Checker 216, along with information identifying the Receiver which received the message. If an error is detected by a Receiver, information identifying the type of error detected is communicated to the Message Format Checker 216. Because the messages are randomly received at the individual Receivers 202, and may be received at a rate too fast for immediate processing by the Message Format Checker 216, the messages are placed in a temporary storage buffer associated with each Receiver, until they can be checked by the Message Format Checker. Each temporary storage buffer is able to store about ten messages at any time.

Each received message contains additional bytes or bits of information, such as the message error detecting code, start of message and end of message codes, and character error detecting/correcting codes, which are only used by the Receivers. These additional bits of information are stripped from the message before it is forwarded to the buffer and Message Format Checker 216.

The Message Format Checker 216 interrogates the buffers associated with each Receiver 202 in a cyclical manner, and checks each received message. It checks if an error was detected by the Receiver, if the message type is a valid message type, and if the Receiver which received the message is associated with the particular Computer which originated the message. If the Message Format Checker detects an error, it sends a Record Error message to the Fault Tolerator 228. If no error is detected, the received message is forwarded to the appropriate Fault Handler module.

Subsequent operation of the Fault Handler depends upon the message type. Operation will thus be discussed for each message type.

Error-free Task Data Value messages, passed by the Message Format Checker 216, are forwarded to the Reasonable Limits Checker 218. The Reasonable Limits Checker checks each Task Data Value message and forwards it to the Fault Tolerator 228 if no error is detected. The Fault Tolerator checks if the Computer which sent the message is currently considered to be faulty. If that Computer is not faulty, the Task Data Value message is forwarded to the Scheduler 206; otherwise, the message is discarded. If the Reasonable Limits Checker detects an error, it sends a Record Error message to the Fault Tolerator 228.

Each error-free Redundant Data Value message, passed by the Message Format Checker 216, is forwarded to the Redundant Value Voter 220. The Redundant Value Voter compares the value of the data variable contained in the received message with the values of that data variable contained in previously received Redundant Data Value messages. If the data value contained in the received Redundant Data Value message agrees with the values in a predetermined number of previously received Redundant Data Value messages, a "voted data value" is obtained. The Redundant Data Value message containing the "voted data value" is forwarded to the Scheduler 206 through the Fault Tolerator 228. When a "voted data value" is obtained, and the value contained in a previously received Redundant Data Value message disagrees with the "voted data value" just obtained, a Record Error message is also transmitted to the Fault Tolerator identifying the Computer which sent the disagreeing data value. If the Redundant Data Value message does not produce a "voted data value", the Redundant Data Value message is discarded. If after a "voted data value" is obtained, the value of the data variable contained in a subsequent Redundant Data Value message disagrees with the "voted data value", a Record Error message is transmitted to the Fault Tolerator 228.

Each error-free Task Unselected/Selected message, passed by the Message Format Checker 216, is forwarded to the Message Sequence Checker 222. The Message Sequence Checker checks the message for scheduling sequence errors, and forwards it to the Fault Tolerator 228 if no errors are detected. The Fault Tolerator checks if the Computer which sent the message is currently considered to be faulty. If that Computer is not faulty, the error free Task Unselected/Selected message is forwarded to the Scheduler 206; otherwise, the message is discarded. If the Sequence Checker detects an error, it sends a Record Error message to the Fault Tolerator 228.

Each error-free Task Completed/Started message, passed by the Message Format Checker 216, is forwarded to the Execution Time Checker 224. The Execution Time Checker starts a watch-dog timer and forwards the message to the Message Sequence Checker 222. The Message Sequence Checker checks each message and forwards it to the Fault Tolerator 228, if no error is detected. The Fault Tolerator checks if the Computer which sent the message is currently considered to be faulty. If that Computer is not faulty, the Task Completed/Started message is forwarded to the Scheduler 206; otherwise, the message is discarded. If the watch-dog timer for a Computer expires before it is restarted by a subsequent Task Completed/Started message, the Execution Time Checker 224 sends a Record Error message to the Fault Tolerator 228. If the Message Sequence Checker detects an error, it sends a Record Error message to the Fault Tolerator.

Each error-free Sampling Number message, passed by the Message Format Checker 216, is forwarded to the Synchronizer 226. The Synchronizer compares the Sampling Number messages. Sampling Number messages are not passed on to the Fault Tolerator 228. However, the Synchronizer periodically generates a new Sampling Number message, sending it to the Transmitter 212. The Synchronizer compares the sampling number contained in each received Sampling Number message with the sampling numbers contained in previously received Sampling Number messages and with the previously determined "voted sampling number". If the sampling number contained in the received Sampling Number message agrees with a predetermined number of sampling numbers contained in previously received Sampling Number messages, a new "voted sampling number" is obtained and an "initiate input/output tasks" message is sent to the Scheduler 206. If the Sampling Number message produces a new "voted sampling number", and if the sampling number given in a previously received Sampling Number message disagrees with the "voted sampling number" just obtained, a Record Error message is sent to the Fault Tolerator 228.

Each error-free Error message is forwarded directly to the Fault Tolerator 228 from the Message Format Checker 216. The Fault Tolerator compares this message with previously received Error messages. If the Fault Tolerator decides that a particular Computer is faulty, based upon a predetermined number of Error messages naming that Computer, the Fault Tolerator will thereafter consider that Computer to be faulty. If that Computer was not previously considered to be faulty, the Fault Tolerator sends an internal Exclude Computer message to the Scheduler 206. The Fault Tolerator also activates the lamps in the Fault Status Display Panel 230 associated with the Computer which is now considered to be faulty. The Display Panel indicates those Computers which are presently excluded, as well as any Computer which was at one time excluded but has subsequently been readmitted into the system.

When a Record Error message is received by the Fault Tolerator 228, from the Message Format Checker 216, Reasonable Limits Checker 218, Redundant Value Voter 220, Message Sequence Checker 222, Execution Timer Checker 224, or Synchronizer 226, the Fault Tolerator thereafter considers the Computer identified in the Record Error message to be faulty. If a specified time interval has passed since an Error message was sent regarding that Computer, an Error message is sent to the Transmitter 212 for transmission to all Computers. If that Computer was not previously considered to be faulty, the Fault Tolerator sends an Exclude Computer message to the Scheduler 206. The Fault Tolerator also activates the lamps in the Fault Status Display Panel 230 associated with the Computer which is now considered to be faulty.

When the Fault Tolerator excludes a Computer, it checks for certain abnormal conditions. If the excluded Computer is the Fault Tolerator's own Computer, it restarts its own Computer. Similarly, if the number of excluded Computers exceeds a predetermined number, it restarts its own Computer. The number of excluded Computers could exceed the predetermined when its own Computer is faulty, or when some common fault produces errors in many Computers. To restart its own Computer, the Fault Tolerator sends a Restart message to the Start Fault Tolerator Module 231 and to the Scheduler 206.

The Fault Tolerator also monitors the elapsed time since a Computer was last deemed to be faulty, in response to either an internal Record Error message or matching Error messages received from other Computers. When a faulty (excluded) Computer transmits error-free messages for a predetermined length of time, the Fault Tolerator reverses the excluded status for that Computer and readmits that Computer into active participation in the system. When such a decision is made, the Fault Tolerator sends an Exclude Computer message to the Scheduler 206. The Exclude Computer message shows the readmitted Computer as not (presently) excluded. The Fault Tolerator also deactivates the presently excluded lamp in the Fault Status Display Panel associated with the Computer no longer excluded. However, it leaves on the lamp indicating that the Computer was excluded at one time.

When the Computer is starting after being turned on, or restarting after a momentary power failure or interruption, the Synchronizer 228 starts its sampling period timer, and transmits an internal Restart message to the Start Fault Handler Module 231 and the Scheduler 206. The Start Fault Handler Module initilizes internal data for the Fault Tolerator 228, Redundant Value Voter 220, Message Sequence Checker 222, and Execution Time Checker 224. The Synchronizer then generates an internal "initiate fail-safe task" message which is transmitted to the Scheduler 206. The Synchronizer continues to generate the "initiate fail-safe task" message at periodic intervals until a predetermined number of Computers are operating and their sampling period timers and sampling numbers are synchronized.

When the sampling period timer expires, the Synchronizer restarts the sampling period timer and generates a Sampling Number message containing its current sampling number. This message is sent via the Tansmitter 212 to all of the Computers in the system. Concurrently, the other Computers are generating similar Sampling Number messages, whether they are also starting, or are operating normally. The Synchronizer accepts the Sampling Number messages received from all Computers and attempts to determine the current sampling number of the system. The Sampling number is determined by a voting process, i.e, a sampling number on which at least a predetermined number of Computers agree. Once this "voted sampling number" is determined, the Synchronizer uses the "voted sampling number" as its own sampling number and synchronizes its sampling period timer with all the other sampling period timers in the system.

When the "voted sampling number" is first obtained and the sampling period timer is synchronized, the Synchronizer sends an internal "initiate start-up task" message to the Scheduler 206. The "initiate start-up task" message causes the Scheduler 206 to initiate scheduling of special start-up task(s) assigned to the Computer. The Synchronizer also generates an internal "initiate input/output tasks" message when a "voted sampling number" is obtained, which is sent to the Scheduler 206.

As previously indicated, the "initiate input/output tasks" message initiates scheduling of the input/output tasks which sample the system inputs and outputs. Sampling is done by the input/output tasks using the Input/Output Network 108 of the Applications Computer, to receive input data from the Sensors and Manual Controls 14 and to output data to the Actuators and Displays as shown on FIG. 3. The execution number used for the initiated input/output tasks is the current sampling number of the Synchronizer. The Computer thereafter receives messages from the other Computers, and new input data from the sensors and manual controls, and assumes normal active participation in the Fault Tolerant Multi-Computer System.

The preferred implementation of the Fault Handler is one, or possibly several, microprocessors having adequate storage and computational capabilities, such as the 8080A Microprocessor manufactured by the Intel Corporation of Santa Clara, Calif. or any other microcomputer of similar type. However, if desired, the Fault Handler may be made from commercially available discrete electronic components, as shall be shown by way of example in the following description of the individual modules of the Fault Handler.

The individual modules of the Fault Handler will be described in the following sections by means of Psuedo Code computer program listings. Psuedo Code is used for the program listings because it is not dedicated to a particular microprocessor or type of microprocessor, and is universally applicable to different types of computers and computer languages. A programmer having ordinary skills in the art would be able to translate the presented Psuedo Code program listings into actual program listings for a particular computer.

MESSAGE FORMAT CHECKER

Figure 6A:
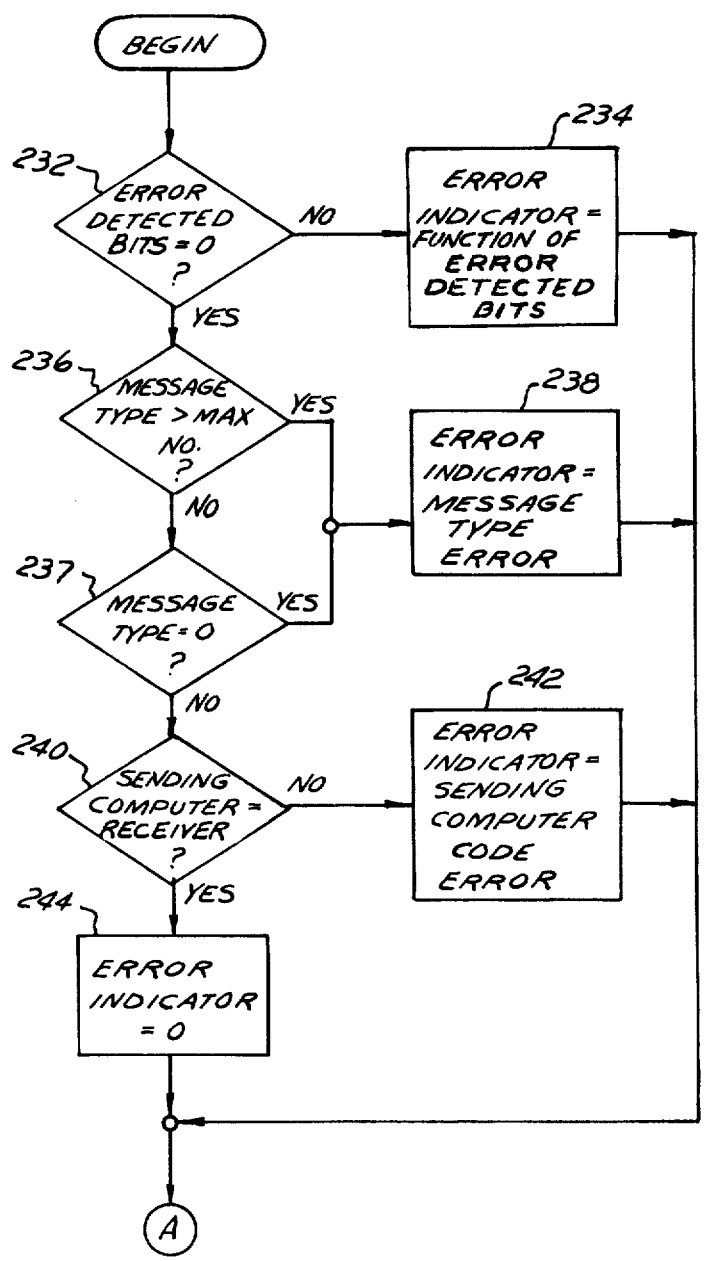

The Psuedo Code program for the Message Format Checker 216 is given in Table III-A and a comparable flow diagram is shown on FIG. 6. The Message Format Checker module checks all messages received from all Computers 10, via the Receivers 202. The portions of the received message that are checked by the Message Format Checker are the first byte of the message which identifies the message type, the second byte which identifies the Computer sending the message, and the special bits generated by the Receiver which identify the Computer connected to that Receiver and any errors detected by the Receiver. As previously discussed, each Receiver 202 receives messages from a particular Computer and the Operations Controller has a plurality of Receivers 202, each receiving only the messages sent by a specified Computer in the system. In the given example, it is assumed that a special byte generated by the Receiver 202 is identical to the expected second byte of the message, which identifies the Computer which sent the message.

TABLE III-A

MESSAGE FORMAT CHECKER

```
/* IF ERROR DETECTED BY RECEIVER */
IF ERROR DETECTED BITS NOT = 0
THEN
ERROR INDICATOR =
FUNCTION OF (ERROR DETECTED BITS)
ELSE /*IF MESSAGE TYPE CODE NOT VALID*/
IF MESSAGE TYPE > MAXIMUM TYPE
ORIF MESSAGE TYPE = 0
THEN
ERROR INDICATOR = MESSAGE TYPE ERROR
ELSE /*CHECK SENDING COMPUTER CODE*/
IF SENDING COMPUTER NOT = RECEIVER
THEN
ERROR INDICATOR =
SENDING COMPUTER CODE ERROR
ELSE
ERROR INDICATOR = 0
ENDIF
ENDIF
ENDIF
IF ERROR
INDICATOR NOT = 0 /* IF ERROR WAS DETECTED*/
THEN
CALL: SEND MESSAGE TO FALUT TOLERATOR
INPUT DATA:
MESSAGE TYPE = RECORD ERROR TYPE
NEW FAULTY COMPUTER = RECEIVER
ERROR INDICATOR = ERROR INDICATOR
OUTPUT DATA: NONE
ELSE /*FORWARD RECEIVED MESSAGE*/
/*CASE OF MESSAGE TYPE*/
IF MESSAGE TYPE = TASK DATA VALUE TYPE
THEN
CALL: SEND MESSAGE TO
REASONABLE LIMITS CHECKER
INPUT DATA: MESSAGE = RECEIVED MESSAGE
OUTPUT DATA: NONE
ELSE IF MESSAGE TYPE =
REDUNDANT DATA VALUE
TYPE
THEN
CALL: SEND MESSAGE TO REDUNDANT VALUE
VOTER
INPUT DATA: MESSAGE = RECEIVED MESSAGE
OUTPUT DATA: NONE
ELSE IF MESSAGE TYPE =
TASK COMPLETED/STARTED TYPE
THEN
CALL: SEND MESSAGE TO EXECUTION TIME
CHECKER
INPUT DATA: MESSAGE = RECEIVED MESSAGE
OUTPUT DATA: NONE
ELSE IF MESSAGE TYPE =
TASK UNSELECTED/SELECTED TYPE
THEN
CALL: SEND MESSAGE TO
MESSAGE SEQUENCE CHECKER
INPUT DATA: MESSAGE = RECEIVED MESSAGE
```

TABLE III-A-continued
MESSAGE FORMAT CHECKER

```
OUTPUT DATA: NONE
ELSE IF MESSAGE TYPE = SAMPLING NUMBER TYPE
THEN
CALL: SEND MESSAGE TO SYNCHRONIZER
INPUT DATA: MESSAGE = RECEIVED MESSAGE
OUTPUT DATA: NONE
ELSE /*MESSAGE TYPE = ERROR MESSAGE TYPE*/
CALL: SEND MESSAGE TO FAULT TOLERATOR
INPUT DATA: MESSAGE = RECEIVED MESSAGE
OUTPUT DATA: NONE
ENDIF ENDIF ENDIF ENDIF ENDIF
/*END CASE*/
ENDIF
RETURN
END:
```

Referring to the Psuedo Code program in Table III-A and flow diagram of FIG. 6, the Message Format Checker 216 first checks if an error was detected by the Receiver, as shown in the flow diagram by block 232. The symbols "/*" and "*/" are used in the first line of Table III-A and thereafter to indicate that the enclosed text is a comment in the Psuedo Code and not part of the actual code. The enclosed text is only a comment explaining the following line. For example, the enclosed text on line one of Table III-A identifies the "ERROR DETECTED BITS" of line two as the error detected signals generated by the Receiver. If the error detected bits obtained from the Receiver are not equal to zero (0), where zero values of the error detected bits are indicative of no error detected by the Receiver, then a Record Error message is generated as indicated by block 234, identifying that an error was detected by the Receiver and the checking is terminated (third ENDIF). The error indicator code designating the type of error detected is generated as a function of the error detected bits obtained from the receiver.

If no error was detected by the Receiver, the Message Format Checker proceeds (ELSE) to check the message type code as indicated by block 236. If the message type code is a number greater than the constant maximum inter-computer message type number used in the system, or if it is equal to zero as checked by block 237, then a Record Error message is generated as indicated by block 238, and the checking is terminated (second ENDIF). The error indicator code is set equal to the fixed value which identifies the error as a message type error.

If the message type code is not equal to zero (0) and is not greater than the maximum type number, the program proceeds (ELSE) to compare the sending Computer byte of the message with the Computer code generated by the Receiver, as indicated by block 240. If the sending Computer code contained in the message does not agree with the Computer code generated by the Receiver, a Record Error message is generated as indicated by block 242 and the checking is terminated (first ENDIF). The error indicator is set equal to the fixed value which identifies the error as a sending Computer code error. If no error in the sending Computer code is found, the error indicator is set to zero (0) as indicated by block 244, and the checking is ended. The error indicator value of zero indicates that no error was detected.

In the Psuedo Code program Table III-A and flow diagram FIG. 6, a Record Error message is "generated" when an error is detected by making the error indicator non-zero. Following the checking (the third ENDIF), the error indicator is tested to determine if a Record Error message must be sent, as indicated by block 233. If the error indicator is not zero, (THEN) a Record Error message is sent to the Fault Tolerator, as indicated by block 235. If the error indicator is zero (ELSE), the received message must be forwarded to the proper checker module. The message type code is then tested to determine the message type.

If the message type is a Task Data Value message as tested by block 259, the received message is sent to the Reasonable Limits Checker 218, as indicated by block 239. If the message type is a Redundant Data Value message as tested by block 241, the received message is sent to the Redundant Value Voter 220, as indicated by block 243. If the message type is a Task Completed/Started message as tested by block 245, the received message is sent to the Execution Time Checker 224, as indicated by block 247.

If the message type is a Task Unselected/Selected message as tested by block 249, the received message is sent to the Message Sequence Checker 222, as indicated by block 251. If the message type is a Sampling Number message as tested by block 253, the received message is sent to the Synchronizer 226, as indicated by block 255. If the message type is not any of the other types, it must be an Error message, and the received message is sent to the Fault Tolerator 228, as indicated by block 257.

As is evident from the above description of the Message Format Checker, the Psuedo Code program of Table III-A is a short hand text description of the flow diagram shown in FIG. 6. This short hand description is comparable to the high level programming languages presently being used in computer systems.

Figure 7:
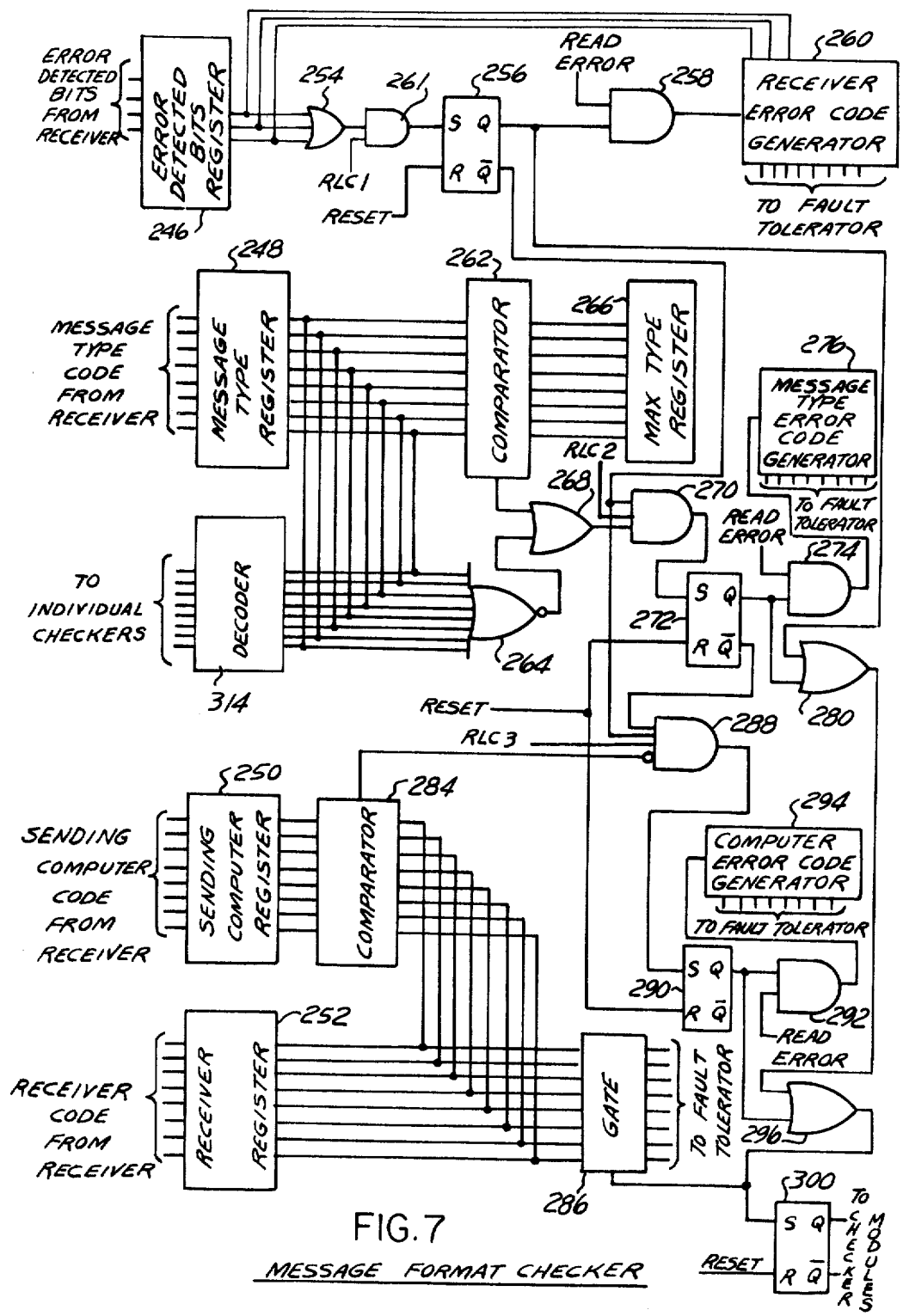
FIG. 7 is a circuit implementation of the Message Format Checker.

A hardware circuit implementation of the Message Format Checker is illustrated on FIG. 7. The Message Format Checker has five registers, the Error Detected Bits Register 246, the Message Type Register 248, the Sending Computer Register 250, the Receiver Register 252 and the Maximum Type Register 266. These registers may be individual elements as shown, or may be portions of larger storage elements such as a random access (RAM) memory as is known in the art.

The outputs of the Error Detected Bits Register 246 are connected to the inputs of a multiple input OR Gate 254 and to Receiver Error Code Generator 260. The output of OR Gate 254 is connected to the SET input of Flip Flop 256 through AND Gate 261 AND Gate 261 receives a timing signal RLCl at its other input. Flip Flop 256 has its Q output connected to one input of OR Gate 280 and one input of AND Gate 258. The $\bar{Q}$ output of Flip Flop 256 is connected to inputs of AND Gates 270 and 288. The RESET input of Flip Flop 256 receives a RESET signal. A Read Error signal is received at the other input of AND Gate 258. The output of AND Gate 258 is connected to the enable input of a Receiver Error Code Generator 260, which generates one of a set of predetermined coded signals when enabled. The particular code is selected by the error detected bits input from the Error Detected Bits Register 246.

The Message Type Register 248 receives the message type byte from the Receiver. The multiple outputs of the Register 248 are connected in parallel to the inputs of the Comparator 262, to the inputs of a multiple input NOR Gate 264, and to the parallel inputs of Decoder 314. The outputs of Decoder 314 are connected to the various checker modules such as the Message Sequence Checker 222, Execution Time Checker 224, Reasonable Limits Checker 218, Redundant Value Voter 220, Fault Tolerator 228, and Synchronizer 226. The Maximum Type Register 266 stores a fixed number indicative of the maximum message type code. The multiple outputs of Register 266 are connected in parallel to Comparator 262. The Comparator 262 is of a known type which generates an output signal when the numerical value of the message type code stored in Register 248 is greater than the maximum type code stored in Register 266.

The output of Comparator 262 and the output of NOR Gate 264 are connected to different inputs of an OR Gate 268. The output of OR Gate 268 is connected to an AND Gate 270, the output of which is connected to the SET input of Flip Flop 272. AND Gate 270 receives a timing signal RLC-2 at its other input. The Q output of Flip Flop 272 is connected to one input of an AND Gate 274 and of OR Gate 280. AND Gate 274 also receives the Read Error signal at is other input, and its output is connected to a Message Type Error Code Generator 276. The Message Type Error Code Generator 276 is similar to the Receiver Error Code Generator 260. The output of OR Gate 280 is connected to an input of OR Gate 296. The RESET input of Flip Flop 272 receives the RESET signal, and the $\overline{Q}$ output of Flip Flop 272 is connected to an input of AND Gate 288.

The Sending Computer Register 250 receives the sending computer byte contained in the received message. The parallel outputs of the Sending Computer Register 250 are connected in parallel to the parallel inputs to Comparator 284. The Receiver Register 252 receives the receiver code generated by the Receiver, indicative of the Receiver which received the message. The parallel outputs of the Receiver Register 252 are connected to a Gate 286, and to Comparator 284.

The output of Comparator 284, indicative that the computer codes stored in the Sending Computer Register 250 and the Receiver Register 252 are alike, is connected to an inverted input of AND Gate 288. AND Gate 288 also receives timing signal RLC-3. The output of AND Gate 288 is connected to the SET input of Flip Flop 290. The Q output of Flip Flop 290 is connected to one input of an AND Gate 292 and to an input to OR Gate 296. The other input to AND Gate 292 receives the Read Error signal. The output of AND Gate 292 is connected to a Computer Error Code Generator 294, which is comparable to the Message Type Error Code Generator 276 and Receiver Error Code Generator 260.

The Receiver Error Code Generator 260, Message Type Error Code Generator 276 and Computer Error Code Generator may be separate elements as shown, or may be codes stored in a common read only (ROM) memory addressed by the outputs of the respective AND Gates 258, 274 and 292 and the Error Detected Bits Register 246. This read only memory may also store the maximum type number shown as being stored in Register 266.

The output of OR Gate 296 is connected to the Enable input of Gate 286 and to the SET input of Flip Flop 300. The RESET signal is also received at the RESET inputs of Flip Flops 290 and 300.

The operation of the Message Format Checker is as follows: Flip Flops 256, 272, 290, and 300 are first placed in a reset state by the RESET signal, while the Error Detected Bits generated by the Receiver 202, the message type byte of the received message, the sending computer byte of the message, and the receiver byte generated by the Receiver are stored in Registers 246, 248, 250, and 252, respectively.

The parallel outputs of the Error Detected Bits Register 246 are or'ed in OR Gate 254, whose output is a logical zero when no errors were detected by the Receiver, and is a logical one when the Receiver detected an error. A logical one output of OR Gate 254 is received by AND Gate 261 which sets Flip Flop 256 in response to timing signal RLC-1, causing its $\overline{Q}$ output to assume a logical one state, and its Q output to go to a logical zero. The timing signals RLC-1, RLC-2 RLC-3 are sequentially generated as indicated on FIG. 10. The logical one at the Q output of Flip Flop 256 enables AND Gate 258, which permits the Receiver Error Code Generator 260 to be enabled by a Read Error signal received at the other input of AND Gate 258. The logical one at the Q output of Flip Flop 256 is also transmitted to the set input of Flip Flop 300 through OR Gates 280 and 296. The logical one signal applied to the set input of Flip Flop 300 causes Flip Flop 300 to switch to the set state, indicating that an error has been detected by the Message Format Checker. In the SET state, the $\overline{Q}$ output of Flip Flop 256 is a logical zero which disables AND Gates 270 and 288, effectively terminating continued checking by the Message Format Checker.

If all of the error detected bits from the Receiver are logical zeros, the Flip Flop 256 remains in the RESET state, with its Q output a logical zero and its $\overline{Q}$ output a logical one. The logical zero Q output of Flip Flop 256 disables AND Gate 258, preventing the generation of a receiver error code by the Receiver Error Code Generator 260. The logical one $\overline{Q}$ output of Flip Flop 256 enables AND Gates 270 and 288.

The Message Type Register 248 and the Maximum Type Register 266 output their stored code numbers to the Comparator 262. The Comparator 262 compares the message type with the maximum type and generates a logical one signal if the message type is a number greater than the maximum type. A logical one output of Comparator 262 is applied to one input of AND Gate 270 through OR Gate 268. If AND Gate 270 is enabled by a logical one $\overline{Q}$ output of Flip Flop 256, the timing signal RLC-2 produces a logical one signal transmitted to the SET input of Flip Flop 272. This causes Flip Flop 272 to assume the SET state in which the Q output is a logical one and the $\overline{Q}$ output is a logical zero. The logical one Q output of Flip Flop 272 is applied to one input of AND Gate 274 and to the SET input of Flip Flop 300 through OR Gates 280 and 296. A Read Error signal applied to the other input of AND Gate 274 energizes the Message Type Error Code Generator 276 to generate a message type error code for a Record Error message transmitted to the Fault Tolerator.

NOR Gate 264 monitors the outputs of the Message Type Code Register and generates a logical one signal at its output when the message type code is zero. The output of NOR Gate 264 is applied to one input of AND Gate 270 through OR Gate 268. Again, if AND Gate 270 is enabled by a logical one signal generated at the $\overline{Q}$ output of Flip Flop 256, Flip Flop 272 will be placed in the SET state by timing signal RLC-2. The Message Type Error Code Generator 276 will be enabled by a subsequent Read Error signal applied to the other input of AND Gate 274. The $\overline{Q}$ output of Flip Flop 272 is applied to an input of AND Gate 288, which is enabled when Flip Flop 272 is in the RESET state and disabled when Flip Flop 272 is in the SET state.

If the message type code stored in Register 248 is less than the maximum type stored in Register 266, and is not zero, the signal applied to the input of AND Gate 270 through OR Gate 268 is a logical zero and Flip Flop 272 remains in its RESET state. With Flip Flop 272 in its RESET state, its Q output is a logical zero and the Message Type Error Code Generator is not energized in response to a Read Error signal applied to the other input of AND Gate 274.

The sending computer code and the receiver code are compared in Comparator 284, which generates a logical one output when the two computer codes are identical, and a logical zero output when the two computer codes are different. The output of Comparator 284 is applied to an inverting input of AND Gate 288, and enables AND Gate 288 when the output of Comparator 284 is a logical zero and disables AND GATE 288 when the output of Comparator 284 is a logical one. If AND Gate 288 is enabled by Flip Flop's 256 and 272 being in their RESET state, a logical zero output of Comparator 284 and the timing signal RLC-3 will cause AND Gate 288 to generate a logical one signal placing Flip Flop 290 in its SET state. In the SET state, Flip Flop 290 generates a logical one signal at its Q output which is applied to one input of AND Gate 292 and to the SET input of Flip Flop 300 through OR Gate 296. With AND Gate 292 enabled by the logical one signal at the Q output of Flip Flop 290, the Read Error signal, applied to the other input of AND Gate 292, will enable the Computer Error Code Generator 294 to generate a computer error code for a Record Error message which is communicated to the Fault Tolerator.

If the output of Comparator 284 is a logical one, AND Gate 288 is disabled and Flip Flop 290 remains in its RESET state, disabling AND Gate 292. With AND Gate 292 disabled, a Read Error signal applied to its other input is incapable of energizing the Computer Error Code Generator 294 and no error code is generated.

The logical one signal applied to the SET input of Flip Flop 300, when either Flip Flop 256, 272, or 290 is placed in its SET state in response to the detection of an error, it also applied to the ENABLE input of Gate 286 which causes the Receiver code to be transmitted to the Fault Tolerator. This corresponds to sending a Record Error message to the Fault Tolerator.

If Flop Flop 300 is not placed in the SET state, the $\overline{Q}$ output is a ONE enabling the message checker modules. The Message Type byte stored in Register 248 is input to Decoder 314. The Decoder 314 decodes the message type and generates an enabling signal on one of six output lines. Each of the six output lines is connected to one of the six modules which will check or use the message, namely the Reasonable Limits Checker 218, the Redundant Value Voter 220, the Message Sequence Checker 222, the Execution Time Checker 224, the Fault Tolerator 228, and the Synchronizer 226. This corresponds to sending the received message on to one of these modules, depending upon the message type.

The states of Flip Flops 256, 272, and 290, respectively, are equivalent to the results of the first three "IF" decisions of the Psuedo Code program, and indicate whether or not an error was detected by the Receiver or the Message Format Checker. The sequential operation of these "IF" decisions are controlled by the timing signals RLC-1, RLC-2 and RLC-3 applied to AND Gates 261, 270, and 288. The operation of the circuit, shown on FIG. 7, is functionally equivalent to the Pseudo Code program in Table III-A and the flow diagram shown on FIG. 6.

REASONABLE LIMITS CHECKER

Figure 8:
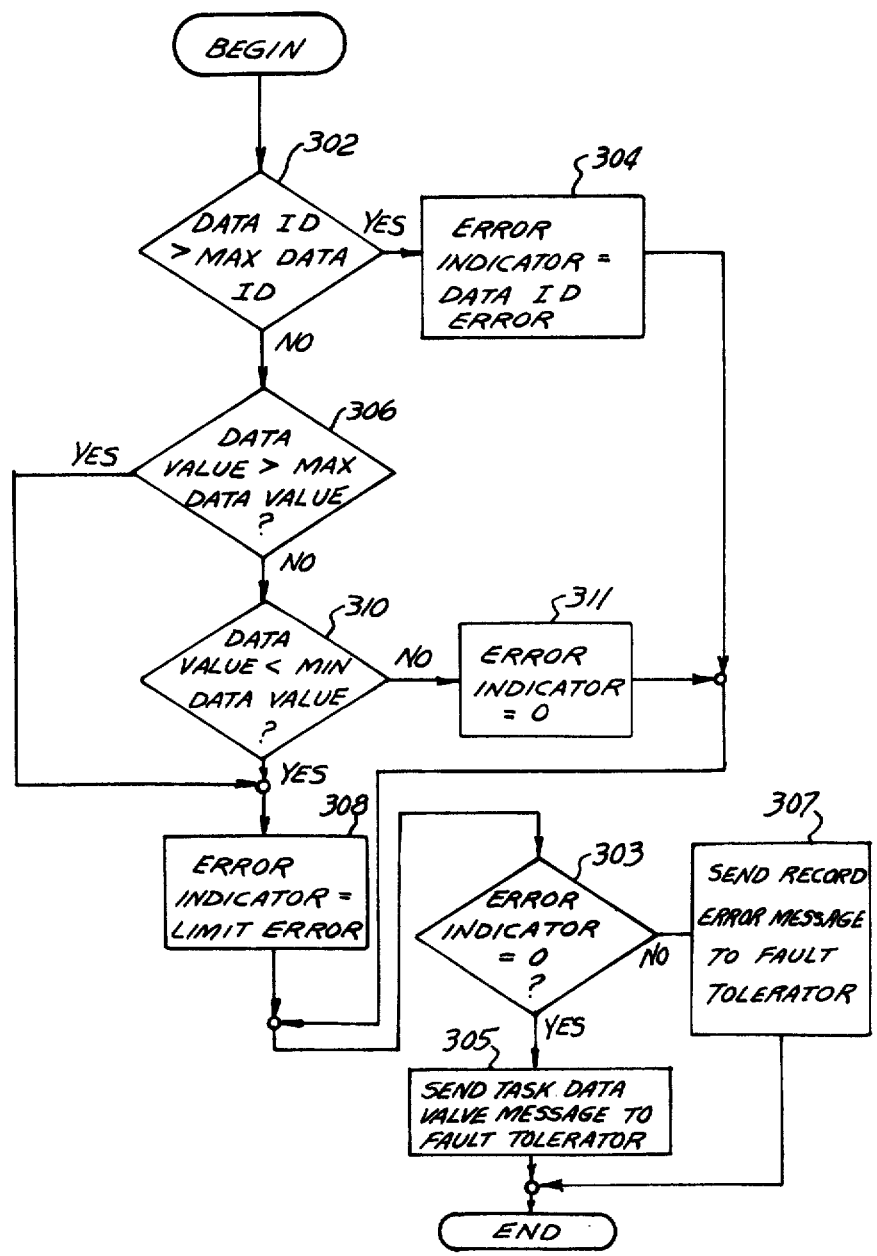
FIG. 8 is a flow diagram for the Reasonable Limits Checker.
Figure 9:
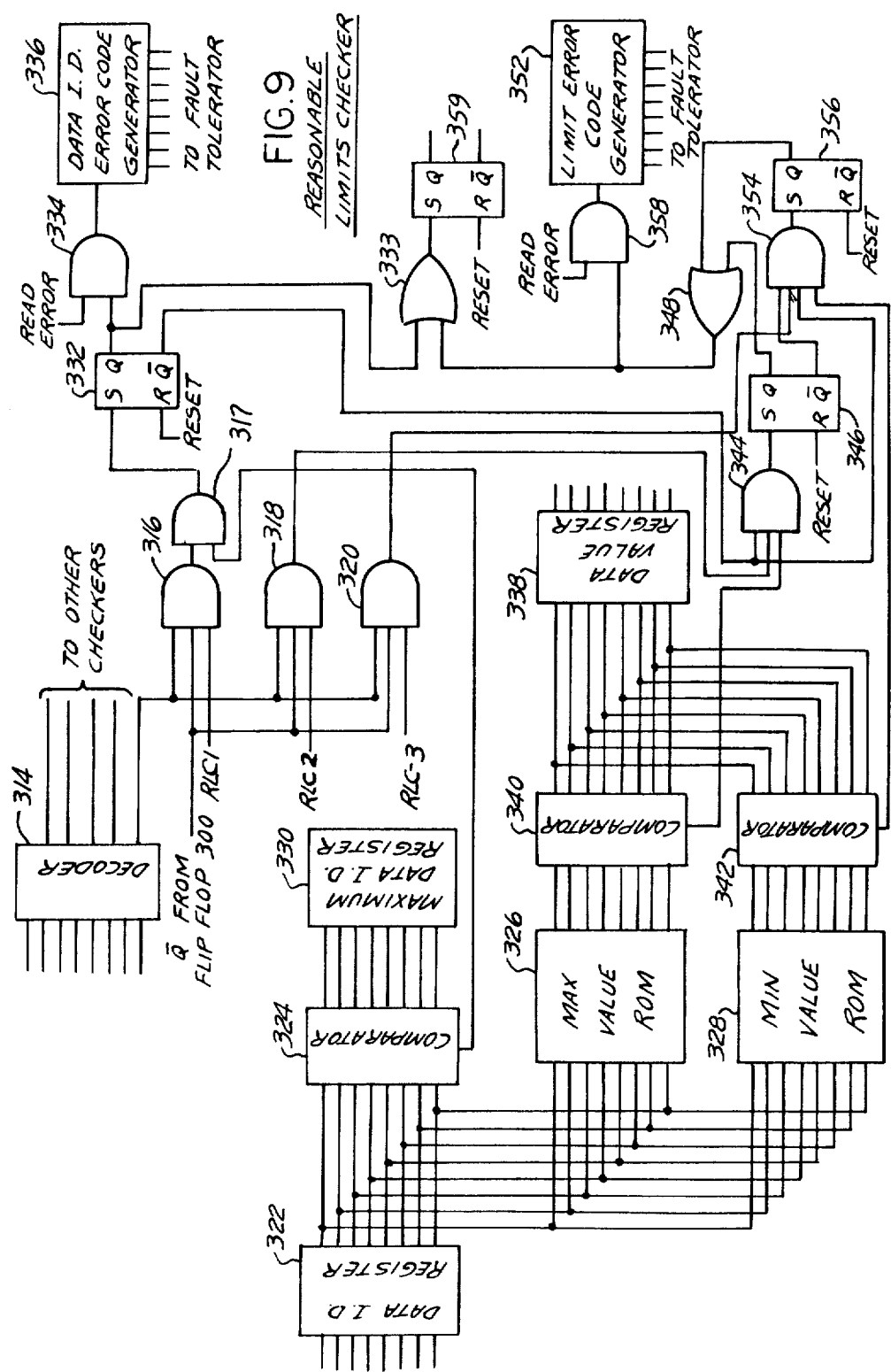
FIG. 9 is a circuit implementation of the Reasonable Limits Checker.

The Psuedo Code program for the Reasonable Limits Checker 218 is given on Table III-B, the corresponding flow diagram is shown in FIG. 8, and a comparable hardware implementation is shown on FIG. 9. The Reasonable Limits Checker module checks each Task Data Value message received from the Message Format Checker. Referring to the Psuedo Code program for the Reasonable Limits Checker and the flow diagram shown in FIG. 8, the operation of the Reasonable Limits Checker is as follows:

TABLE III-B

| REASONABLE LIMITS CHECKER |
|---|
| /\*IF DATA ID NOT VALID\*/ |
| IF DATA ID > MAXIMUM DATA ID |
| THEN |
| ERROR INDICATOR = DATA ID ERROR |
| ELSE /\*IF DATA VALUE NOT WITHIN LIMITS\*/ |
| IF DATA VALUE > |
| MAXIMUM DATA VALUE (DATA ID) |
| ORIF DATA VALUE < |
| MINIMUM DATA VALUE (DATA ID) |
| THEN |
| ERROR INDICATOR = LIMIT ERROR |
| ELSE |
| ERROR INDICATOR = 0 |
| ENDIF |
| ENDIF |
| IF ERROR |
| INDICATOR NOT = 0 /\*IF ERROR WAS DETECTED\*/ |
| THEN |
| CALL: SEND MESSAGE TO FAULT TOLERATOR |
| INPUT DATA: |
| MESSAGE TYPE = RECORD ERROR TYPE |
| NEW FAULTY COMPUTER = COMPUTER |
| ERROR INDICATOR = ERROR INDICATOR |
| OUTPUT DATA: NONE |
| ELSE |
| CALL: SEND MESSAGE TO FAULT TOLERATOR |
| INPUT DATA: |
| MESSAGE = TASK DATA VALUE MESSAGE |
| OUTPUT DATA: NONE |
| ENDIF |
| RETURN |
| END |

The procedure begins by checking the data variable identification number (DATA I.D.), contained in the received Task Data Value message, to determine if the identification number is valid, as indicated by block 302. If the Data ID is greater than a constant Maximum Data ID (if the Data ID is not valid), then a Record Error message is generated as indicated by block 304, and the checking is terminated. The error indicator is set equal to the fixed value which identifies the error as a Data ID error.

If the Data ID is less than the predetermined Maximum Data ID, the procedure checks the data value contained in the received message, as indicated by block 306. If the data value is greater than the predetermined maximum value for that data variable, then a Record Error message is generated indicating a data value limit error, as indicated by block 308. If the data value is less than the predetermined maximum value, the procedure checks if the data value is less than a predetermined minimum value for that data variable, as indicated by block 310. If the data value is less than the minimum value, a Record Error message is generated indicating a data value limit error, as indicated by block 308. If, however, the data value is greater than the predetermined minimum value, the error indicator is set to zero (0) indicating the message is correct, as indicated by block 311.

As in the Message Format Checker, the Reasonable Limits Checker generates a Record Error message by making the error indicator non-zero. Following the checking, the error indicator is tested to determine if a Record Error message must be sent, as indicated in block 303. If the error indicator is non-zero, a Record Error message is sent to the Fault Tolerator, as indicated in Block 307. If the error indicator is zero, the received Task Data Value message is sent to the Fault Tolerator 228, as indicated in Block 305.

A hardware implementation of the Reasonable Limits Checker 218 is shown in FIG. 9. Referring to FIG. 9, the byte of the message specifying the data variable (Data I.D.) is stored in Register 322, and the 8 bytes indicative of the data value are stored in Register 338.

The output of Decoder 314 shown in FIG. 7 indicative that the message is of Task Data Value type, and therefore is to be checked by the Reasonable Limits Checker, is connected to inputs of AND Gates 316, 318, and 320. AND Gates 316, 318 and 320 are also enabled by a logical one signal at the Q output of Flip Flop 300 shown in FIG. 7. AND Gates 316, 318, and 320 also receive, at their other inputs, sequential timing signals RLC-1, RLC-2, and RLC-3, shown on FIG. 10. The output of AND Gate 316 is applied to one input to AND Gate 317. The output of AND Gate 318 is connected to an input of AND Gate 344. The output of AND Gate 320 is connected to an input of AND Gates 354.

The outputs of the Data ID Register 322 are connected in parallel to Comparator 324, and to the address inputs of the Maximum Value Read Only Memory 326 and the Minimum Value Read Only Memory 328. The parallel outputs of the Maximum Data ID Register 330 are also connected to the parallel inputs of Comparator 324. The output of Comparator 324, indicating if the Data ID stored in Register 322 is larger than the Maximum Data ID stored in Register 330, is connected to the other input to AND Gate 317, which has its output connected to the SET input of Flip Flop 332. The Q output of Flip Flop 322 is connected to an input of OR Gate 333 and to an input of AND Gate 334. The $\overline{Q}$ output of Flip Flop 322 is connected to inputs to AND Gates 344 and 354. AND Gate 334 receives the Read Error signal at its other input, and its output is connected to the enable input of a Data ID Error Code Generator 336. The Data ID Error Code Generator 336 may be a separate element of a known type, which outputs a predetermined code when enabled, or may be a discrete storage location of a read only (ROM) memory storing the predetermined code, which is addressed by the output of AND Gate 334.

The parallel outputs of the Maximum Value Read Only Memory 326 are connected to the parallel inputs of Comparator 340. The parallel outputs of the Minimum Value Read Only Memory 328 are connected to the parallel inputs of Comparator 342. The parallel outputs of the Data Value Register 338 are connected to the other parallel inputs of Comparator 340 and Comparator 342. The output of Comparator 340, indicative of the data value in Register 338 being greater than the maximum data value stored in the Read Only Memory 326, is connected to AND Gate 344. The output of Comparator 342, indicative of the data value in Register 338 being less than the minimum data value stored in Read Only Memory 328, is connected to AND Gate 354. Other inputs of AND Gates 344 and 354 are connected to the $\overline{Q}$ output of Flip Flop 332. AND Gate 354 also has an input connected to the $\overline{Q}$ output of Flip Flop 346.

The output of AND Gate 344 is connected to the SET input of Flip Flop 346, which has its Q output connected to OR Gate 348. The output of AND Gate 354 is connected to the SET input of Flip Flop 356, which also has its Q output connected to an input of OR Gate 348. The output of OR Gate 348 is connected to an input of AND Gate 358 and an input of OR Gate 333. The other input to AND Gate 358 receives the Read Error signal. The output of AND Gate 358 is connected to the enable input of a Limit Error Code Generator 352. The Limit Error Code Generator 352 may be of a known type, which generates a predetermined code transmitted to the Fault Tolerator when enabled by the output signal from AND Gate 358 as shown, or alternately may be a storage location in a read only memory. The output of OR Gate 333 is connected to the SET input of Flip Flop 359, which receives a RESET signal at its RESET input.

Figure 10:
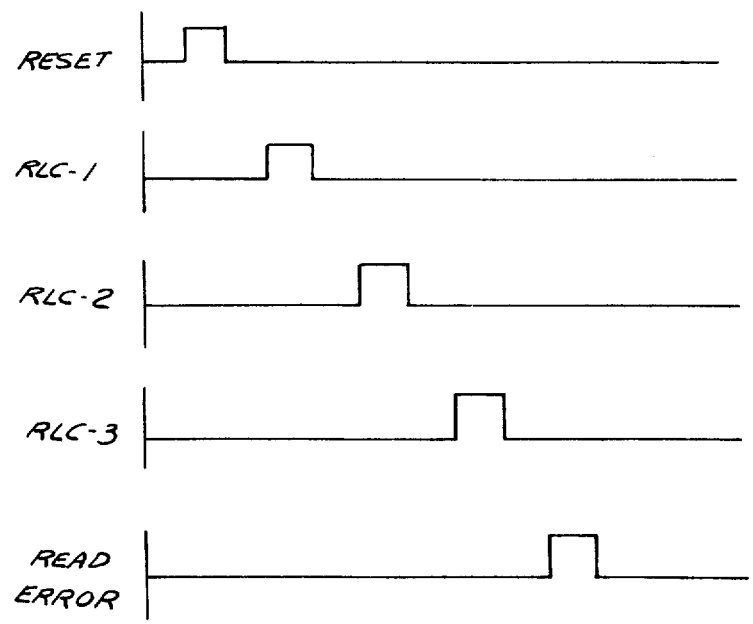
FIG. 10 shows the waveforms of the timing signals used in the discussion of the Message Format Checker and Reasonable Limits Checker.

The operation of the Reasonable Limits Checker 218 is discussed with reference to the circuit shown on FIG. 9 and the waveforms shown on FIG. 10.

When the $\overline{Q}$ output of Flip Flop 300, shown on FIG. 7, is a logical one signal indicative that no error was found in the Message Format Checker, then AND Gates 316, 318 and 320 receive an enabling signal at one of their inputs. The output from the Decoder 314 indicating that the message is of Task Data Value type, and thus is to be checked by the Reasonable Limits Checker, also enables AND Gates 316, 318, and 320.

The RESET signal applied to the RESET inputs of Flip Flop 332, 346, 356, and 359 places them in their RESET state. A subsequent RLC-1 signal applied to AND Gate 316 causes AND Gate 316 to generate an output signal enabling AND Gate 317. If the Data I.D. code stored in Register 322 is a number greater than the maximum data ID number stored in Register 330, the Comparator 324 outputs a logical one signal transmitted to the SET input of Flip Flop 332 through enabled AND Gate 317.

Flip Flop 332 is placed in the SET state and generates a signal at its Q output enabling AND Gate 334 and placing Flip Flop 359 in its SET state via OR Gate 333. Flip Flop 332 remains in the SET state. The subsequently generated Read Error signal applied to the other input of AND Gate 334 enables the Data I.D. Error Code Generator 336 to generate a Data I.D. error code for a Record Error message which is transmitted to the Fault Tolerator. When Flip Flop 332 is placed in the SET state, by the detection of a Data I.D. code error, its $\overline{Q}$ output assumes a logical zero state which disables AND Gates 344 and 354.

If no Data ID error is detected, Flip Flop 332 remains in the RESET state and its $\overline{Q}$ output is a logical one signal which enables AND Gates 344 and 354. The subsequent RLC-2 signal, received by AND Gate 318, enables AND Gate 344. The Maximum Value Read Only Memory location, which is addressed by the Data I.D. stored in Register 322, outputs a predetermined maximum data value for that particular Data ID, which is compared in Comparator 340 with the data value contained in Register 338. If the data value stored in Register 338 is greater than the maximum data value output from the Read Only Memory 326, the Comparator 340 outputs a signal enabling AND Gate 344. The output of AND Gate 344 places Flip Flop 346 in the SET state. In the SET state, Flip Flop 346 generates a signal at its Q output which enables AND Gate 358 through OR Gate 348, and which places Flip Flop 359 in the SET state via OR Gates 348 and 333, signifying the detection of an error. A Read Error signal, subsequently received at the other input of AND Gate 358, enables the Limits Error Code Generator 352 to generate a data value limit error code for a Record Error message transmitted to the Fault Tolerator.

In a like manner, the Minimum Value Read Only Memory 328 is addressed by the Data ID code stored in Register 322. Comparator 342 then compares the data value stored in register 338 with the minimum data value output from the Read Only Memory 328, and generates an output signal transmitted to an input of AND Gate 354 when the data value is less than the minimum data value output by the Read Only Memory 328. The other inputs of AND Gate 354 are enabled by the $\overline{Q}$ outputs of Flip Flops 332 and 346 when they are in their RESET state, and by the output of AND Gate 320 when enabled in response to the timing signal RLC-3. The output of AND Gate 354 places Flip Flop 356 in its SET state. The signal generated at the Q output of Flip Flop 356 is transmitted to AND Gate 358 through OR Gate 348, and to Flip Flop 359 through OR Gates 348 and 333. If either Flip Flop 346 or 356 is in its SET state, Flip Flop 359 will be placed in its SET state, signifying the detection of an error, and AND Gate 358 will generate an output signal enabling the Limit Error Code Generator 352 in response to a Read Error signal received at its other input. The RESET, RLC-1, RLC-2, RLC-3 and Read Error signals are sequentially generated as indicated on FIG. 10.

As evident from the above description, the circuit shown on FIG. 9 is functionally equivalent to the Psuedo Code given in Table III-B and the flow diagram shown in FIG. 8.

REDUNDANT VALUE VOTER

The function of the Redundant Value Voter 220 is to find a "voted data value" from among the data values received in Redundant Data Value messages, which is the correct or most probable data value. This is accomplished by a voting process which identifies the "voted data value" when a predetermined number of the received redundant data values agree. The Redundant Value Voter also identifies those Computers which sent redundant data values that do not agree with the "voted data value", and generates a Record Error message identifying each such faulty Computer.

Figure 11:
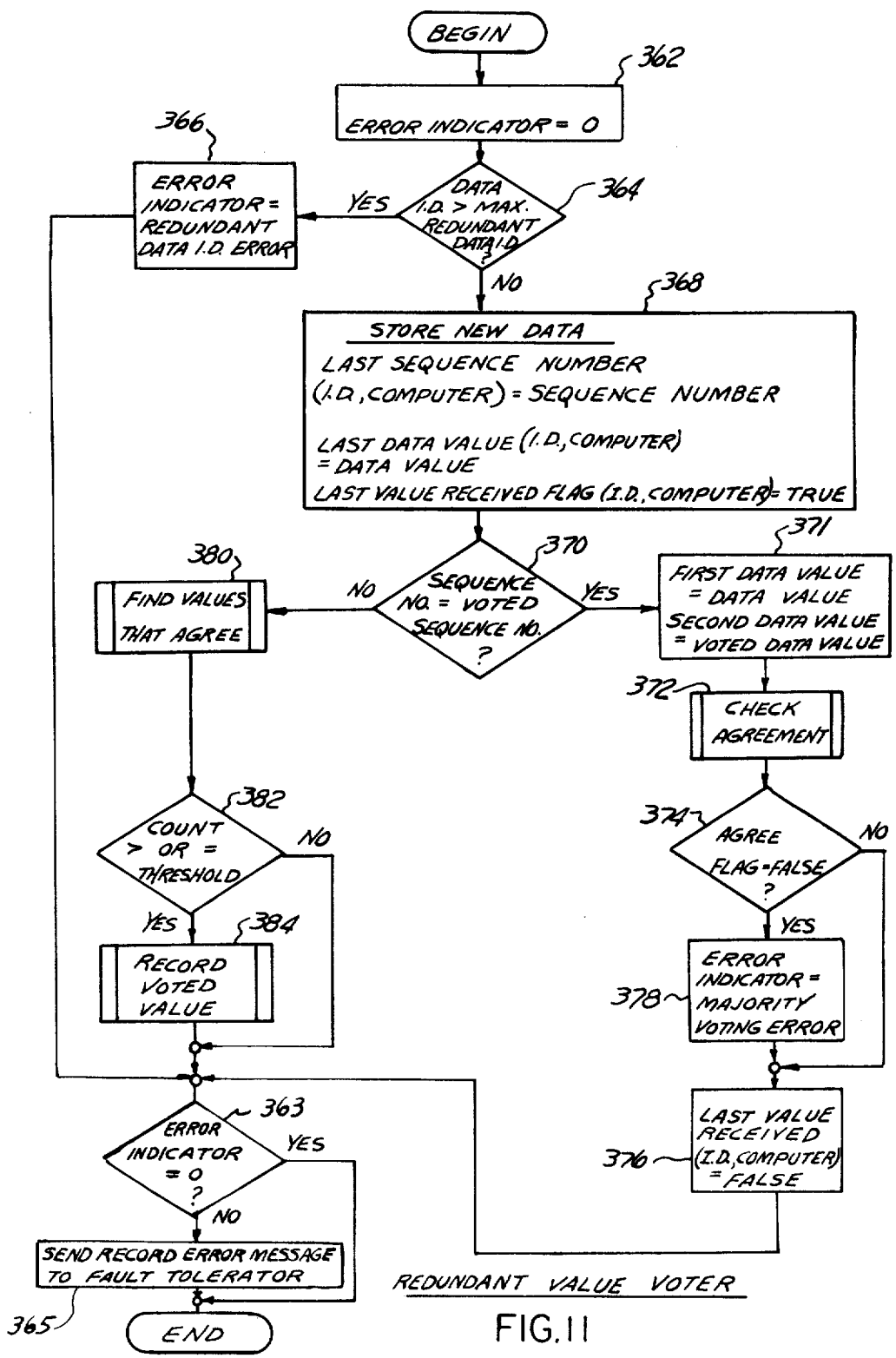
FIG. 11 is a flow diagram for the Redundant Value Voter.

The Psuedo Code program listing for the Redundant Value Voter module is given on Table III-D and the corresponding flow diagram is illustrated on FIG. 11. The subroutines used in the Redundant Value Voter are given on Tables III-E, III-F, and III-G, while the corresponding subroutine flow diagrams are illustrated on FIGS. 12, 13, and 14.

A corresponding hardware implementation for the Redundant Value Voter is deemed to be superfluous in view of the direct correlation between the Psuedo Code program listing and circuit diagram shown with respect to the Message Format Checker and Reasonable Limits Checker previously described. A circuit implementation therefore is not shown. It is submitted that a circuit designer of ordinary skill in the art would be capable of designing a circuit performing the functions described in the Psuedo Code program, without undue experimentation or effort. Hereinafter, only the Psuedo Code program listings for the individual modules of the system will be given. The elimination of the corresponding circuit implementation is believed to be in conformance with the "best mode" requirement of 35 USC 112 and with the "Guidelines for Drafting a Model Patent Application Under the Revised Rules" dated Oct. 12, 1966 (832 09 5).

The Redundant Value Voter uses the Redundant Data Table shown on Table III-C. The Redundant Data Table stores one entry for each Data I.D. that is redundantly computed.

TABLE III-D

REDUNDANT DATA TABLE

Each entry contains the following items:
Voted Sequence Number
Voted Data Value
Data Voting Count Threshold
Voting Threshold For each Redundant Data I.D., the table further contains the following items for each Computer in the system:
Last Value Received
Last Sequence Number
Last Data Value The "Voted Data Value" item stores the value for that data variable of the Redundant Data Value message that last exceeded the Data Voting Count Threshold. The "Voted Sequence Number" stores the sequence number of the Voted Data Value. The "Data Voting Count Threshold" is the fixed number of Computers which must agree, in order to obtain a new Voted Data Value for that data variable. The "Voting Threshold" is the constant maximum difference between data values, received from different computers, in order to consider that those values "agree". If the Voting Threshold is zero, the data values must be equal in order to obtain agreement. A small Voting Threshold allows deciding that values agree when those values differ slightly.

The "Last Data Value" item stores the data value last received, from the associated Computer for that data variable. The "Last Sequence Number" stores the sequence number corresponding to the Last Data Value. The "Last Value Received" is a flag bit indicating whether the stored values of the Last Data Value and Last Sequence Number are currently valid. This flag is made "true" when a redundant data value is received from that Computer and stored. This flag is made "false" when that data value is found to either agree or disagree with a Voted Data Value.

Referring now to the Redundant Value Voter Psuedo Code program of Table III-D and the flow diagram shown on FIG. 11, the indicated functions are performed when a Redundant Data Value message is received from the Message Format Checker 216. The procedure first sets an Error Indicator to zero (0), as indicated by block 362 of FIG. 11.

TABLE III-D

REDUNDANT VALUE VOTER

ERROR INDICATOR = 0
/*CHECK FOR DATA ID ERROR*/
IF DATA ID > MAXIMUM REDUNDANT DATA ID

TABLE III-D-continued
REDUNDANT VALUE VOTER

```
THEN
ERROR INDICATOR = REDUNDANT DATA ID ERROR
ELSE /*STORE NEW DATA*/
LAST DATA VALUE (ID, COMPUTER) = DATA VALUE
LAST SEQUENCE NUMBER (ID, COMPUTER) =
 SEQUENCE NUMBER
LAST VALUE RECEIVED (ID, COMPUTER) = TRUE
/*IF VOTED VALUE ALREADY OBTAINED*/
IF SEQUENCE NUMBER =
 VOTED SEQUENCE NUMBER (ID)
THEN /*CHECK NEW VALUE AGAINST VOTED*/
CALL: CHECK AGREEMENT
INPUT DATA:
FIRST DATA VALUE = DATA VALUE
SECOND DATA VALUE =
 VOTED DATA VALUE (ID)
OUTPUT DATA:
AGREE FLAG = AGREE FLAG
IF AGREE FLAG = FALSE
THEN
ERROR INDICATOR =
 MAJORITY VOTING ERROR
ENDIF
LAST VALUE RECEIVED (ID, COMPUTER) =
 FALSE
ELSE
CALL: FIND VALUES THAT AGREE
INPUT DATA: DATA ID = DATA ID
SEQUENCE NUMBER =
 SEQUENCE NUMBER
DATA VALUE = DATA VLAUE
COMPUTER = COMPUTER
OUTPUT DATA: COUNT = COUNT
DISAGREEMENT FLAGS =
 DISAGREEMENT FLAGS
/*IF ENOUGH VALUES AGREE*/
IF COUNT > OR =
 DATA VOTING COUNT THRESHOLD
THEN
CALL: RECORD VOTED VALUE
INPUT DATA: REDUNDANT DATA
 VALUE MESSAGE = SAME
DISAGREEMENT FLAGS = SAME
OUTPUT DATA: NONE
ENDIF
ENDIF
ENDIF
IF ERROR
 INDICATOR NOT = 0 /*IF ERROR WAS DETECTED*/
THEN
CALL: SEND MESSAGE TO FAULT TOLERATOR
INPUT DATA:
MESSAGE TYPE = RECORD ERROR TYPE
NEW FAULTY COMPUTER = COMPUTER
ERROR INDICATOR = ERROR INDICATOR
OUTPUT DATA: NONE
ENDIF
RETURN
END
```

The procedure then checks if the data I.D. is valid, by comparing the Data I.D. number of the received message to a predetermined maximum redundant Data I.D. number, as indicated by block 364. If the received Data I.D. is larger than the maximum redundant Data I.D. number, then the error indicator is set equal to the constant indicating a redundant Data I.D. error, as indicated by block 366.

If the received Data I.D. is not greater than the maximum Data I.D. number, the procedure stores the new data as indicated by block 368. The information stored for that Computer and that Data I.D. are: (1) the Last Data Value, which is set equal to the data value contained in the message received; (2) the Last Sequence Number, which corresponds to the sequence number of the stored Last Data Value; and (3) the Last Value Received flag, which is set to show that information from that Computer has been received since the last "voted data value" was obtained. The abbreviation "I.D." for "Data I.D." is used here and elsewhere in Table III-C and FIG. 11.

The procedure then tests if the sequence number of the newly received data value is the same as the Voted Sequence Number, as indicated by block 370. The Voted Sequence Number is the sequence number of the current Voted Data Value stored for that Data I.D. If the sequence number of the message is the same as the Voted Sequence Number, the procedure calls the Check Agreement subroutine, as indicated by block 372, in which a first and a second data value are compared. Before proceeding to the Check Agreement subroutine, the first data value used by the Check Agreement subroutine is set equal to the data value of the received Redundant Data Value message, and the second data value is set equal to the Voted Data Value for that Data I.D., as indicated by block 371. The Check Agreement subroutine, given in Table III-E and illustrated in FIG. 12, sets an Agree Flag to "true" if the two data values agree and sets the Agree Flag to "false" if the data values disagree.

After the Check Agreement subroutine is completed, the Agree Flag is checked as indicated by block 374. If the Agree Flag is "false", the error indicator is set to show that a "majority voting error" was detected, as indicated by block 378. Whether the Agree Flag is "true" or "false", the procedure sets the Last Value Received flag for that Data ID and that Computer to "false", as indicated by block 376, and the checking of that particular Redundant Data Value message is ended. The "false" Last Value Received flag signifies that this particular message has been checked against the "Voted Data Value".

Figure 13:
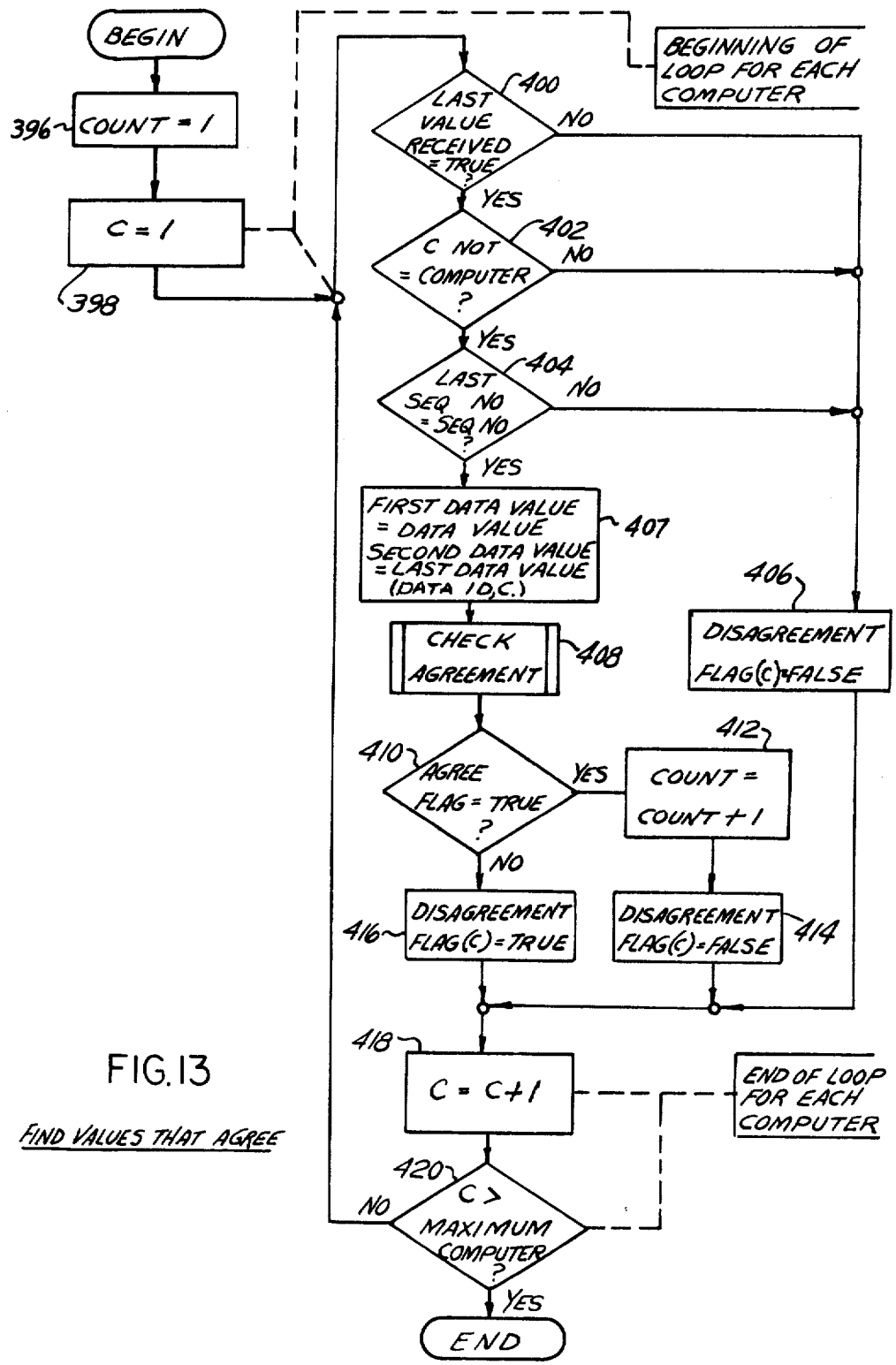
FIG. 13 is a flow diagram for the "Find Values That Agree" subroutine of the Redundant Value Voter.

Returning now to block 370, if the sequence number of the Redundant Data Value message being processed is not the same as the Voted Sequence Number for that particular Data I.D., the procedure calls the subroutine "Find Values That Agree" as indicated by block 380. The Find Values That Agree subroutine is given in Table III-F, and its corresponding flow diagram is illustrated in FIG. 13. The Find Values That Agree subroutine compares the data value of the received message with the data values of each previously received Redundant Data Value message having the same Data I.D. and same sequence number. One output of the "Find Values That Agree" subroutine is a count of the number of previously received data values which agree with the newly received redundant data value.

After the count is determined, the procedure tests if the count (number of data values which agree) is equal to or greater than a predetermined Data Voting Count Threshold, as indicated by block 382. The threshold is a number less than the number of Computers redundantly computing a particular data variable, and will normally be two or three. If the count is less than the predetermined Data Voting Count Threshold, the checking is ended.

However, if the count is equal to or greater than the Count Threshold, the procedure calls the Record Voted Value subroutine as indicated by block 384. The Record Voted Value subroutine is given on Table III-G and its companion flow diagram is illustrated in FIG. 14. The Record Voted Value subroutine stores the received data value and sequence number as the Voted Data Value and Voted Sequence Number, and sets all the Last Value Received flags to "false". The subroutine then checks if any of the previously received data values disagree with the "Voted Data Value". A Record Error message is generated for each Computer whose previously received Redundant Data Value message contained a data value that does not agree with the "Voted Data Value". Finally, the subroutine sends the received Redundant Data Value message to the Scheduler for further processing.

After completing the various checking actions, the Redundant Value Voter module checks the value of the error indicator, to see if a Record Error message should be sent, as indicated by block 363. If the error indicator is not zero, a Record Error message is sent to the Fault Tolerator 228, as indicated by block 365.

TABLE III-E

CHECK AGREEMENT

Figure 12:
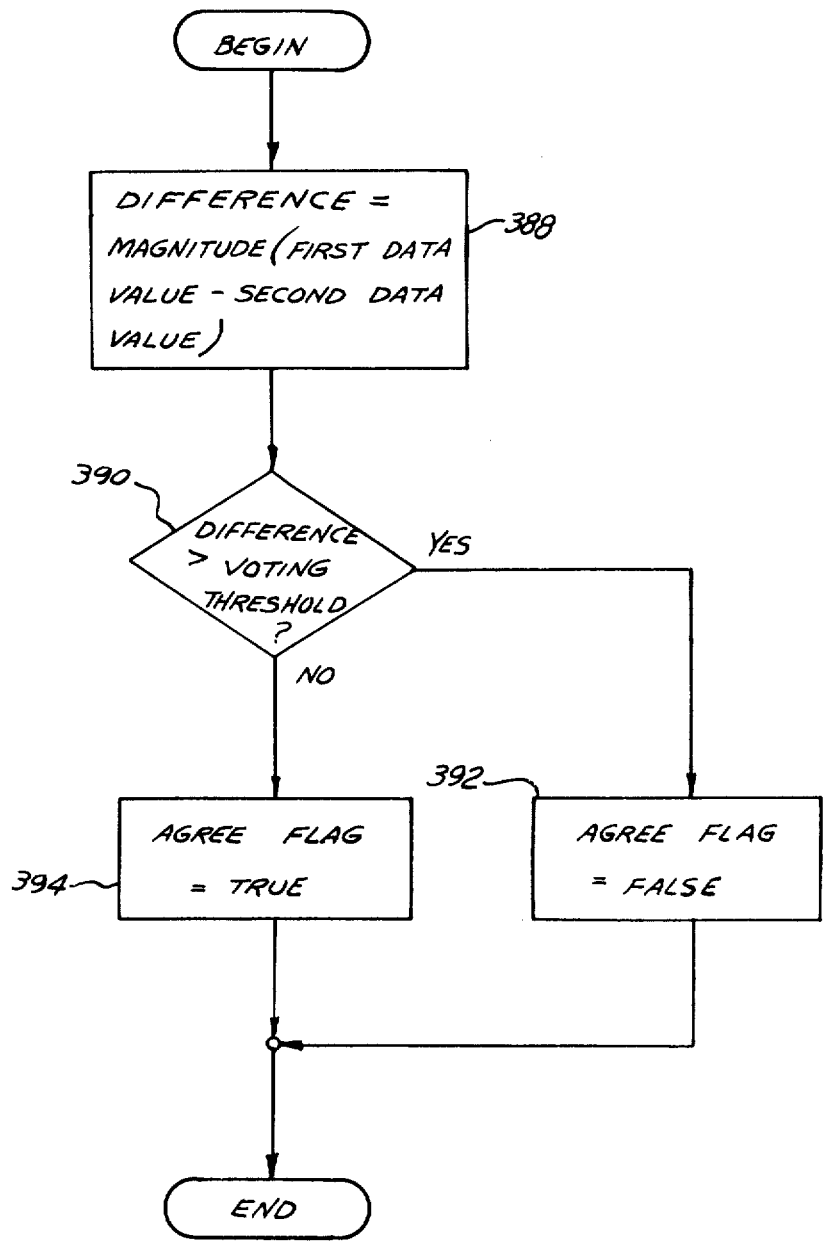
FIG. 12 is a flow diagram for the "Check Agreement" subroutine of the Redundant Value Voter.

IF MAGNITUDE
(FIRST DATA VALUE − SECOND DATA VALUE)
> VOTING THRESHOLD (DATA ID)
THEN
AGREE FALG = FLASE
ELSE
AGREE FLAG = TRUE
ENDIF
RETURN
END;

Referring to Table III-E and FIG. 12, the Check Agreement subroutine computes the magnitude of the difference between the first data value and the second data value, as indicated by block 388. The first data value is the data value from the received Redundant Data Value message. When called from the Redundant Value Voter, the second data value is the "Voted Data Value". When called from the Find Values That Agree subroutine, as explained hereinafter, the second data value is the Last Data Value having the same Data I.D. and sequence number, stored in the Redundant Data Table for one Computer in the system.

After the magnitude of the difference between the first data value and the second data value is obtained, the subroutine compares the magnitude with the "Voting Threshold" as indicated by block 390. The "Voting Threshold" is a predetermined value for each Data I.D., giving the permitted or acceptable difference between agreeing data values. When the difference magnitude is less than the Voting Threshold, the Agree Flag is set to "true", as indicated by block 394. If the magnitude is greater than the voting threshold, the Agree Flag is set to "false", as indicated by block 392.

TABLE III-F

FIND VALUES THAT AGREE

COUNT = 1
/*LOOP FOR EACH COMPUTER*/
LOOP FOR C = 1 TO MAXIMUM COMPUTER
IF LAST VALUE RECEIVED (DATA ID, C) = TRUE
ANDIF C NOT = COMPUTER
ANDIF LAST SEQUENCE NUMBER (DATA ID, C) = SEQUENCE NUMBER
THEN
CALL: CHECK AGREEMENT
INPUT DATA:
FIRST DATA VALUE = DATA VALUE
SECOND DATA VALUE
= LAST DATA VALUE (DATA ID, C)
OUTPUT DATA: AGREE FLAG = AGREE FLAG
IF AGREE FLAG = TRUE
THEN
COUNT = COUNT + 1
/*SET VALUE OF DISAGREEMENT FLAG*/

TABLE III-F-continued

FIND VALUES THAT AGREE

DISAGREEMENT FLAG (C) = FALSE
ELSE
DISAGREEMENT FLAG (C) = TRUE
ENDIF
ELSE
DISAGREEMENT FLAG (C) = FALSE
ENDIF
REPEAT
RETURN
END;

The Find Values That Agree subroutine is given in Table III-F, and its corresponding flow diagram is shown in FIG. 13. The subroutine begins by setting the count of the number of redundant data values which agree to 1, as indicated by block 396. Then it begins to loop for each Computer, beginning with the first Computer (i.e., C=1) as indicated by block 398. As the data stored in the Redundant Data Table for each Computer is examined, the subroutine tests if the Last Value Received flag is "true", if the Computer being interrogated is not the Computer which sent the Redundant Data Value message being processed, and if the Last Sequence Number is equal to the received sequence number, as indicated by blocks 400, 402, and 404 respectively.

If the result of any of these tests is negative, the disagreement flag for Computer C is set to "false", as indicated by block 406, and the Computer number is incremented (C=C+1) to interrogate the next Computer, as indicated by block 418. The subroutine then tests if the incremented Computer number (C) is greater than the maximum number of Computers in the system, as indicated by block 420. If the Computer number is now greater than the maximum number of Computers in the System, the subroutine is ended. If not, the subroutine proceeds to examine the information received from the next Computer.

If the results of all of the tests of blocks 400, 402, and 404 are affirmative, the subroutine proceeds to the Check Agreement subroutine as indicated by block 408. Before proceeding to the Check Agreement subroutine, the first and second data values compared by the Check Agreement subroutine are set equal to the data value of the Redundant Data Value message being analyzed and the Last Data Value stored from the Computer being examined, as indicated by block 407. If the data values agree, the Agree Flag is set to "true" by Check Agreement as previously discussed, otherwise the Agree Flag is set to "false".

The Find Values That Agree subroutine checks the state of the Agree Flag as indicated by block 410. When the Agree Flag is "true", the agreement count is incremented by one (Count=Count+1) and the disagreement flag for Computer C is set to "false", as indicated by blocks 412 and 414 respectively. The Computer number is then incremented (block 418) and compared with the maximum Computer number (block 420) as previously described. When the Agree Flag is "false", the disagreement flag for Computer C is set to true as indicated by block 416. The Computer number is then incremented and compared with the maximum Computer number as before.

The Find Values That Agree subroutine is terminated when the incremented Computer number (C=C+1) of block 418 is larger than the maximum number of Computers in the system. The final count stored (by block 412) shows the number of data values that agree.

The Find Values That Agree subroutine will be repeated for each new Redundant Data Value message received, until the count of the data values that agree equals or exceeds the predetermined Data Voting Count Threshold discussed with reference to Table III-C and FIG. 11. All Redundant Data Value messages received after the "Voted Data Value" is obtained, having the same Data I.D. and sequence number, will be checked against the "Voted Data Value" as indicated by blocks 371 through 378 on FIG. 11.

The Psuedo Code program for the Record Voted Value subroutine is given on Table III-G and its corresponding flow diagram is shown on FIG. 14.

TABLE III-G

RECORD VOTED VALUE

```
/*STORE VOTED VALUE IN REDUNDANT DATA
  TABLE*/
VOTED DATA VALUE (DATA ID) = DATA VALUE
VOTED SEQUENCE NUMBER (DATA ID) = SEQUENCE
  NUMBER
/*MARK LAST VALUES NOT RECEIVED*/
/*LOOP FOR EACH COMPUTER*/
LOOP FOR C = 1 TO MAXIMUM COMPUTER
LAST VALUE RECEIVED (DATA ID, C) = FALSE
REPEAT
/*CHECK FOR ERRORS BY OTHER COMPUTERS*/
/*LOOP FOR EACH COMPUTER*/
LOOP FOR C = 1 TO MAXIMUM COMPUTER
/*IF ERROR DETECTED*/
IF DISAGREEMENT FLAG (C) = TRUE
THEN
CALL: SEND MESSAGE TO FAULT TOLERATOR
INPUT DATA:
MESSAGE TYPE = RECORD ERROR TYPE
NEW FAULTY COMPUTER = C
ERROR INDICATOR =
  MAJORITY VOTING ERROR
OUTPUT DATA: NONE
ENDIF
REPEAT
CALL: SEND MESSAGE TO FAULT TOLERATOR
INPUT DATA:
MESSAGE = REDUNDANT DATA VALUE MESSAGE
OUTPUT DATA: NONE
RETURN
END;
```

Referring to Table III-G and FIG. 14, the subroutine begins by storing in the Redundant Data Table the received data value and its associated sequence number, as the "Voted Data Value" and the "Voted Sequence Number", respectively, as shown by block 422. After the voted value is stored, the subroutine marks the previously received Last Data Values as not received. The program loops for C=1 to the maximum Computer number, and changes the Last Value Received flag for each Computer for that Data I.D. to "false". For this loop, the Computer number C is first set equal to 1 as indicated in block 424. The subroutine then sets the Last Value Received flag for that Computer and that Data I.D. to "false", as indicated by block 430. The Computer number C is then incremented (C=C+1), as indicated by block 432. The incremented Computer number (C) is then compared with the maximum Computer number to determine if all the Computers have been processed, as indicated by block 434. If the result of this test is negative, the procedure is repeated for the next computer.

After the subroutine has marked the Last Data Values not received for all the Computers, it loops through the Computers once again, to handle any disagreements previously detected by Find Values That Agree. For this loop, the Computer number C is again set equal to 1 as indicated in block 436. As each Computer is examined, the subroutine tests if the disagreement flag for the particular Computer is "true", as indicated by block 438. If the disagreement flag is "true", then the procedure sends a Record Error message which indicates a Majority Voting Error for that Computer, as indicated by block 440. The Record Error message is sent to the Fault Tolerator. The subroutine then increments the Computer number C to C+1. If the disagreement flag is "false", the procedure does not send a Record Error message and directly increments the Computer number C to C+1, as indicated by block 442.

The Computer number C is then compared with the maximum Computer number for the system, to determine if all of the disagreement flags have been checked, as indicated by block 444. If the Computer number C is less than or equal to the maximum Computer number, the system loops back and checks the state of the disagreement flag for the next Computer. If, however, the Computer number C is now greater than the maximum Computer number, the loop is ended. The subroutine then sends the received Redundant Data Value message on to the Scheduler, since it contains a voted data value, as indicated by block 445. This message is sent to the Scheduler via the Fault Tolerator as previously indicated. However, the Fault Tolerator only forwards this message directly to the Scheduler, without performing any other action.

MESSAGE SEQUENCE CHECKER

The Message Sequence Checker 222 checks the sequence in which tasks are selected, unselected, started, and completed by the Schedulers of all of the Computers in the system. The Message Sequence Checker maintains a Computer Status Table which stores, for each Computer, the Last Started Task and its execution number, and the Last Selected Task and its execution number. A block diagram of the structure of the Message Sequence Checker 222 is shown on FIG. 15.

Referring to FIG. 15, the Task Unselected/Selected and Task Completed/Started messages are received by the Message Sequence Checker 222. The Task Unselected/Selected messages sent by the Message Format Checker 216 are received by a Task Unselected/Selected Message Module 446. The Task Completed/Started messages sent by the Execution Time Checker 224 are received by a Task Completed/Started Message Module 448. The Task Unselected/Selected Message Module 446 and Task Completed/Started Message Module 448 are interconnected by a Computer Status Table 450, storing the current scheduling status for each Computer in the system. The Computer Status Table stores, for each Computer in the System, the Last Started Task number and Last Started Execution Number, as well as the Last Selected Task and Last Selected Execution Number.

The Task Unselected/Selected Message Module 446 compares the unselected task and corresponding execution number, contained in the message received, with the Last Selected Task and the Last Selected Execution Number stored in the Computer Status Table 450 for the Computer identified in the message. It also checks that the selected task number is a valid task identification number. The module then replaces the Last Selected Task and Last Selected Execution Number, stored in the Computer Status Table 450, with the selected task and selected execution number contained in the message, whether or not an error was detected. If an error was detected, the module sends a Record Error message to the Fault Tolerator, which identifies the Computer which generated the faulty message and the type of error detected. If no error is detected, the module forwards the Task Unselected/Selected message to the Fault Tolerator 228.

In a like manner, the Task Completed/Started Message Module 448 compares the completed task and its associated execution number, contained in the Task Completed/Started message, with the Last Started Task and Last Started Execution Number stored in the Computer Status Table 450 for the Computer identified in the message. If they agree, the module then compares the started task and execution number contained in the message with the Last Selected Task and Last Selected Execution Number stored in the Computer Status Table. The started task and execution number of the message are then stored in the Computer Status Table as the Last Started Task and Last Started Execution Number, for the Computer that sent the message, whether or not an error was detected. If an error was detected, the module sends a Record Error message to the Fault Tolerator. If no error was detected, the module forwards the Task Completed/Started Message to the Fault Tolerator 228.

Psuedo Code program listings for the Task Unselected/Selected Message Module and the Task Completed/Started Message Module are given in Tables III-H and III-I respectively.

TABLE III-H

TASK UNSELECTED/SELECTED MESSAGE MODULE

```
/*CHECK UNSELECTED TASK*/
IF UNSELECTED TASK NOT = LAST SELECTED TASK
   (COMPUTER)
THEN /*IF OWN COMPUTER NOT JUST STARTING*/
IF LAST SELECTED TASK (COMPUTER) NOT = 0
THEN
ERROR INDICATOR = UNSELECTED TASK ERROR
ELSE
ERROR INDICATOR = 0
ENDIF
ELSE /*CHECK UNSELECTED EXECUTION NUMBER*/
IF UNSELECTED EXECUTION NUMBER NOT =
   LAST SELECTED EXECUTION NUMBER
   (COMPUTER)
THEN
ERROR INDICATOR = UNSELECTED TASK ERROR
ELSE
ERROR INDICATOR = 0
ENDIF
ENDIF
IF ERROR INDICATOR = 0 /*IF ERROR NOT ALREADY
   DETECTED*/
THEN /*IF SELECTED TASK NOT VALID*/
IF SELECTED TASK > MAXIMUM TASK
ORIF SELECTED TASK = 0
THEN
ERROR INDICATOR = SELECTED TASK ERROR
ENDIF
ENDIF
/*STORE SELECTED TASK AND EXECUTION
   NUMBER*/
LAST SELECTED TASK (COMPUTER) = SELECTED
   TASK
LAST SELECTED EXECUTION NUMBER (COMPUTER)
   = SELECTED EXECUTION NUMBER
IF ERROR INDICATOR NOT = 0 /*IF ERROR WAS
   DETECTED*/
THEN
CALL: SEND MESSAGE TO FAULT TOLERATOR
INPUT DATA: MESSAGE TYPE = RECORD ERROR
   TYPE
```

TABLE III-H-continued

TASK UNSELECTED/SELECTED MESSAGE MODULE

```
NEW FAULTY COMPUTER = COMPUTER
ERROR INDICATOR = ERROR INDICATOR
OUTPUT DATA: NONE
ELSE
CALL: SEND MESSAGE TO FAULT TOLERATOR
INPUT DATA: MESSAGE =
   TASK UNSELECTED/SELECTED MESSAGE
OUTPUT DATA: NONE
ENDIF
RETURN
END;
```

Referring to Table III-H, the Task Unselected/Selected Message Module first checks it the unselected task, in the received Task Unselected/Selected message, is the same as the Last Selected Task, currently stored in the Computer Status Table 450 for the Computer identified in the received message. If the unselected task is not the same as the stored Last Selected Task, the procedure (THEN) tests if own Computer is starting, and thus has not stored the task last selected by the other computer. The error indicator is set to indicate an unselected task error if the Computer is not starting, or (ELSE) the error indicator is set to zero.

To determine if own Computer is starting, the Last Selected Task is checked to determine if it is equal to zero. A zero value is not used as a task identification number. Thus the Last Selected Task will not be zero if it reflects a selected task. As shall be explained hereinafter, the Start Fault Handler Module 231 clears the Last Selected Task registers or storage locations in the Computer Status Table 450. Therefore, if own Computer is starting, zero is stored in the storage location in which the Last Selected Task for each Computer is stored. This zero value remains stored for Last Selected Task until a Task Unselected/Selected message or Task Completed/Started message is received from that Computer. At that time, the newly selected task is stored as the Last Selected Task, as will be subsequently described. Therefore, a non-zero Last Selected Task, which is not the same as the unselected task of the received message, indicates a scheduling sequence error. The procedure then sets the error indicator to indicate an unselected task error. On the other hand, a zero Last Selected Task indicates that this is the first message received from a Computer containing a selected task; therefore, there is no error and the error indicator is set to zero.

A message, containing an unselected task which agrees with the last selected task, is further checked to determine if the execution number of the unselected task agrees with the Last Selected Execution Number for the Computer identified in the message. The error indicator is set to indicate an unselected task error if the message's unselected execution number does not agree with the stored Last Selected Execution Number, or (ELSE) the error indicator is set to zero if they agree.

If the error indicator is equal to zero indicating that no error has been detected, the procedure checks if the message's selected task is a valid task identification number. This is done by checking if the number identifying the selected task is larger than a predetermined maximum task number, or if the task number is equal to zero. If the result of either check is positive, the error indicator is set to indicate a selected task error.

Whether an error is detected or not, the selected task and its associated execution number, contained in the Task Unselected/Selected message, are stored in the Computer Status Table as the Last Selected Task and Last Selected Execution Number, respectively. The error indicator is then tested to determine if an error has been detected. If the error indicator is not zero, a Record Error Message is sent to the Fault Tolerator, signaling the detected error. If the error indicator is zero, the received Task Unselected/Selected message is forwarded to the Fault Tolerator.

TABLE III-I

TASK COMPLETED/STARTED MESSAGE MODULE

/*CHECK COMPLETED TASK*/
IF COMPLETED TASK NOT = LAST STARTED TASK
  (COMPUTER)
THEN /*IF OWN COMPUTER NOT JUST STARTING*/
IF LAST STARTED TASK (COMPUTER) NOT = 0
THEN
ERROR INDICATOR = COMPLETED TASK ERROR
ELSE
ERROR INDICATOR = 0
ENDIF
ELSE /*CHECK COMPLETED EXECUTION NUMBER*/
IF COMPLETED EXECUTION NUMBER NOT =
  LAST STARTED EXECUTION NUMBER
  (COMPUTER)
THEN
ERROR INDICATOR = COMPLETED TASK ERROR
ELSE
ERROR INDICATOR = 0
ENDIF
ENDIF
IF ERROR INDICATOR = 0 /*IF ERROR NOT ALREADY
  DETECTED*/
THEN /*CHECK STARTED TASK*/
IF STARTED TASK NOT =
  LAST SELECTED TASK (COMPUTER)
THEN /*IF OWN COMPUTER NOT JUST STARTING*/
IF LAST SELECTED TASK NOT = 0
THEN
ERROR INDICATOR =
  STARTED TASK ERROR
ENDIF
ELSE /*CHECK STARTED EXECUTION NUMBER*/
IF STARTED EXECUTION NUMBER NOT =
LAST SELECTED EXECUTION NUMBER
(COMPUTER)
THEN
ERROR INDICATOR =
  STARTED TASK ERROR
ENDIF
ENDIF
ENDIF
/*STORE STARTED TASK*/
LAST STARTED TASK (COMPUTER) = STARTED TASK
LAST STARTED EXECUTION NUMBER (COMPUTER)
  = STARTED EXECUTION NUMBER
/*RECORD HEALTH CHECK TASK SELECTED*/
LAST SELECTED TASK (COMPUTER) = HEALTH
  CHECK TASK
LAST SELECTED EXECUTION NUMBER
  (COMPUTER) = 0
IF ERROR INDICATOR NOT = 0 /*IF ERROR WAS
  DETECTED*/
THEN
CALL: SEND MESSAGE TO FAULT TOLERATOR
INPUT DATA: MESSAGE TYPE = RECORD ERROR
  TYPE
NEW FAULTY COMPUTER = COMPUTER
ERROR INDICATOR = ERROR INDICATOR
OUTPUT DATA: NONE
ELSE
CALL: SEND MESSAGE TO FAULT TOLERATOR
INPUT DATA:
MESSAGE = TASK COMPLETED/STARTED MESSAGE
OUTPUT DATA: NONE
ENDIF
RETURN

TABLE III-I-continued

TASK COMPLETED/STARTED MESSAGE MODULE

END;

Table III-H gives the Psuedo Code program listing of the Task Completed/Started Message Module. Referring to Table III-I, the procedure first checks if the completed task, contained in the received Task Completed/Started message, is the same as the Last Started Task stored for the identified Computer. If the completed task is not the same as the stored Last Started Task, (THEN) the procedure checks whether or not own Computer is starting or restarting. As previously indicated, when the Computer is starting the "Last Started Task" is zero. The error indicator is set to indicate a "completed task error" if the completed task is not the same as the stored Last Started Task and the Last Started Task is not equal to zero. Otherwise, (ELSE), the error indicator is set to zero indicating no error.

If the completed task of the received message is the same as the stored Last Started Task, the procedure then checks the execution number of the completed task. The completed execution number of the message is compared with the stored Last Started Execution Number for the Computer identified in the received message. The error indicator is set to indicate a "completed task error" if the completed execution number is different from the Last Started Execution Number; otherwise (ELSE), the error indicator is set to zero.

When no error has been detected with respect to the completed task, the procedure checks the started task and its execution number against the Last Selected Task and its associated execution number. If the started task identified in the message is not the same as the stored Last Selected Task, the procedure checks if its own Computer is starting. As previously discussed, when its own Computer is starting or restarting, the Last Selected Task is zero. The procedure sets the error indicator to indicate a "started task error" when the started task is different from the stored Last Selected Task and the Last Selected Task is not equal to zero.

If the started task identified in the message is the same as the Last Selected Task, the procedure checks if the started execution number is the same as the Last Selected Execution Number. If the execution numbers are different, the error indicator is set to indicate a "started task error".

The started task and the associated execution number, identified in the message, are then stored in the Computer Status Table 450 as the Last Started Task and the Last Started Execution Number, respectively. Additionally, since the Last Selected Task has now been started, the procedure stores the Health Check Task as the Last Selected Task and sets the Last Selected Execution Number to zero.

The Health Check Task is a task which checks the operational status of the Applications Computer. Each Computer in the system selects the Health Check Task whenever it starts executing a selected task. If no other task is ready and selected for execution after the Computer has completed executing the "started task", the Computer then executes the Health Check Task. However, the Computer usually selects another ready task, before it starts to execute the Health Check Task. In this case, the Scheduler "unselects" (discards) the Health Check Task and replaces it with the selected ready task. The Computer then sends a Task Unselected/Selected message, giving the task number and execution number of the newly selected task and of the Health Check Task which has been unselected.

Each Computer thus executes a health check of itself if no other task is ready, rather than idly waiting for the availability of the data required for the execution of a task assigned to it. Each Computer thus always has a selected task which it will start when execution of the previous task is completed, thus simplifying the Message Sequence Checker and Execution Time Checker.

After storing the Last Started Task and Last Selected Task, the Task Completed/Started Message Module checks whether an error has been detected. If the error indicator is not zero, a Record Error message is sent to the Fault Tolerator. If the error indicator is zero, the received Task Completed/Started message is forwarded to the Fault Tolerator.

EXECUTION TIME CHECKER

The Task Completed/Started messages for which no error was detected by the Message Format Checkor 216 are transmitted to the Execution Time Checker 224. A block diagram of the Execution Time Checker is shown in FIG. 16 and comprises a Start Watch-Dog Timer Module 452, a Watch-Dog Timer Checker 454, and a Watch-Dog Timer Table 456. The Execution Time Checker implements one watch-dog timer for each Computer in the system. Each watch-dog time is started by the Start Watch-Dog Timer Module when execution of a task is started by that Computer, as indicated by a Task Completed/Started message. The Watch-Dog Timer Table 456 stores, for each Computer, a number representing the current Remaining Time in the watch-dog timer for that Computer. The Watch-Dog Timer Checker 454 decrements the contents of each watch-dog timer register at a predetermined rate, such as every 0.1 millisecond. The checker detects an error whenever a watch-dog timer expires, i.e., the Remaining Time reaches zero.

Each Task Completed/Started message, after being checked by the Message Format Checker 216, is received by the Start Watch-Dog Timer Module 452. The number of the started task identified in the message is used to obtain the constant "maximum execution time" for the started task. A different "maximum execution time" may be used for each task, or a single "maximum execution time" may be used for all tasks. The maximum execution time number is loaded into the Remaining Time location of the Watch-Dog Timer Table associated with the Computer identified in the received message. Thereafter, the Remaining Time in the watch-dog timer is regularly decremented towards zero by the Watch-Dog Timer Checker 454.

If the Computer completes the execution of the started task within the "maximum execution time", a new Task Completed/Started message is received from that Computer. The "maximum execution time" for the newly started task replaces the Remaining Time in the associated watch-dog timer. However, if the Computer does not complete the execution of the started task within the "maximum execution time", the watch-dog timer expires. The Watch-Dog Timer Checker 454 detects the expiration of the watch-dog timer, and sends a Record Error message to the Fault Tolerator 228. The Record Error message identifies the Computer for which the fault was detected and the type of error detected.

The Psuedo Code program for the Watch-Dog Timer Checker 454 is given on Table III-J. As previously indicated, this procedure is performed at regular time intervals, such as every 0.1 millisecond.

TABLE III-J
WATCH-DOG TIMER CHECKER

```
/*LOOP FOR EACH COMPUTER*/
LOOP FOR C = 1 TO MAXIMUM COMPUTER
  REMAINING TIME (C) = REMAINING TIME (C) − 1
  IF REMAINING TIME (C) = 0 /*IF TIMER NOW
     EXPIRED*/
  THEN
    REMAINING TIME (C) = TIMEOUT TIME
    CALL: SEND MESSAGE TO FAULT TOLERATOR
    INPUT DATA:
      MESSAGE TYPE = RECORD ERROR TYPE
      NEW FAULTY COMPUTER = C
      ERROR INDICATOR = MAXIMUM TIME ERROR
    OUTPUT DATA: NONE
  ENDIF
REPEAT
RETURN
END;
```

Referring to Table III-J, the procedure loops for each Computer. It first decrements the Remaining Time, (i.e., REMAINING TIME (C)=REMAINING TIME (C)−1), then checks if the Remaining Time is equal to zero. If the Remaining Time is equal to zero, it is set to a predetermined "timeout time" so that the watch-dog timer will again expire after this timeout time. A Record Error message is then sent to the Fault Tolerator, indicating the faulty Computer and a "maximum time error". The same action is repeated for the watch-dog timer of each computer.

TABLE III-K
START WATCH-DOG TIMER MODULE

```
/*START WATCH-DOG TIMER*/
REMAINING TIME (COMPUTER)
  = MAXIMUM EXECUTION TIME (STARTED TASK)
CALL: SEND MESSAGE TO MESSAGE SEQUENCE
  CHECKER
INPUT DATA: MESSAGE = TASK COMPLETED/
  STARTED MESSAGE
OUPTUT DATA: NONE
RETURN
END;
```

The Pseudo Code program for the Start Watch-Dog Timer Module is given on Table III-K. This procedure is performed when a Task Completed/Started message is received from the Message Format Checker 216. This procedure looks up the Maximum Execution Time for the started task, and places the value in the Remaining Time location of the Watch-Dog Timer Table. The received Task Completed/Started message is then forwarded to the Message Sequence Checker 222.

SYNCHRONIZER

The function of the Synchronizer 226 is to regularly initiate sampling of system inputs and outputs, and to synchronize the sampling period of its own Computer with the sampling periods of the other Computers in the system. It generates sampling numbers which are the same as the sampling numbers generated by like modules in other computers, synchronizes the generation of internal "initiate input/output tasks" messages and generates a Sampling Number message containing the current sampling number at the end of each sampling period. The sampling number generated by the Synchronizer becomes the data value sequence number and the task execution number used in other inter-computer messages transmitted via the communication links.

The Synchronizer also generates internal messages to initiate the execution of start-up and fail-safe tasks when its own Computer is starting or restarting. These functions are only performed when the Computer and/or system is starting or restarting, and are included in the Synchronizer because of the intimate interaction of the start-up operations with sampling command generation. The normal "initiate input/output tasks" messages are not generated during the start-up period, until a predetermined number of Computers in the system are operating and synchronized.

A functional block diagram of the Synchronizer is shown in FIG. 17. Referring to FIG. 17, a signal that the power has been turned "on" in own Computer, either during a first start or restart, is received by the Start Synchronizer Module 458. The Start Synchronizer Module also receives Restart messages from the Check Sampling Timer Module 464 and the Fault Tolerator 228. The Start Synchronizer Module 458 initializes the data stored in the Sampling Data Table 460, including placing the initial sampling period into the Sampling Data Table's sampling period timer. The Start Synchronizer Module also sends an internal "initiate fail-safe task" message to the Scheduler 206.

The Sampling Data Table 460 is also used by the Check Sampling Timer Module 464 and Find Sampling Number Agreement Module 466. The Check Sampling Timer Module 464 regularly checks the Remaining Time in the sampling period timer, stored in the Sampling Data Table, in order to detect the end of each sampling period. At the end of each sampling period, it restarts the sampling period timer for the next sampling period, sends a Sampling Number message to the Transmitter 212 and checks if a "voted sampling number" was obtained during the sampling period. If no "voted sampling number" was obtained, it restarts the Start Synchronizer Module 458 and sends an internal "Restart" message to the Start Fault Handler Module 231 and Scheduler 206.

The Find Sampling Number Agreement Module 466 receives the Sampling Number messages passed by the Message Format Checker 216, and performs a voting procedure on the sampling numbers received from the various Computers to obtain a "voted sampling number". When a "voted sampling number" is obtained, the module adjusts the Remaining Time in the sampling period timer, so that its sampling period more nearly coincides with the sampling periods of the other Computers, and records the "voted sampling number" as its own Current Sampling Number. It also sends to the Schedule an "initiate start-up task" message when the system B starting, and sends an "initiate input/output tasks" message to initiate sampling of system inputs and outputs.

The Sampling Data Table 460 stores the following items for each Computer in the system, as well as the other entries shown in Table III-L.

TABLE III-L

| SAMPLING DATA TABLE |
|---|
| Stored for Each Computer in the System: |
| Last Data Received |
| Last Sampling Number |

TABLE III-L-continued

| SAMPLING DATA TABLE |
|---|
| Last Excluded Bits |
| Last Starting Flag |
| Other Items Stored: |
| Remaining Time |
| Current Sampling Number |
| Voted Sampling Number |
| Starting |
| Current Excluded Bits |
| Count |
| Other Count |
| Disagreement Flags |
| Other Match |

The "Last Data Received" is a flag bit showing whether a Sampling Number message has been received from that Computer, containing a sampling number different than the last "Voted Sampling Number". The "Last Sampling Number", "Last Excluded Bits", and "Last Starting Flag" are other information contained in the Sampling Number message last received from that particular Computer.

The "Remaining Time" is a number indicative of the time remaining in the sampling period. The Remaining Time item is functionally the Synchronizer's sampling period timer. The "Current Sampling Number" is the sampling number for the sampling period currently being timed by this sampling period timer. The "Voted Sampling Number" item is the last sampling number received in a Sampling Number message which agreed with enough previously received sampling numbers to equal or exceed the voting threshold. The "Starting" item is a flag bit indicating if this Computer is currently starting or restarting. The "Current Excluded Bits" identify which Computers are currently excluded by this Computer, and are the same as stored in the Fault Status Table to be described hereinafter.

The "Count" is the number of Computers whose Last Sampling Numbers agree. The "Other Count" is the number of Computers also having the same Last Excluded Bits and Last Starting Flag. The "Disagreement Flags" is an array of 1-bit flags, one for each Computer, indicative of the Computers whose Last Sampling Number disagrees with the "voted sampling number". The "Other Match" item is a 1-bit flag indicating whether the Last Excluded Bits and Last Starting Flag information also agree with information in the received message.

The modules and the table of the Synchronizer may be implemented by hardware or by means of a programmed microcomputer. In a hardware implementation, the Sampling Data Table 460 would be a set of registers or a conventional random access memory (RAM) of the type know in the art. If the synchronizer modules are implemented using a microcomputer such as the Model 8048 manufactured by Intel, the Sampling Data Table would comprise a section of its internal random access memory.

The Psuedo Code program for the Start Synchronizer Module is given on Table III-M. As previously indicated, the Start Synchronizer Module procedure is performed when power is turned on, and when a Restart message is received from the Check Sampling Timer Module or Fault Tolerator.

TABLE III-M
START SYNCHRONIZER MODULE

```
/*INITIALIZE SAMPLING DATA TABLE*/
LOOP FOR C = 1 TO MAXIMUM COMPUTER /*LOOP
  FOR EACH COMPUTER*/
LAST DATA RECEIVED (C) = FALSE
REPEAT
CURRENT SAMPLING NUMBER = 1
VOTED SAMPLING NUMBER = 0
REMAINING TIME = INITIAL SAMPLING PERIOD
STARTING = TRUE
CALL: SEND MESSAGE TO SCHEDULER
INPUT DATA:
MESSAGE TYPE = INITIATE SPECIAL TASKS TYPE
TASK TYPE = FAIL-SAFE TYPE
EXECUTION NUMBER = 0
OUTPUT DATA: NONE
RETURN
END;
```

Referring to Table III-M, the Start Synchronizer Module initializes the data in the Sampling Data Table 460. It sets the Last Data Received flag to false for each Computer. It also sets the Current Sampling Number to 1, sets the Voted Sampling Number to 0, places the constant initial sampling period value in the "Remaining Time" register, and sets the Starting flag to "true". It then sends an "initiate fail-safe task" message to the Scheduler. This procedure is performed each time the Synchronizer is started, or a "voted sample number" is not obtained during a sampling period.

The Psuedo Code program for the Check Sampling Timer Module 464 is given on Table III-N.

TABLE III-N
CHECK SAMPLING TIMER MODULE

```
/*DECREMENT REMAINING TIME IN SAMPLING
  PERIOD TIMER*/
REMAINING TIME = REMAINING TIME - 1
IF REMAINING TIME = 0 /*IF TIMER NOW EXPIRED*/
THEN
/*IF VOTED SAMPLING NUMBER OBTAINED DURING
  PERIOD*/
IF VOTED SAMPLING NUMBER = CURRENT
  SAMPLING NUMBER
THEN /*START TIMER FOR NEXT SAMPLING PERIOD*/
REMAINING TIME = DESIRED SAMPLING PERIOD
CURRENT SAMPLING NUMBER = MODULO 256
  (CURRENT SAMPLING NUMBER + 1)
ELSE /*RESTART SYSTEM*/
CALL: SEND MESSAGE TO
START FAULT HANDLER
INPUT DATA:
MESSAGE TYPE = RESTART TYPE
OUTPUT DATA: NONE
CALL: SEND MESSAGE TO SCHEDULER
INPUT DATA:
MESSAGE TYPE = RESTART TYPE
OUPTPUT DATA: NONE
CALL: SEND MESSAGE TO START SYNCHRONIZER
  MODULE
INPUT DATA: MESAGE TYPE = RESTART TYPE
OUTPUT DATA: NONE
ENDIF
CALL: SEND MESSAGE TO TRANSMITTER
INPUT DATA:
MESSAGE TYPE = SAMPLING NUMBER TYPE
SAMPLING NUMBER = CURRENT SAMPLING NUMBER
EXCLUDED BITS = CURRENT EXCLUDED BITS
STARTING FLAG = STARTING
OUTPUT DATA: NONE
ENDIF
RETURN
END;
```

The Check Sampling Timer Module procedure is performed at regular time intervals, for example every 0.1 millisecond. The procedure decrements the "Remaining Time" in the sampling period timer until the sampling period timer expires, as indicated by the Remaining Time becoming equal to zero.

Each time the sampling period timer expires, a check is made whether or not a "voted sampling number" was obtained during the completed sampling period. If a "voted sampling number" was obtained before the Remaining Time is decremented to zero, a constant desired sampling period value is placed in the Remaining Time entry of the Sampling Data Table. This starts the sampling period timer for the next sampling period. The Current Sampling Number is then incremented to the next higher sampling number, modulo 256.

If no "voted sampling number" was obtained before the sampling period timer expired, the system is restarted by sending a Restart message to the Start Fault Handler Module 231, the Start Synchronizer Module 458 and the Scheduler. Whether or not a "voted sampling number" was obtained before the sampling period timer expired, a Sampling Number message is sent to the Transmitter 212. This message contains the Current Sampling Number, the Excluded Bits identifying the excluded Computers, and a bit identifying whether the Computer is starting.

The Find Sampling Number Agreement Module 466 is implemented by the Psuedo Code program shown in Table III-O, which uses the subroutines Find Computers That Agree shown in Table III-P, Restart Sampling Timer shown in Table III-Q, and Record Voted Sampling Number shown in Table III-R.

TABLE III-O
FIND SAMPLING NUMBER AGREEMENT MODULE

```
/*STORE NEW SAMPLING NUMBER MESSAGE
  INFORMATION*/
LAST SAMPLING NUMBER (COMPUTER) = SAMPLING
  NUMBER
LAST EXCLUDED BITS (COMPUTER) = EXCLUDED
  BITS
LAST STARTING FLAG (COMPUTER) = STARTING
  FLAG
LAST DATA RECEIVED (COMPUTER) = TRUE
/*IF VOTED RESULT ALREADY OBTAINED*/
IF SAMPLING NUMBER = VOTED SAMPLING NUMBER
THEN /*DISCARD NEW VALUE*/
LAST DATA RECEIVED (COMPUTER) = FALSE
ELSE
CALL: FIND COMPUTERS THAT AGREE
INPUT DATA: SAMPLING NUMBER = SAMPLING
  NUMBER
EXCLUDED BITS = EXCLUDED BITS
STARTING FLAG = STARTING FLAG
COMPUTER = COMPUTER
OUTPUT DATA: COUNT = COUNT
DISAGREEMENT FLAGS = SAME
OTHER MATCH = OTHER MATCH
/*IF ENOUGH COMPUTERS AGREE*/
IF COUNT > OR = SAMPLING NUMBER VOTING
  THRESHOLD
THEN /*STORE VOTED SAMPLING NUMBER*/
VOTED SAMPLING NUMBER = SAMPLING NUMBER
CURRENT SAMPLING NUMBER = SAMPLING NUMBER
/*MARK LAST DATA NOT RECEIVED*/
LOOP FOR C = 1 TO MAXIMUM COMPUTER
LAST DATA RECEIVED (C) = FALSE
REPEAT
CALL: RESTART SAMPLING TIMER
INPUT/OUTPUT DATA: NONE
CALL: RECORD VOTED SAMPLING NUMBER
INPUT DATA: EXCLUDED BITS = SAME
DISAGREEMENT FLAGS = SAME
STARTING FLAG = STARTING FLAG
OUTPUT DATA: NONE
ENDIF
ENDIF
```

TABLE III-O-continued
FIND SAMPLING NUMBER AGREEMENT MODULE
RETURN
END;

Referring to Table III-O, the Find Sampling Number Agreement module is initiated whenever a Sampling Number message is received from the Message Format Checker. The procedure first stores the sampling number, excluded bits and starting flag of the received Sampling Number message, as the Last Sampling Number, Last Excluded Bits, and Last Starting Flag, respectively, in the Sampling Data Table for the Computer that sent the message. The Last Data Received flag is also set to true. If the same "voted sampling number" was already obtained, i.e., if the received sampling number agrees with the Voted Sampling Number, the data is discarded by setting the Last Data Received flag to false.

If the same "voted sampling number" was not obtained, the subroutine Find Computers That Agree, given in Table III-P, is called. It compares the received sampling number with the previously received Last Sampling Numbers stored in the Sampling Data Table 460, and generates a "Count" of the number of sampling numbers which agree. The Count is then compared with the predetermined sampling number voting threshold. If the Count is equal to or greater than the sampling number voting threshold, this sampling number is a new "voted sampling number". The received sampling number is stored in the Sampling Data Table 460 as the Voted Sampling Number and as the Current Sampling Number. The procedure then resets all the Last Data Received flags to false, and calls the subroutines Restart Sampling Timer, given in Table III-Q, and Record Voted Sampling Number, given on Table III-R.

The Restart Sampling Timer subroutine adjusts the "Remaining Time" of the sampling period timer, so that the sampling period timer will be more closely synchronized with the corresponding sampling period timers of the other Computers in the system. The Record Voted Sampling Number subroutine, given in Table-III-R, checks which Computers sent Sampling Number messages having sampling numbers which disagree (Disagreement Flag=true) with the "voted sampling number". A Record Error message is sent to the Fault Tolerator identifying each Computer which sent a sampling number which disagrees with the "voted sampling number".

The Find Computers That Agree subroutine Pseudo Code is given on Table III-P. This procedure is comparable to the Find Values that Agree subroutine, of the Redundant Value Voter 220 (Table III-F). The procedure compares the received sampling number against the Last Sampling Numbers received from the other Computers, stored in the Sampling Data Table 460, for which the Last Data Received flag is "true". If the sampling numbers agree, the Count is incremented to Count+1. If the excluded bits also agree and if the Last Starting Flag is the same as the received starting flag, the Other Count is incremented to Other Count+1. If the sampling numbers do not agree, the Disagreement Flag for the corresponding Computer is set to true, otherwise the corresponding Disagreement Flag is set to false.

If the Starting flag is true, the procedure sets the Count equal to the Other Count and sets other match to "true". Alternatively, if the Starting flag is false, the procedure checks the value of Count. If count is equal to Other Count, then the Other Match flag is set to "true"; otherwise, Other Match is set to false.

TABLE III-P
FIND COMPUTERS THAT AGREE
```
COUNT = 1
OTHER COUNT = 1
/*LOOP FOR EACH COMPUTER*/
LOOP FOR C = 1 TO MAXIMUM COMPUTER
IF LAST DATA RECEIVED (C) = TRUE
ANDIF C NOT = COMPUTER
THEN /*CHECK IF INFORMATION AGREES*/
IF LAST SAMPLING NUMBER (C) = SAMPLING
  NUMBER
THEN
COUNT = COUNT + 1
IF LAST EXCLUDED BITS (C) =
   EXCLUDED BITS
ANDIF LAST STARTING FLAG (C) =
   STARTING FLAG
THEN
OTHER COUNT = OTHER COUNT + 1
ENDIF
/*ASSIGN VALUE TO DISAGREEMENT FLAG*/
DISAGREEMENT FLAGS (C) = FALSE
ELSE
DISAGREEMENT FLAGS (C) = TRUE
ENDIF
ELSE
DISAGREEMENT FLAGS (C) = FALSE
ENDIF
REPEAT
IF STARTING = TRUE
THEN /*REQUIRE OTHER INFORMATION MATCH*/
COUNT = OTHER COUNT
OTHER MATCH = TRUE
ELSE /*DETERMINE "OTHER MATCH" STATE*/
IF OTHER COUNT = COUNT
THEN
OTHER MATCH = TRUE
ELSE
OTHER MATCH = FALSE
ENDIF
ENDIF
RETURN
END;
```

The Restart Sampling Timer subroutine given in Table III-Q adjusts the "Remaining Time" in the sampling period timer, when needed, to synchronize the sampling period timer with the consensus of the other Computers. The sampling period timers in the various Computers do not run at exactly the same speed, due to manufacturing variances. Unless periodically corrected, the timers would slowly drift out of synchronization. The Restart Sampling Timer subroutine is called after each "voted sampling number" is obtained and performs this correction.

Referring to FIG. 18, the sampling periods are repetitively generated such that when a sampling period ends, the next sampling period begins. Consider a sampling period which starts at an arbitrary time "t" and ends at a time $(t+\tau)$, where "$\tau$" is the time duration of the sampling period. The time "$\tau$" is the desired sampling period previously discussed.

If the sampling periods in all Computers were synchronized, they would all start the sampling period at time t. At time t, each Synchronizer would also send a Sampling Number message, at the end of the previous period. However, these messages would be received by a Synchronizer at various later times, due to random non-zero delays in sending messages and in processing reeived messages. Among other things, these delays depend upon how many messages are stored in the buffers associated with the Transmitter 212 and Receivers 202, at the instant that a Sampling Number message arrives at a buffer. The times at which various Sampling Number messages are received by a particular Synchronizer are indicated by the vertical lines 468 on FIG. 18.

The latest possible time that a Sampling Number message generated at the time t can be received is designated $t_2$ on FIG. 18. This latest possible time depends upon buffer sizes, and must be before time $t+\tau$. The Find Sampling Number Agreement Module obtains a "voted sampling number" when a predetermined number of Sampling Number messages have been received, containing the same sampling number. For example, the system may require that three messages be received having the same sampling numbers. Therefore, a "voted sampling number" cannot be obtained until after the third message is received. The time $t_1$ represents the earliest time a voted sampling number may be obtained, if all the sampling period timers in the system are synchronized. On the other hand, a voted sampling number may not be obtained until time $t_2$, when several Computers are faulty.

The Sampling Number message producing the "voted sample number", indicated by at line 470 time $t_3$ in FIG. 18, may be received at any time between time $t_1$ and time $t_2$. The time between $t_1$ and $t_2$ defines a "window" in the sampling period during which a "voted sampling number" is expected to be obtained. Since the sampling period timer stores the Remaining Time in the period, the window can be defined as being between a "maximum remaining time" equal to $\tau-t_1$, and a "minimum remaining time" equal to $\tau-t_2$.

Figure 19:
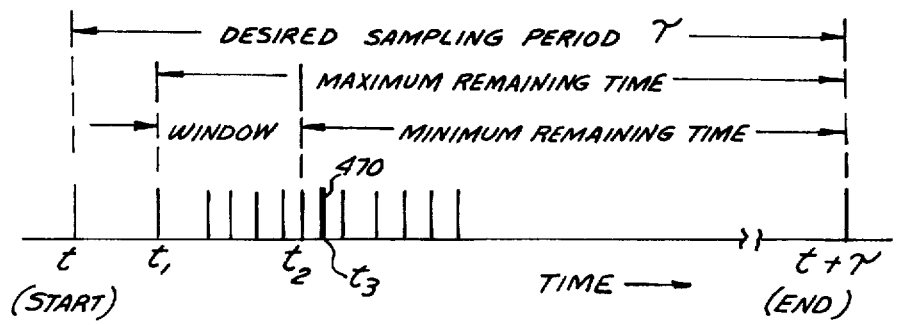

If the sampling period timer of a particular Synchronizer is running at a faster speed than like sampling period timers in the other Computers, its sampling period will end before the sampling periods of the other timers in the system. The Sampling Number messages from the other Computers will therefore be received somewhat later in the subsequent sampling period, as indicated in FIG. 19. If the "voted sampling number" is obtained from a Sampling Number message received outside the window defined by the maximum $(\tau-t_1)$ and minimum $(\tau-t_2)$ remaining times, again indicated by the line 470, the sampling period timer needs to be corrected to keep it synchronized with the other sampling period timers. This may be done by replacing the current Remaining Time of the sampling period timer with the "maximum remaining time". This will extend the time of the current sampling period, such that the "voted sampling number" should be obtained within the window during the subsequent sampling periods.

Figure 20:
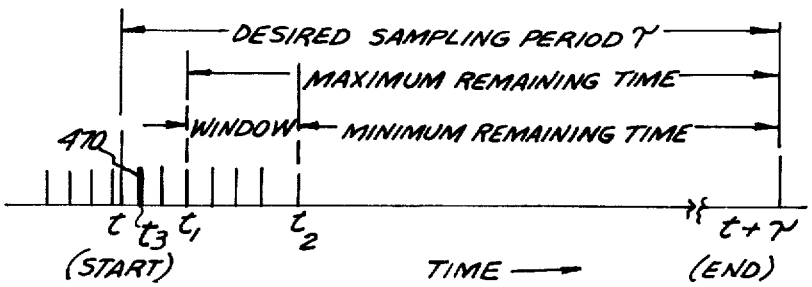

Alternatively, if the sampling period timer of a Synchronizer is slow, the "voted sampling number" will be obtained prior to the occurrence of the window, as indicated on FIG. 20. In this case, the sampling period can be corrected by substituting the minimum remaining time for the Remaining time of the sampling period timer. This substitution will cause the current sampling period to end sooner and the next sampling period to start at an earlier time, adjusting the period of this sampling period timer so that it is in closer synchronization with the other sampling period timers in the system.

TABLE III-Q

RESTART SAMPLING TIMER

/*CASE OF REMAINING TIME*/
IF REMAINING TIME > MAXIMUM REMAINING TIME

TABLE III-Q-continued

RESTART SAMPLING TIMER

THEN
REMAINING TIME = MINIMUM REMAINING TIME
ELSE IF REMAINING TIME < MINIMUM REMAINING TIME
THEN
REMAINING TIME = MAXIMUM REMAINING TIME
/*ELSE DO NOTHING*/
ENDIF ENDIF
/*ENDCASE*/
RETURN
END;

The Restart Sampling Timer subroutine, given in Table III-Q, is called by the Find Sampling Number Agreement Module previously discussed, after the "voted sampling number" is obtained. The subroutine first checks if the current Remaining Time of the sampling period timer is greater than the predetermined maximum remaining time. If it is, the Remaining time of the sampling period timer is set equal to the predetermined minimum remaining time. If it is not, the Remaining Time of the sampling period timer is compared with the predetermined minimum remaining time. If the Remaining Time is less than the minimum remaining time, the Remaining Time in the sampling period is set equal to the predetermined maximum remaining time. When the sampling period timer is (approximately) synchronized with the other sampling period timers in the system, neither of the above conditions will exist and the subroutine will do nothing.

TABLE III-R

RECORD VOTED SAMPLING NUMBER

/*CHECK FOR VOTING DISAGREEMENT ERRORS*/
/*LOOP FOR EACH COMPUTER*/
LOOP FOR C = 1 TO MAXIMUM COMPUTER
IF DISAGREEMENT FLAGS (C) = TRUE
THEN
CALL: SEND MESSAGE TO FAULT TOLERATOR
INPUT DATA:
MESSAGE TYPE = RECORD ERROR TYPE
NEW FAULTY COMPUTER = C
ERROR INDICATOR =
SAMPLING NUMBER VOTING ERROR
OUTPUT DATA: NONE
ENDIF
REPEAT
/*CHECK FOR COMPUTERS EXCLUDED BY OTHER COMPUTERS*/
IF STARTING = TRUE
THEN
/*LOOP FOR EACH COMPUTER*/
LOOP FOR C = 1 TO MAXIMUM COMPUTER
IF EXCLUDED BITS (BIT C) = TRUE
AND IF OWN COMPUTER NOT = C
THEN
CALL: SEND MESSAGE TO FAULT TOLERATOR
INPUT DATA:
MESSAGE TYPE = RECORD ERROR TYPE
NEW FAULTY COMPUTER = 0
ERROR INDICATOR =
VOTED EXCLUSION CODE
OUTPUT DATA: NONE
ENDIF
REPEAT
ENDIF
/*CHECK FOR ENTIRE SYSTEM STARTING*/
IF STARTING = TRUE
THEN
STARTING = FALSE
IF STARTING FLAG = TRUE
THEN
CALL: SEND MESSAGE TO SCHEDULER
INPUT DATA:
MESSAGE TYPE =

TABLE III-R-continued
RECORD VOTED SAMPLING NUMBER

```
INITIATE SPECIAL TASKS TYPE
TASK TYPE = STARTUP TYPE
EXECUTION NUMBER = 0
OUPUT DATA: NONE
ENDIF
ENDIF
CALL: SEND MESSAGE TO SCHEDULER
INPUT DATA: MESSAGE TYPE = INITIATE SPECIAL
   TASKS TYPE
TASK TYPE = INPUT-OUTPUT TYPE
EXECUTION NUMBER = VOTED SAMPLING NUMBER
OUTPUT DATA: NONE
RETURN
END;
```

The Record Voted Sampling Number subroutine is given in Table III-R. It is called by the Find Sampling Number Agreement Module, when the "voted sampling number" is obtained. The subroutine begins by looping for each Computer and checking the Disagreement Flags determined by Find Computers That Agree. This is done to identify all Computers which sent Sampling Number messages having sampling numbers which disagreed with the new "voted sampling number", as identified by "true" Disagreement Flags. Record Error messages are sent to the Fault Tolerator identifying each error as a "sampling number voting error" and the Computer which sent the disagreeing sampling number.

If the Starting flag in the Sampling Data Table is "true", the procedure again loops for each computer. It sends a Record Error message signifying as faulty each other Computer identified by a "true" bit in the excluded bits received in the Sampling Number message. As previously described, the Find Computers That agree, subroutine ensures that the excluded bits also agree, when the Starting flag is "true".

The subroutine then checks if the entire system is starting. If its own computer is starting, as indicated by the Starting flag in the Sampling Data Table, and if the entire system is starting, as indicated when the received (voted) starting flag is true, the procedure sets Starting to false and sends an internal "initiate start-up task" message to the Scheduler. The subroutine ends by sending an "initiate input/output tasks" message to the Scheduler, having the "voted sampling number" as the execution number for the initiated input and output tasks assigned to its own Computer.

Figure 21:
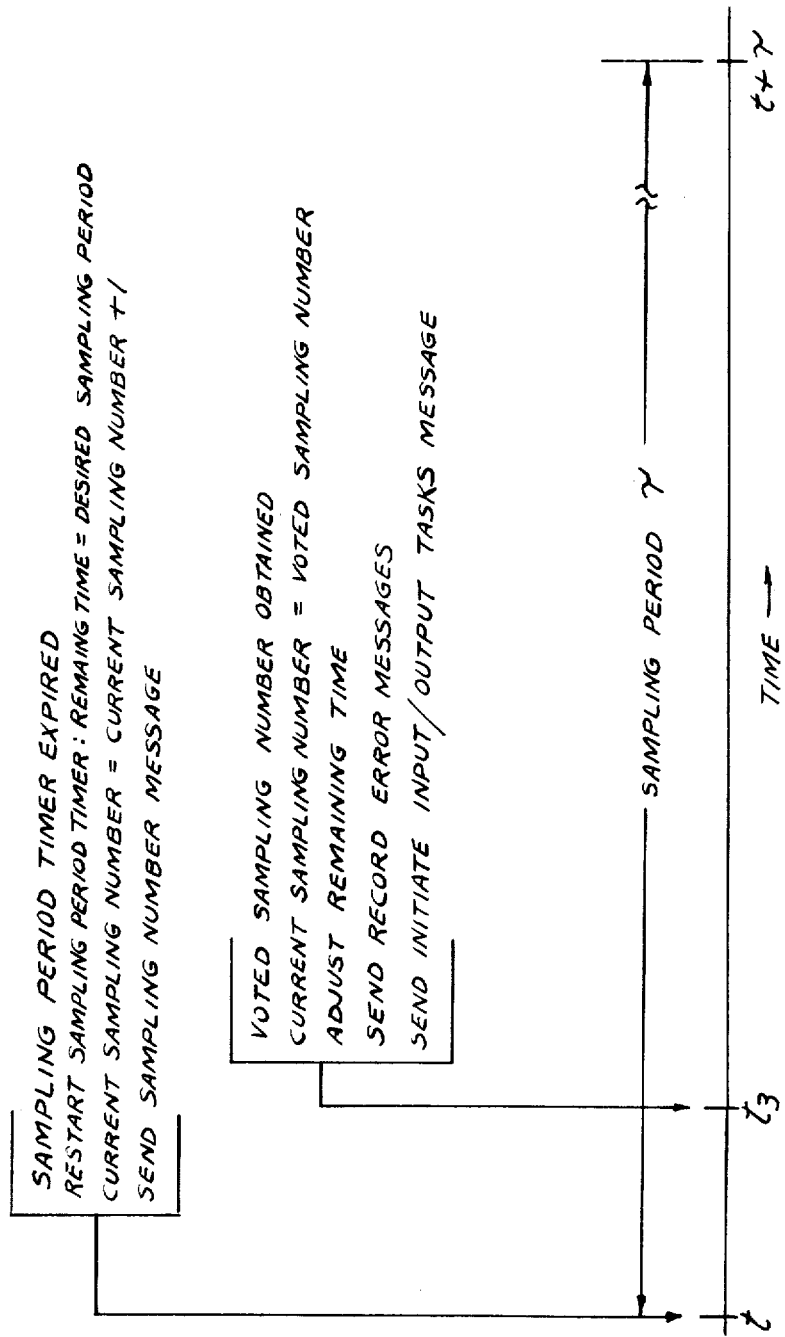
FIG. 21 is a time-sequence chart showing the sequence of events during normal operation of the Synchronizer.

The sequence of events during normal operation of the Synchronizer will be explained with reference to FIG. 21. When the sampling period timer expires, at the end of the preceeding sampling period designated as time "t", the sampling period timer is restarted by loading the desired sampling period value into the Remaining Time of the sampling period timer. The Synchronizer then increments the Current Sampling number by one, and sends a Sampling Number message to the Transmitter identifying its new sampling number to all of the other Computers.

The Synchronizer subsequently receives the Sampling Number messages generated by other Computers, and at time $t_3$ will obtain a new "voted sampling number". The Synchronizer then stores the Voted Sampling Number, adjusts the Remaining Time in the sampling period timer if required, and sends any necessary Record Error messages to the Fault Tolerator. It also sends an "initiate input/output tasks" message to the Scheduler, initiating scheduling of the input and output tasks assigned to its own Computer. After performing the above, it waits until the sampling period timer expires and a new sampling period begins.

Figure 22:
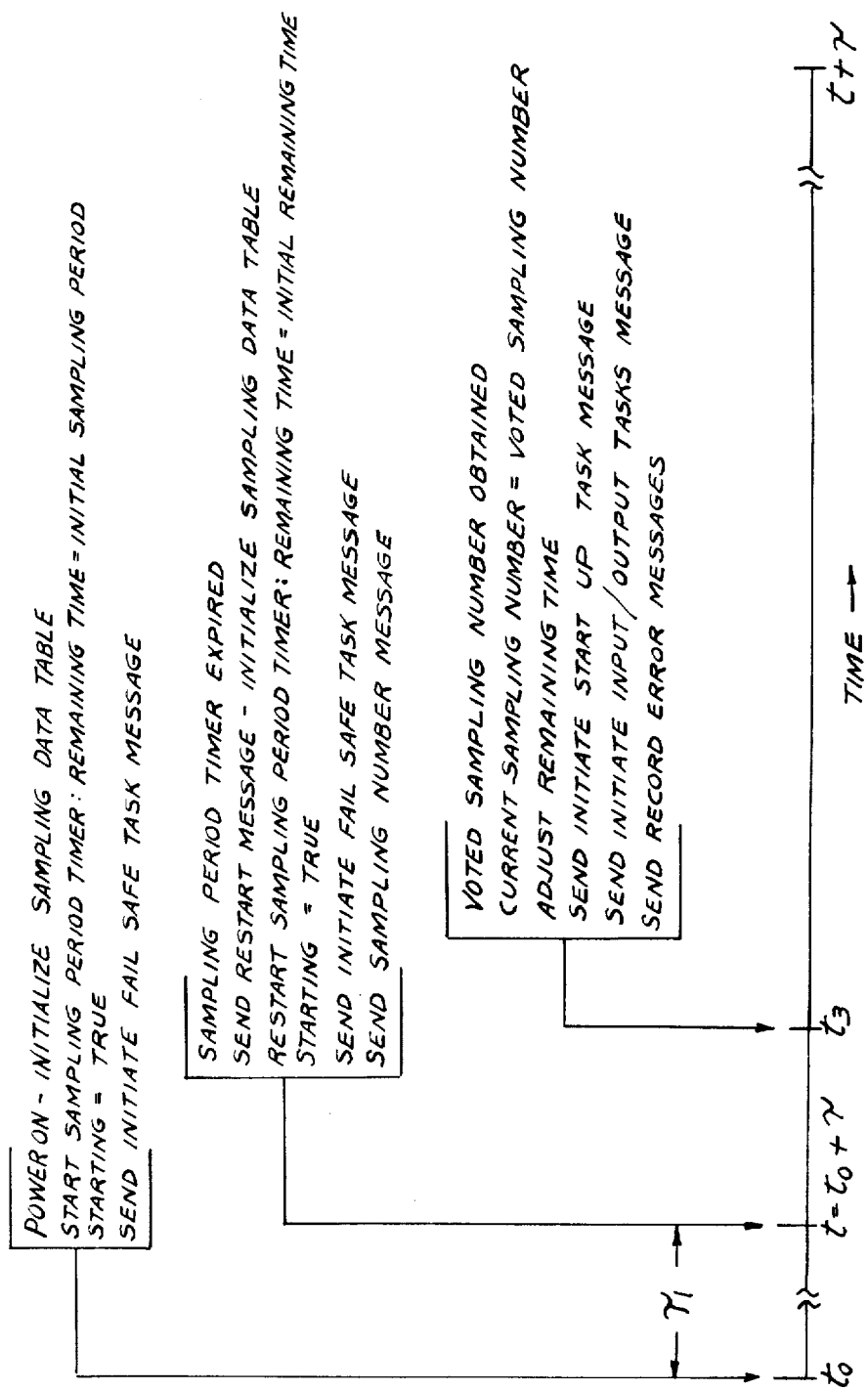
FIG. 22 is a time-sequence chart showing the sequence of events during a start or restart of the Synchronizer.

The sequence of events when the Synchronizer is starting or restarting is shown on FIG. 22. When the power is turned on at time $t_0$, the Start Synchronizer Module 458 initializes the Sampling Data Table 460, and starts the sampling period timer by placing the initial sampling period value in the sampling period timer. It then sends an "initiate fail-safe task" message to the Scheduler, causing the Scheduler to schedule the fail-safe task(s) which output safe values for the system outputs connected to its own Computer. The duration of the initial sampling period ($\tau_1$) is selected to be significantly longer than the normal or desired sampling period ($\tau$), to allow for the asynchronous starting of timers in the system, and the receiving of their respective Sampling Number messages.

When all of the Computers are starting together, such as when the power is simultaneously applied, no Sampling Number messages are generated by any of the Computers during the initial sampling period indicated by the time period from $t_0$ to t. As a result, a "voted sampling number" is not obtained before the end of the first initial sampling period, at time $t = t0 + \tau^1$. At time t, each Synchronizer generates a Restart message, reinitializes the Sampling Data Table 460, restarts the sampling period timer by again placing the initial sampling period value into the sampling period timer, and generates an "initiate fail-safe task" message. The Sampling Number messages generated at the end of the first initial sampling period, time t, are subsequently received during the second (restarted) initial sampling period. If no "voted sampling number" is obtained during the second initial sampling period, this process is repeated until a "voted sampling number" is obtained.

Once a "voted sampling number" is obtained, indicated as time $t_3$, the Synchronizer assumes the "voted sampling number" as its own Current Sampling Number and readjusts the Remaining Time in its sample period timer as previously described. After the first "voted sampling number" is obtained, the Synchronizer sends to the Scheduler an "initiate start-up task" message and an "initiate input/output tasks" message. It also sends Record Error messages to the Fault Tolerator identifying any of the Computers which sent Sampling Number messages containing sampling numbers which are different from the "voted sampling number". The system is now synchronized and assumes its normal mode of operation as discussed with reference to FIG. 21.

When the system is already in operation and one or more Computers are separately started, the application of electrical power to the Computer being started at time $t_0$ causes the Sampling Data Table 460 to be initialized, the initial sampling period value to be placed in the sample period timer, and an "initiate fail-safe task" message to be generated. Because the other Computers in the system are already in operation, Sampling Number Messages are received from the other Computers during the first initial sampling period. A "voted sampling number" may be obtained before the end of initial sampling period, i.e., time $t_3$ may occur before time $t = t_0 + \tau 1$ on FIG. 22.

The Synchronizer responds to obtaining the first "voted sampling number" in almost the same manner as it responds to obtaining the first "voted sampling number" when all of the Computers are being started together. When the first "voted sampling number" is obtained, the Synchronizer uses the "voted sampling number" as its own Current Sampling Number, adjusts the Remaining Time of the sample period timer, sends an "initiate input/output tasks" message, and sends Record Error Messages. However, an "initiate start-up task" message is not sent if the other computers are not starting.

If a "voted sampling number" is not obtained during the first initial sampling period, the late-starting Synchronizer operates as previously discussed with respect to FIG. 22. At the end of the first initial sampling period, at time t, the Synchronizer generates a restart message, reinitializes of the Sampling Data Table, places the initial sampling period in the sampling period timer, and generates an "initiate fail-safe task" message. This procedure is repeated until a "voted sampling number" is obtained and the Computer being started is synchronized with the operating Computers.

FAULT TOLERATOR

Figure 23:
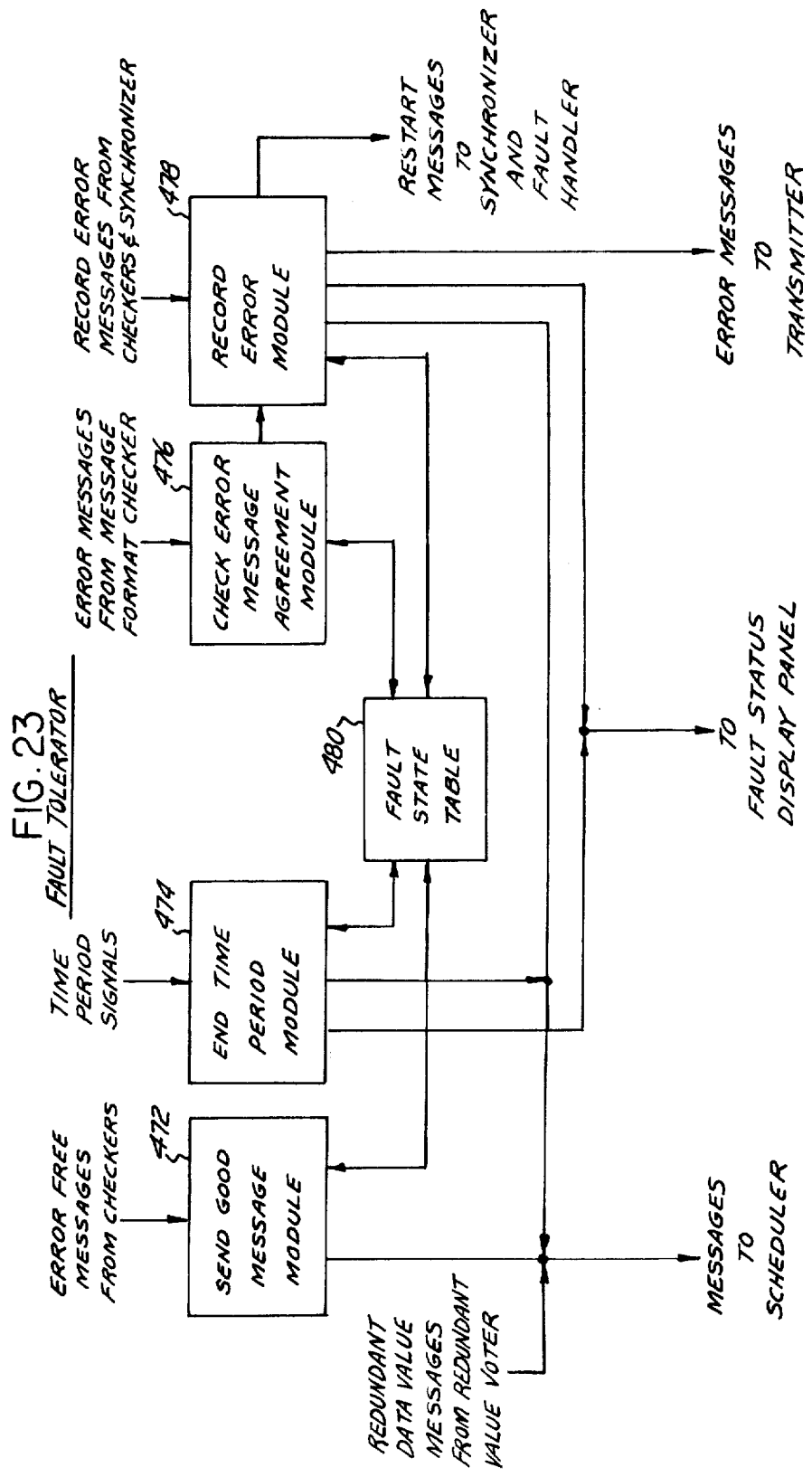
FIG. 23 is a block diagram of the Fault Tolerator.

A functional block diagram of the Fault Tolerator 228 is shown in FIG. 23. The Fault Tolerator 228 comprises four functional modules: the Send Good Message Module 472, the End Time Period Module 474, the Check Error Message Agreement Module 476 and the Record Error Module 478. All of these modules communicate via a Fault State Table 480.

The Send Good Message Module 472 receives error-free messages from the checkers, and sends them to the Scheduler if the Computer which sent the message is not currently excluded. The End Time Period Module 474 receives a time signal at the end of each time period, and re-admits previously excluded Computers after a predetermined number of error free time periods have passed. The Redundant Data Value messages received from the Redundant Value Voter are passed on to the Scheduler, without being processed by any module.

The Check Error Message Agreement Module 476 receives the error-free Error messages directly from the Message Format Checker 216, and determines when a particular Computer is faulty and should be excluded. This action is taken even if its own checkers have not detected any errors in the messages received from that Computer. A computer is deemed to be faulty when a predetermined number of Computers have sent Error messages identifying the particular Computer as faulty.

The Record Error Module 478 receives the internal Record Error messages from its own checkers and Synchronizer, as well as the messages generated by the Check Error Message Agreement Module 476, and generates messages identifying the Computers which are deemed to be faulty and which should be excluded. Exclude Computer messages are sent to the Scheduler 206. The Record Error Module also sends an Error message to the Transmitter 212 identifying a Computer its own checkers have deemed to be faulty, and identifying the type of error found; these messages are sent to all Computers. The Record Error and End Time Period Modules also send information to the Fault Status Display Panel, identifying the Computers deemed to be faulty.

The Fault State Table 480 stores the current fault state of each Computer in the system, and the last Error message received from each Computer. This table is accessed by all of the modules in the Fault Tolerator.

The items stored in the Fault State Table 480 are listed in Table III-S.

TABLE III-S
FAULT STATE TABLE

Items stored for each Computer in the system:
Remaining Periods
Error Message Sent
Last Message Received
Last Faulty Computer
Last Error Type Code
Other items stored
Current Excluded Bits
Faulty Bits
Starting The "Remaining Periods" is an integer indicative of the remaining number of error-free time periods which must pass before the associated Computer is re-admitted into the system. If this number is non-zero, the Computer is currently excluded. The "Error Message Sent" is a flag bit which shows whether an Error message has been sent during the current time period identifying the associated Computer as being faulty. This flag bit is used to reduce repeated sending of Error messages identifying the same Computer as faulty.

The "Last Message Received" is an integer having a range of from 0 to 2 which shows whether an Error message has been received recently from the associated Computer. The value is set to 2 when an Error message is received and is decremented at the end of each time period. The value is set to zero when an Error message agreement is obtained, for the faulty Computer identified in the Error message. The "Last Faulty Computer" stores the number of the Computer last identified as faulty, in an Error message from the associated Computer. The "Last Error Type Code" is the error type code indicating the type of fault detected for the Last Faulty Computer, also received in the Error message. This item is stored for checkout and diagnostic purposes and is not used by the Fault Tolerator.

The "Current Excluded Bits" contains one bit for each Computer in the system. Each bit shows whether or not the associated Computer is currently excluded by the system. The information contained in the Current Excluded Bits entry is the same as indicated by the Remaining Periods. It is stored in this format for ease of sending messages to other subsystems. This item is accessed each time a Sampling Number message is generated, and its contents are included in the 5th and 6th bytes of the Sampling Number message.

The "Faulty Bits" also contains one bit for each Computer in the system. These bits show whether or not the associated computer either is currently excluded or has been previously excluded by the system (since own Computer last started). The "Starting" item is a flag bit showing whether its own Computer is starting, and is the same as the entry having the same name in the Synchronizer's "Sampling Data Table".

In a hardware implementation of the Fault Tolerator, the Fault State Table 480 would be a read/write component such as a random access memory (RAM). If the Fault Tolerator is implemented using a programmed microprocessor, the Fault State Table 480 would be stored in predetermined storage locations of the microcomputer.

The operation of the various modules in the Fault Tolerator will be discussed with reference to the Psuedo Code programs given on Tables III-T through Table III-X.

The Psuedo Code program for the Send Good Message Module 472 is shown in Table III-S. This procedure is performed whenever any of the following error-free messages are received:
1. A Task Data Value message, from the Reasonable Limits Checker.
2. A Task Unselected/Selected message, from the Message Sequence Checker.
3. A Task Completed/Started message, from the Message Sequence Checker.

TABLE III-T
SEND GOOD MESSAGE MODULE

```
IF REMAINING PERIODS (COMPUTER) = 0 /*IF
NOT EXCLUDED*/
ANDIF STARTING = FALSE
THEN
CALL: SEND MESSAGE TO SCHEDULER
INPUT DATA: MESSAGE = RECEIVED MESSAGE
OUTPUT DATA: NONE
ENDIF
RETURN
END;
```

Referring to Table III-T, as each message is received from the checkers, the Remaining Periods number in the Fault State Table is checked to determine if the Computer which sent the message is currently excluded. If the Remaining Periods value is zero, indicating that the Computer is not excluded, and if own Computer is not starting, the received message is forwarded to the Scheduler 206. If the number of Remaining Periods is non-zero or own Computer is starting, the received message is not forwarded and is effectively discarded.

The Psuedo Code for the End Time Period Module 474 is given on Table III-U. This procedure is performed at regular time intervals, i.e. at the end of each predetermined time period. The predetermined time period preferably will be equal to the normal sampling period, but may be longer or shorter.

TABLE III-U
END TIME PERIOD MODULE

```
/*LOOP FOR EACH COMPUTER*/
LOOP FOR C = 1 TO MAXIMUM COMPUTER
/*ALLOW ERROR MESSAGE TO BE SENT*/
ERROR MESSAGE SENT (C) = FALSE
/*MARK OLD ERROR MESSAGE NOT RECEIVED*/
IF LAST MESSAGE RECEIVED (C) NOT = 0
THEN
LAST MESSAGE RECEIVED (C)
= LAST MESSAGE RECEIVED (C) - 1
ENDIF
/*DECREMENT REMAINING PERIODS*/
IF REMAINING PERIODS (C) NOT = 0
THEN
REMAINING PERIODS (C) =
REMAINING PERIODS (C) - 1
IF REMAINING PERIODS (C) = 0
THEN /*RE-ADMIT COMPUTER*/
CURRENT EXCLUDED BITS (BIT C) =
FALSE
ENDIF
ENDIF
REPEAT
OUTPUT (CURRENT EXCLUDED BITS)
CALL: SEND MESSAGE TO SCHEDULER
INPUT DATA:
MESSAGE TYPE = EXCLUDE COMPUTER TYPE
EXCLUDED COMPUTER = 0
EXCLUDED BITS = CURRENT EXCLUDED BITS
OUPUT DATA: NONE
```

TABLE III-U-continued
END TIME PERIOD MODULE

```
RETURN
END;
```

Referring to Table III-U, the procedure first loops through the Fault State Table entries for each Computer and sets the Error Message Sent flags to "false", permitting Error messages to be sent during the next time period. As shall be explained later, this flag is set to "true" after an Error message is sent identifying the particular Computer as faulty. The procedure also marks the stored Error message for each Computer as not received during the current time period. This is done by decrementing by one (1) the value for each Last Message Received number having a non-zero value, indicating that a time period has passed since the last Error message was received from this Computer.

The procedure then checks the number of Remaining Periods stored in the Fault State Table for each Computer, and decrements the Remaining Periods by one (1) if it is not already zero. If the decremented value of the Remaining Periods is now zero, the Current Excluded Bit associated with that Computer is set to "false", indicating that the Computer is to be re-admitted.

The Current Excluded Bits are output to the Fault Status Display Panel, activating the lamps corresponding to the Computers currently excluded. The lamp indicating that the re-admitted computer was at one time excluded is unaffected by this output, and remains turned "on". An Exclude Computer message is then sent to the Scheduler. This message contains the Current Excluded Bits in which the bit associated with the Computer to be re-admitted has been set to "false", effectively re-admitting this Computer to the system.

The Psuedo Code program for the Check Error Message Agreement Module 476 is given in Table III-V.

TABLE III-V
CHECK ERROR MESSAGE AGREEMENT MODULE

```
/*IF COMPUTER DETECTED OWN ERROR*/
IF FAULTY COMPUTER = COMPUTER
THEN
CALL: SEND MESSAGE TO RECORD ERROR MODULE
INPUT DATA: MESSAGE TYPE = RECORD ERROR
TYPE
NEW FAULTY COMPUTER = FAULTY COMPUTER
ERROR INDICATOR = ERROR TYPE CODE
OUTPUT DATA: NONE
ELSE
/*STORE ERROR MESSAGE INFORMATION*/
LAST FAULTY COMPUTER (COMPUTER) = FAULTY
COMPUTER
LAST ERROR TYPE CODE (COMPUTER) = ERROR
TYPE CODE
LAST MESSAGE RECEIVED (COMPUTER) = 2
/*COUNT COMPUTERS THAT AGREE*/
COUNT = 0
LOOP FOR C = 1 TO MAXIMUM COMPUTER
IF LAST FAULTY COMPUTER (C) = FAULTY
COMPUTER
ANDIF LAST MESSAGE RECEIVED (C) NOT = 0
THEN
COUNT = COUNT + 1
ENDIF
REPEAT
/*IF ENOUGH VALUES AGREE*/
IF COUNT > EXCLUSION THRESHOLD
THEN /*MARK ERROR MESSAGES NOT RECEIVED*/
LOOP FOR C = 1 TO MAXIMUM COMPUTER
IF LAST FAULTY COMPUTER (C) = FAULTY
COMPUTER
THEN
```

TABLE III-V-continued
CHECK ERROR MESSAGE AGREEMENT MODULE

```
LAST MESSAGE RECEIVED (C) = 0
ENDIF
REPEAT
CALL: SEND MESSAGE TO RECORD ERROR MODULE
INPUT DATA:
MESSAGE TYPE = RECORD ERROR TYPE
NEW FAULTY COMPUTER = FAULTY COMPUTER
ERROR INDICATOR =
ERROR MESSAGE AGREEMENT CODE
OUTPUT DATA: NONE
ENDIF
ENDIF
RETURN
END;
```

Referring to Table III-V, the Check Error Message Agreement Module 476 directly receives all of the Error messages passed by the Message Format Checker 216. The procedure first checks if the Computer which sent the Error message detected its own error, i.e., if the faulty Computer identified in the message is the same as the sending Computer. If the Computer detected its own error, the module sends a Record Error message to the Record Error Module. Otherwise, the faulty Computer number or code contained in the Error message is stored in the Fault State Table 480 as the Last Faulty Computer for the Computer which detected the fault. The "error type code" received, identifying the type of fault detected, is stored in the associated Last Error Type Code. The Last Message Received number is set to two (2), indicating that the Error message contents stored were received during the current time period.

The procedure then determines the number of Computers which agree that the identified Computer is faulty. The procedure loops through the Fault State Table entries for each Computer, and generates a "count" of the number of other Computers which have Last Faulty Computer values which identify the same Computer as faulty. The count is incremented (count=count+1) if Last Faulty Computer is the same as the faulty Computer identified in the Error message just received, and if the Last Message Received is not equal to zero.

If the count exceeds a predetermined exclusion threshold, then the identified Computer is to be excluded. The procedure loops through the Fault State Table entries for each Computer, and sets the Last Message Received number to zero (0) for each Computer whose Last Faulty Computer is the same as the Computer identified as faulty in the Error message. The procedure then sends a Record Error message to the Record Error Module. The Record Error message contains the code number of the new faulty Computer and the predetermined "error message agreement" code.

The Psuedo Code for the Record Error Module is given in Table III-W and the Display Faulty Computer subroutine used is given in Table III-X. This procedure is performed when a Record Error message is received, from any Fault Handler module.

TABLE III-W
RECORD ERROR MODULE

```
/*IF SHOULD SEND ERROR MESSAGE*/
IF ERROR MESSAGE SENT (NEW FAULTY
COMPUTER) = FALSE
ANDIF ERROR INDICATOR NOT = ERROR MESSAGE
AGREEMENT CODE
```

TABLE III-W-continued
RECORD ERROR MODULE

```
ANDIF ERROR INDICATOR NOT = VOTED EXCLUSION
CODE
THEN /*SEND ERROR MESSAGE*/
CALL: SEND MESSAGE TO TRANSMITTER
INPUT DATA: MESSAGE TYPE = ERROR MESSAGE
TYPE
FAULTY COMPUTER = NEW FAULTY COMPUTER
ERROR TYPE CODE = ERROR INDICATOR
OUTPUT DATA: NONE
ERROR MESSAGE SENT (NEW FAULTY
COMPUTER) = TRUE
ENDIF
/*EXCLUDE COMPUTER*/
X = REMAINING PERIODS (NEW FAULTY COMPUTER)
REMAINING PERIODS (NEW FAULTY COMPUTER) =
DESIRED EXCLUDED PERIODS
IF X = 0 /*IF COMPUTER NOT ALREADY EXCLUDED*/
THEN
CURRENT EXCLUDED BITS (NEW FAULTY
COMPUTER) = TRUE
IF STARTING = FALSE
THEN
IF NEW FAULTY COMPUTER NOT = OWN COMPUTER
THEN
CALL: SEND MESSAGE TO SCHEDULER
INPUT DATA:
MESSAGE TYPE = EXCLUDE COMPUTER
TYPE
EXCLUDED COMPUTER = NEW FAULTY
COMPUTER
EXCLUDED BITS = CURRENT EXCLUDED BITS
OUTPUT DATA: NONE
ENDIF
CALL: DISPLAY FAULTY COMPUTER
INPUT DATA:
CURRENT EXCLUDED BITS =
CURRENT EXCLUDED BITS
OUTPUT DATA: NONE
/*COUNT NUMBER OF COMPUTERS NOW EXCLUDED*/
COUNT = 0
LOOP FOR C = 1 TO MAXIMUM COMPUTER
/*IF COMPUTER EXCLUDED*/
IF REMAINING PERIODS (C) NOT = 0
THEN
COUNT = COUNT + 1
ENDIF
REPEAT
/*IF THIS COMPUTER SHOULD RESTART ITSELF*/
IF COUNT > ALLOWED NUMBER OF FAILURES
ORIF NEW FAULTY COMPUTER = OWN COMPUTER
THEN /*RESTART OWN COMPUTER*/
CALL: SEND MESSAGE TO SYNCHRONIZER
INPUT DATA:
MESSAGE TYPE = RESTART TYPE
OUTPUT DATA: NONE
CALL: SEND MESSAGE TO START FAULT
HANDLER MODULE
INPUT DATA:
MESSAGE TYPE = RESTART TYPE
OUTPUT DATA: NONE
CALL: SEND MESSAGE TO SCHEDULER
INPUT DATA:
MESSAGE TYPE = RESTART TYPE
OUTPUT DATA: NONE
ENDIF
ENDIF
ENDIF
RETURN
END;
```

The procedure first checks if an Error message should be sent. An error message is sent if the Error Message Sent entry is "false", if the error indicator is not the predetermined errthe error indicator is not the predetermined voted exclusion code. Then the Error Message Sent flag is set to "true". The number of Remaining Periods for the new faulty Computer is then set to the predetermined number of desired excluded periods. If the new faulty Computer was not already excluded, i.e., if the Remaining Periods number was previously equal to zero, the Current Excluded Bit for the new faulty Computer is set to "true".

If the Starting flag is false, the procedure performs other functions needed when a Computer is excluded. If the new excluded Computer is not own Computer, an internal Exclude Computer message is sent to the Scheduler. The Display Faulty Computer subroutine is called to update the outputs to the Fault Status Display Panel 230. The procedure then counts the number of excluded Computers, to determine if it should restart itself. If the count is greater than the predetermined allowed number of failures, or if the new faulty Computer is itself, it sends an internal Restart message to the Synchronizer, Start Fault Handler Module and Scheduler.

TABLE III-X

| DISPLAY FAULTY COMPUTER |
| --- |
| /*LOGICAL OR THE EXCLUDED BITS INTO FAULTY BITS*/ |
| FAULTY BITS = (FAULTY BITS OR CURRENT EXCLUDED BITS) |
| /*OUTPUT TO FAULT STATUS DISPLAY*/ |
| OUTPUT (FAULTY BITS) |
| OUTPUT (CURRENT EXCLUDED BITS) |
| RETURN |
| END; |

The Psuedo Code for the Display Faulty Computer subroutine is given in Table III-X. The procedure logically "OR's" the Current Excluded Bits into the Faulty Bits. The procedure then outputs the contents of the Faulty Bits as Faulty Computer output signals, and outputs the Current Excluded Bits as Excluded Computer output signals. The Faulty Computer output signals activate the lamps for each Computer in the Fault Status Display Panel which indicate that a fault has been detected at some time. The Excluded Computer signals activate the lamps indicating the Computers currently excluded from the system. These latter lamps are turned "off" by the output from the End Time Period Module 474, when the Computer is re-admitted to the system.

START FAULT HANDLER MODULE

The Psuedo Code for the Start Fault Handler Module 231 shown in FIG. 5 is given in Table III-Y. The primary function of this module is to initialize the data tables in the Fault Handler, as indicated in Table III-Y. The procedure is performed whenever power is turned on, or when a Restart message is received. As previously described, a Restart message is sent to the Start Fault Handler Module when an abnormal problem is detected, such as too many Computers being excluded or its own Computer being excluded.

TABLE III-Y

| START FAULT HANDLER MODULE |
| --- |
| /*INITIALIZE REDUNDANT DATA TABLE*/ |
| LOOP FOR D = 1 TO MAXIMUM REDUNDANT DATA ID |
| VOTED SEQUENCE NUMBER (D) = 0 |
| LOOP FOR C = 1 TO MAXIMUM COMPUTER |
| LAST VALUE RECEIVED (D, C) = FALSE |
| REPEAT |
| REPEAT |
| /*INITIALIZE TABLES WITH DATA FOR EACH COMPUTER*/ |
| LOOP FOR C = 1 TO MAXIMUM COMPUTER /*LOOP FOR EACH COMPUTER*/ |

TABLE III-Y-continued

| START FAULT HANDLER MODULE |
| --- |
| /*INITIALIZE COMPUTER STATUS TABLE*/ |
| LAST STARTED TASK (C) = 0 |
| LAST SELECTED TASK (C) = 0 |
| /*INITIALIZE WATCH-DOG TIMERS TABLE*/ |
| REMAINING TIME (C) = TIMEOUT TIME |
| /*INITIALIZE FAULT STATE TABLE*/ |
| REMAINING PERIODS (C) = 0 |
| ERROR MESSAGE SENT (C) = FALSE |
| LAST MESSAGE RECEIVED (C) = 0 |
| CURRENT EXCLUDED BITS = ALL ZERO |
| FAULTY BITS = ALL ZERO |
| STARTING = TRUE |
| REPEAT |
| /*INITIALIZE FAULT STATUS DISPLAY*/ |
| OUTPUT (CURRENT EXCLUDED BITS) |
| OUTPUT (FAULTY BITS) |
| RETURN |
| END; |

SCHEDULER

The function of the Scheduler 206 is to choose the tasks to be executed by its own Applications Computer 100. The task scheduling is data driven, so that only those tasks for which the data is currently available can be selected. Where the data for more than one task is currently available, the selection is made on a task priority basis.

Since there is normally more than one Computer in the system capable of selecting and executing any specific task, the Scheduler also monitors, by means of the Task Unselected/Selected messages, the tasks selected by the other Computers in the system. When a message is received from another Computer indicating that it has selected the same task, the Schedulers in each Computer compare their Computer priority ranking. The Computer with the lower priority then unselects the previously selected task and selects a new one. The Scheduler sends a Task Unselected/Selected message to the Transmitter 212 each time it unselects and selects a new task for execution. It also initiates sending a Task Completed/Started message each time the Applications Computer finishes or completes the execution of a selected task and starts a new task.

Figure 24:
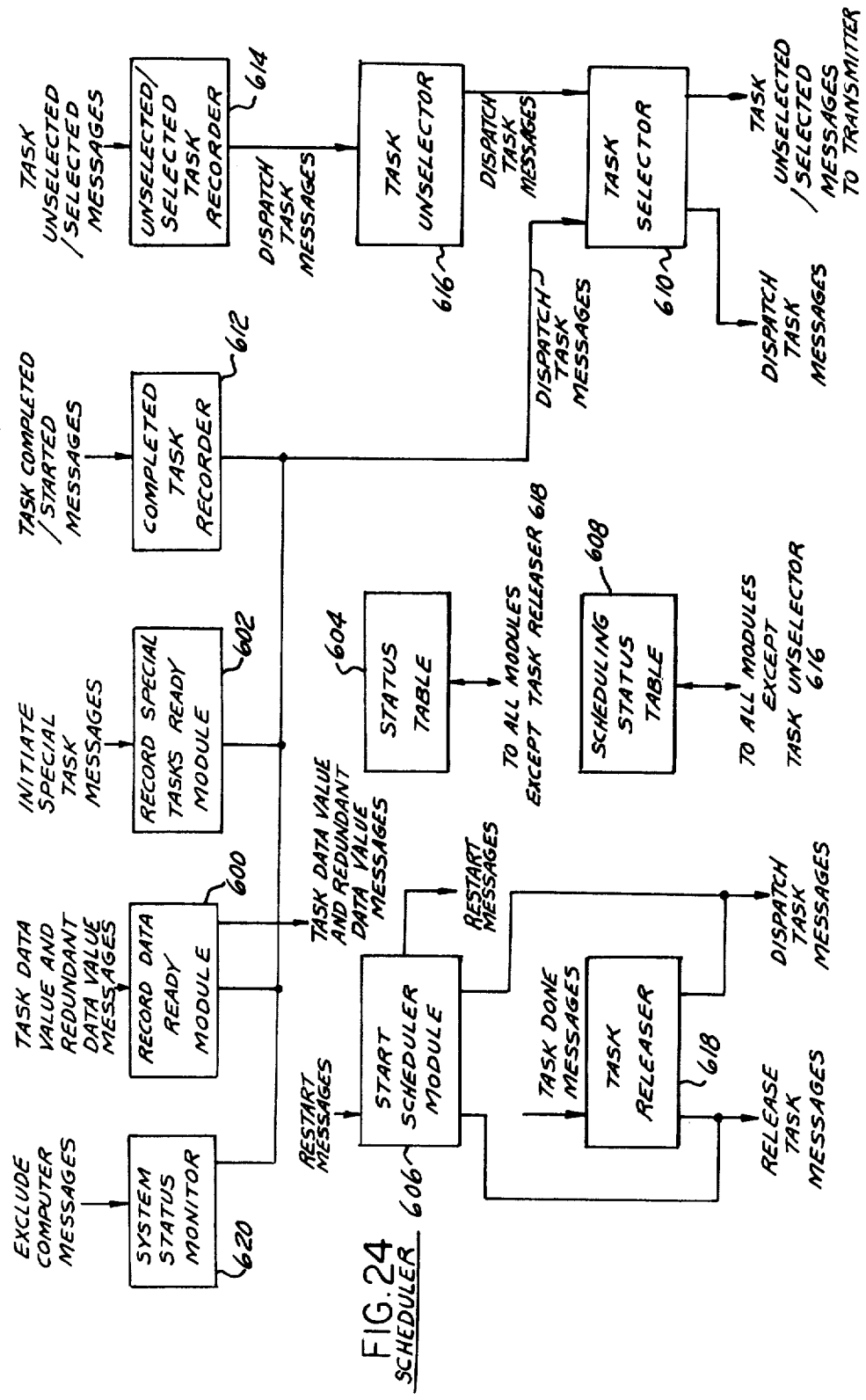
FIG. 24 is a block diagram of the Scheduler.

A functional block diagram of the Scheduler 206 is shown on FIG. 24. The Scheduler comprises two tables of variable data, a Status Table 604 and a Scheduling Status Table 608, plus nine (9) functional modules, a Record Data Ready Module 600, a Record Special Tasks Ready Module 602, a Completed Task Recorder 612, an Unselected/Selected Task Recorder 614, a Task Unselector 616, a Task Selector 610, a Task Releaser 618, a System Status Monitor 620, and a Start Scheduler Module 606. To simplify FIG. 24, the connections representing the data access to the individual tables from the functional modules are not explicitly shown. The Status Table 604 is used by all functional modules except the Task Releaser 618. The Scheduling Status Table 608 is used by all functional modules except the Task Unselector 616.

The Status Table 604 stores the current status of each task which can be executed by (i.e. is assigned to) its own Computer. The Scheduling Status Table 608 stores the current state of scheduling tasks for execution by its own computer. Because much of the operation of the Scheduler involves these two tables, they will be described first.

STATUS TABLE

Figure 25:
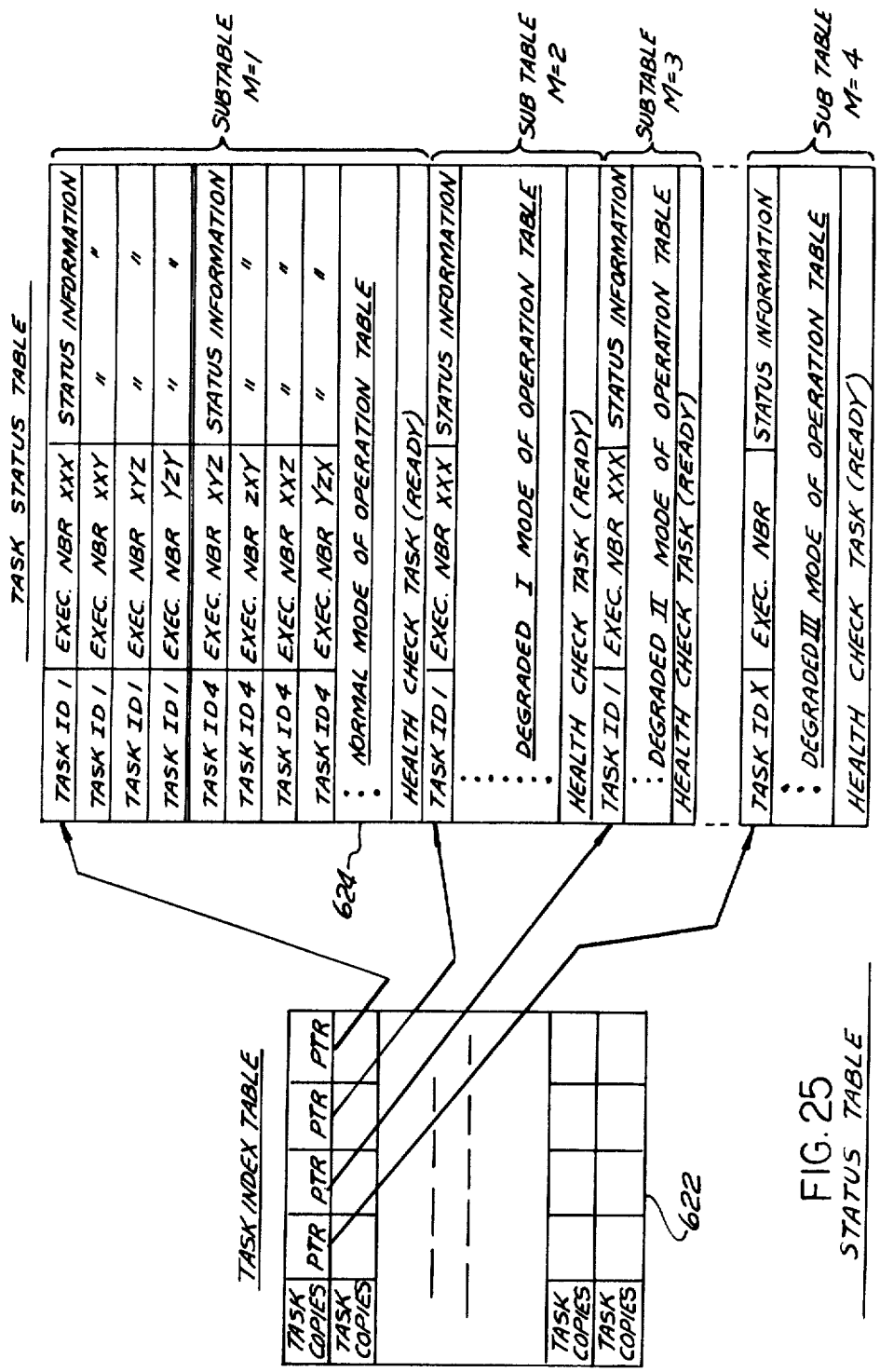
FIG. 25 is a schematic showing the arrangement of the data and subtables of the Status Table.

The Status Table 604 comprises two tables, a Task Index Table 622 and a Task Status Table 624, as shown on FIG. 25. The contents and interrelationship of the Task Index Table and the Task Status Table are discussed with reference to FIG. 25, Table IV-A and Table IV-B.

Referring to FIG. 25, the Task Status Table 624 is divided into MMAX subtables, where MMAX=4 in the example shown. Each subtable corresponds to a different mode of fault-tolerant operation, ranging from a "normal mode" through multiple "gracefully degraded" modes. The operational mode is determined, in most cases, by the number of Computers currently excluded from the system; however, other factors may be considered in determining the system operational mode.

Each subtable contains a list of tasks, in their order of priority, with the Health Check task being the last entry in each subtable. Each task listing contains multiple execution number entries. The table entry for each execution number of each task contains the "Task ID", the "Execution Number", and status information. The Task ID is the constant identification number of the task. The Execution Number is the variable execution number which distinguishes one execution of a task from previous and subsequent executions of the same task. The limited number of execution number entries for a task are used at any time for the execution numbers to be executed in the near future, the execution number currently being executed if any, plus the execution numbers recently executed. Each execution number entry further contains the current status information for that particular task and execution number combination.

The contents of the Task Status Table 624 are listed in Table IV-A.

TABLE IV-A

TASK STATUS TABLE

Mode
Number of Excluded Computers
The following items are repeated for each execution number of each task:

Task ID
Execution Number
Data Ready Bits
Task Ready Bit
Task Completed Bit
Task Selected Bits The Mode and Number of Excluded Computers are single items in the Task Status Table 624, not shown in FIG. 25. The Mode item is the starting address in the Task Status Table of the subtable corresponding to the Computer's current mode of fault-tolerant operation. It determines which of the subtables is searched for the selection of a task ready for execution. The address stored in the Mode entry is determined by the number of Computers currently excluded, as shall be discussed hereinafter with respect to the System Status Monitor 620. The Number of Excluded Computers is the number of Computers which have been excluded from active participation in the system. This number is increased when an Exclude Computer message is received from the Fault Handler 204 signifying that a new Computer has been excluded.

The remaining items listed in Table IV-A are repeated as many times as required. As previously stated, there are MMAX subtables for different modes of fault-tolerant operation. In each subtable, information is stored for each task which must be executed in that mode of operation and which can be executed by this Computer. These tasks include the special input/output, startup, and fail-safe tasks as needed for each mode of operation. For each task, the listed information items are stored for each of a predetermined number of execution numbers, EMAX, which may vary from application to application. (EMAS is 4 in the example shown.)

The Task I.D. and Execution Number are as previously described. The portion of each entry entitled "status information" in FIG. 25 comprises the "Data Ready Bits", "Task Ready Bit", "Task Completed Bit", and "Task Selected Bits" listed in Table IV-A.

The Data Ready Bits show whether data variable values have been received for this particular task and execution number. The Data Ready Bits item consists of a predetermined number "D" of bits, each of which is set to 1 when the corresponding data value is received. Each bit is assigned to one of the data variables which is required (awaited) to permit execution of the corresponding task. Each extra Data Ready Bits, beyond the number of data variables awaited by that task, are not used.

The "Task Ready Bit" is a flag which signifies that all the awaited data values have been received, as signified by all the Data Ready Bits being one's. The "Task Completed Bit" is a flag indicating if this task with this execution number has been completed, by either this Computer or another Computer in the System. The "Task Selected Bits" are an array of bits, one for each Computer in the system, which show whether this task and execution number combination has been selected by a Computer. The bits having a value of one (1) identify the Computers which have selected this task.

No special provision is made in the Task Status Table or Scheduler for tasks which require redundant execution. As previously indicated, a task to be redundantly executed is assigned a separate task identification number (Task I.D.) for each redundant execution desired. The same task program may be used for each of these task numbers. Each separate task number for a redundantly executed task is assigned to a different Computer, so that each copy of the redundantly executed task will be executed by a different Computer. If there are enough Computers, each separate task number may be assigned to two or more Computers, so that any one of these Computers may execute the redundant task copy.

The Task Index Table 622 stores the addresses (pointers) to the same task stored in the MMAX different subtables of the Task Status Table 624. The contents of the Task Index Table are listed in Table IV-B.

TABLE IV-B

TASK INDEX TABLE

Task Copies
The following item is repeated MMAX times:
Pointer

The Task Index Table stores the listed information for each task identification number (Task I.D.) used in the system. For each task, the table stores the "Task Copies" and an array of MMAX "Pointers", one for each mode subtable of the Task Status Table 624. Each "PointerS" is the address (or index) to the information stored in one of the subtables for the first execution number stored for that task.

The Task Copies is the number of Pointers which point to valid copies of the task, in different mode subtables. If the task is not used in all modes, the Task Copies value is less than M. If the task cannot be executed by (i.e. is not assigned to) own Computer, the Task Copies value will be zero. The Task Copies value is also zero for the Health Check task, so that the "status information" for the Health Check task will never be changed and the task will always be ready.

SCHEDULING STATUS TABLE

The Scheduling Status Table 608 stores current scheduling information for its own Computer. The contents of the Scheduling Status Table are listed in Table IV-C.

TABLE IV-C
SCHEDULING STATUS TABLE

Own Selected Task
Own Selected Execution Number
Own Unselected Task
Own Unselected Execution Number
Own Started Task
Own Started Execution Number
Own Completed Task
Own Completed Execution Number
Task Selected The first 8 items in the table give the task identification number and execution number for the tasks most recently selected, unselected, completed, and started by own Computer. The "Task Selected" is a flag bit indicating whether a task selection has been performed since the last task was started (released), as a result of having received the Task Completed/Started message last sent by own Computer.

SCHEDULER STRUCTURE

The structure and operation of the Scheduler 206 will now be discussed with reference to FIG. 24 and the above described tables. Most modules of the Scheduler operate to keep the information stored in the Task Status Table 624 up-to-date. This updating is performed as status changes are signaled by messages received from all Computers (via the Fault Handler), and as status changes are commanded by messages generated by the Fault Handler.

The Record Data Ready Module 600 records the readiness of data variables and tasks, as Task Data Value and Redundant Data Value messages are received from all Computers. The Record Special Tasks Ready Module 602 records the readiness of the special input/output, startup, and fail-safe tasks, as Initiate Special Tasks messages are received from the Synchronizer.

The Completed Task Recorder 612 records the completion of task executions, as Task Completed/Started messages are received from all Computers. The Unselected/Selected Task Recorder 614 records the selection and unselection of tasks, as Task Unselected/Selected messages are received from other Computers. The Task Selector 610 and Task Unselector 616 record the selection and unselection of tasks by own Computer. The System Status Monitor 620 determines and records the proper mode of fault-tolerant system operation, as Exclude Computer messages are received from the Fault Handler. The Start Scheduler Module 606 initializes the data in the Task Status Table, when Restart messages are received from the Fault Handler.

Most of the Scheduler modules, including the Task Releaser 618 not listed in the preceding paragraphs, participate in the scheduling of tasks to be executed by this Computer. This scheduling uses the information stored in the Scheduling Status Table 608. As a result of this scheduling, internal Dispatch Task and Release Task messages are sent to the Task Communicator 208.

The Task Releaser 618 releases for execution the task which was previously selected and dispatched. This action is performed in response to each Task Done message received from the Applications Computer, which indicates the completion of the previously released task. The Task Communicator initiates execution of the selected task, and sends a Task Completed/Started message (to all Computers) signaling the start of the released task, in response to the Release Task message. The Task Releaser 618 also selects the Health Check task and dispatches it, so that a task is always selected and dispatched.

The Completed Task Recorder 612 initiates selection of another task, in response to the Task Completed/Started message received from this Computer. The Task Selector 610 selects another task, in response to the Dispatch Task message sent by the Completed Task Recorder. If the selected task is not the Health Check test, the selected task replaces the Health Check task which was selected by the Task Releaser. The Task Selector also dispatches the selected task and sends a Task Unselected/Selected message to the Transmitter 212, indicating the tasks unselected and selected.

If no other task is ready when the Task Selector 610 selects a task, it selects the Health Check task which is always ready. If another task subsequently becomes ready before the Health Check task is released by the Task Releaser 618, the selection of a task is repeated. Another task can become ready by action of the Record Data Ready Module 600, Record Special Tasks Ready Module 602, or System Status Monitor 620. When another task becomes ready and the Health Check task is currently selected, the appropriate module initiates selection of another task by sending a Dispatch Task message to the Task Selector. The Task Selector 610 then selects a task. This selected task replaces the Health Check task previously selected. The Task Selector again dispatches the selected task and sends a Task Unselected/Selected message indicating which tasks were unselected and selected.

The task selected (other than the Health Check task) may be concurrently selected by the Scheduler in another Computer. This occurs if a Scheduler happens to select a task before it receives and processes the Task Unselected/Selected message sent by another Computer whose Scheduler selected the same task at a slightly earlier time. In this case, the Unselected/Selected Task Recorder 614, in the lower priority Computer(s) which selected that task, responds to the Task Unselected/Selected message from the higher priority Computer. If the selected task has not yet been released by action of the Task Releaser 618, the Unselected/Selected Task Recorder initiates unselection of that task.

The Task Unselector 616 then unselects the task, in response to the Dispatch Task message sent by the Unselected/Selected Task Recorder. The Task Unselector also initiates selection of another task. The Task Selector 610 again selects a task, in response to the Dispatch Task message from the Task Unselector. This newly selected task replaces the task previously selected by the Task Selector. The newly selected task is the Health Check task if no other task is ready. The Task Selector again dispatches the newly selected task to the Task Communicator, and sends a Task Unselected/Selected message to the Transmitter, indicating which tasks were unselected and selected.

The task selection operations of the Scheduler are performed while the Applications Computer is executing the previously selected task, except for the simple operations of the Task Releaser. Thus, the task selection operations performed by the Scheduler do not significantly interfere with the execution of tasks by the Applications Computer. Whenever the Scheduler selects a task, it dispatches that task to the Task Communicator by sending a Dispatch Task message. This indication of the task which might be executed next allows the Task Communicator to prepare the input information needed by the Applications Computer to execute the selected task, while the previously selected task is being executed. Therefore, the time required by the Task Communicator to perform these operations does not interfere with the execution of tasks.

The Start Scheduler Module initializes these scheduling operations, in response to a Restart Message from the Fault Handler, by dispatching and releasing the Health Check task as the first task to be executed. The Start Scheduler Module also selects and dispatches the Health Check task to initiate the normal selection process for the second task to be executed. The Restart message is forwarded to the Task Communicator.

The function of each Scheduler module will now be described in more detail, referring to FIG. 24.

Error-free Task Data Value messages, and Redundant Data Value messages giving voted values, are received by a Record Data Ready Module 600. It records the arrival of the data variable value in the Task Status Table 624 for each task awaiting that value. The Record Data Ready Module sends a Dispatch Task message to the Task Selector 610 when all the data awaited for the execution of a task is received, if a task has been selected and if the current Own Selected Task in the Scheduling Status Table 608 is the Health Check task. The module always forwards the received Task Data Value or Redundant Data Value message to the Task Communicator.

Initiate Special Tasks messages are received by a Record Special Tasks Ready Module 602. It records in the Task Status Table 624 the readiness for execution of the special input/output, startup, or fail-safe tasks of the type specified in the message. The Record Special Tasks Ready Module sends a Dispatch Task message to the Task Selector 610 if a task has been selected and if the Own Selected Task, in the Scheduling Status Table 608, is the Health Check task.

The Task Status Table 624 is also updated for each received Task Completed/Started and Task Unselected/Selected message, received from Computers in the system. A Completed Task Recorder 612 receives the Task Completed/Started messages and sets to "true" the Task Completed Bit in the Task Status Table of the entries having the task and execution numbers of the completed task identified in the message.

In a like manner, an Unselected/Selected Task Recorder 614 receives the Task Unselected/Selected messages and records in the Task Status Table 624 the tasks unselected and selected by all the other Computers in the system. The Unselected/Selected Task Recorder also sends a Dispatch Task message to a Task Unselector 616, when the selected task of the message is the same as the current Own Selected Task for its own Applications Computer, and the sending Computer has a higher priority than its own Computer.

The Dispatch Task message sent by the Unselected/Selected Task Recorder is received by the Task Unselector 616, which records the task as unselected by own Computer, in the Task Status Table. The Task Unselector then forwards the Dispatch Task message to the Task Selector 616.

The Task Selector 610 selects a task for execution, in response to Dispath Task messages received from the Record Data Ready Module 600, the Record Special Tasks Ready Module 602, the Completed Task Recorder 612, the Task Unselector 616, and the System Status Monitor 620. The Task Selector searches the proper mode subtable of the Task Status Table 624 to find the highest priority task which is ready for execution and not selected by any Computer. The Task Selector updates the Scheduling Status Table 608 to show the tasks unselected and selected. A Task Unselected/Selected message is then sent to the Transmitter 212, identifying the task and its execution number unselected by this Computer, plus the new selected task and its execution number. The Task Selector sends the Dispatch Task message to the Task Communicator, indicating the task newly selected.

Upon completion of a task, the Applications Computer 100 sends a Task Done message to a Task Releaser 618. In response to the Task Done message, the Task Releaser generates two messages. The first message is a Release Task message sent to the Task Communicator 208, to cause it to release the previously dispatched task to the Applications Computer for execution. In response to the Release Task message, the Task Communicator sends a Task Completed/Started message informing the other Computers of the task just completed and the new task started. The second message is a Dispatch Task message sent to the Task Communicator 208, to dispatch the Health Check task so as to have a task selected and dispatched at all times. The Health Check task is usually unselected later, and another task selected and dispatched by actions of the Completed Task Recorder 612 and Task Selector 610, as previously described. The Task Releaser 618 also updates the Scheduling Status Table 608 by transferring the Own Selected Task, and its corresponding execution number to the Own Started Task and Own Started Execution Number. It then places the Health Check task and its execution number in the Own Selected Task and Own Selected Execution Number entries.

The current mode of fault-tolerant operation is determined by the System Status Monitor 620, which receives the Exclude Computer messages from the Fault Handler 204. The System Status Monitor 620 places the starting address of the proper subtable to be used during the task selection process in the Task Status Table's Mode entry. When a Computer has been newly excluded, the System Status Monitor will record as unselected, in the Task Status Table, the tasks which were currently being executed and currently selected by the excluded computer. The System Status Monitor also sends a Dispatch Task message to the Task Selector 610, if a task has been selected and if Own Selected Task is the Health Check task, in the Scheduling Status Table 608.

The detailed description of the various functional modules, shown on FIG. 24, will now be discussed in terms of Psuedo Code programs as done in the detailed description of the Fault Handler.

RECORD DATA READY MODULE

The details of the Record Data Ready Module 600 are shown in Table IV-E, plus its included subroutines Find Awaiting Execution Number shown in Table IV-F, Test if Health Check Selected shown in Table IV-G, and its constant table Awaiting Tasks Table shown in Table IV-D.

The Awaiting Tasks Table shown in Table IV-D stores constant information specifying each task which awaits each task data variable. For each such task, the table stores the Awaiting Task, the Delay Integer, and the Data Ready Bit Mask. For each data variable, both redundantly and non-redundantly computed, the table also contains one Task Index value.

TABLE IV-D

AWAITING TASKS TABLE

| The following items are repeated for each task awaiting each data variable: |
| --- |
| Awaiting Task |
| Delay Integer |
| Data Ready Bit Mask |
| The following item is repeated for each data variable: |
| Task Index |

The "Awaiting Task" is the identification number for the task (Task ID) awaiting a data variable. The "Delay Integer" is an integer equal to the difference between the data sequence number and the task execution number. This Delay Integer is used because a task may require data which was received at an earlier time or computed during an earlier sampling period. In such a case, the task execution number must be different from the data sequence number. For each task, the Delay Integer for each input data variable is selected so that the sum (modulo 256) of the desired sequence number plus the Delay Integer is the same execution number. This sum is thus the proper execution number for that task with respect to that particular received data variable value. When the Delay Integer is zero, the task has an execution number which is the same as the sequence number of the input data variable.

The "Data Ready Bit Mask" serves to set to "1" the particular Data Ready Bit in the Task Status Table 624 which corresponds to that particular data variable. The Data Ready Bit Mask contains one bit for each of the "D" Data Ready Bits in the Task Status Table. The Data Ready Bit Mask contains a "1" in the bit position associated with this awaited data variable for the corresponding task. It contains a "0" in the bit positions associated with other awaited data variables for this task, and contains a "1" in each bit position which is not associated with an awaited data variable.

The "Task Index" item in the Awaiting Tasks Table is the index which points to the other information (Awaiting Task, Delay Integer, and Data Ready Bit Mask) for the first task awaiting the corresponding data variable. The difference between the value of the Task Index for a data variable, and the value of the Task Index for the next data variable, is the number of tasks awaiting values of the first data variable.

TABLE IV-E

RECORD DATA READY MODULE

```
/*DETERMINE DATA INDEX AND NUMBER OF TASKS
 FOR MESSAGE TYPE*/
IF MESSAGE TYPE = TASK DATA VALUE TYPE
THEN
DATA POINTER = DATA ID
ELSE /*MESSAGE TYPE = REDUNDANT DATA VALUE
 TYPE*/
DATA POINTER = DATA ID + MAXIMUM DATA ID
ENDIF
DATA INDEX = TASK INDEX (DATA POINTER)
NUMBER OF AWAITING TASKS
 = TASK INDEX (DATA POINTER + 1) - DATA INDEX
READY FLAG = FALSE
/*LOOP FOR EACH AWAITING TASK IN AWAITING
 TASKS TABLE*/
LOOP FOR A = 1 TO NUMBER OF AWAITING TASKS
/* RETRIEVE AWAITING TASK INFORMATION*/
TASK = AWAITING TASK (DATA INDEX, A)
BIT MASK = DATA READY BIT MASK
 (DATA INDEX, A)
AWAITING EXECUTION NUMBER = MODULO 256
 (SEQUENCE NUMBER + DELAY INTEGER
 (DATA INDEX, A))
/*LOOP FOR EACH COPY OF TASK
 (IN EACH MODE SUBTABLE)*/
LOOP FOR M = 1 TO TASK COPIES (TASK)
TASK POINTER = POINTER (TASK, M)
CALL: FIND AWAITING EXECUTION NUMBER
INPUT DATA: TASK POINTER = TASK POINTER
AWAITING EXECUTION NUMBER =
 AWAITING EXECUTION NUMBER
OUTPUT DATA: E = E
FOUND = FOUND
IF FOUND = TRUE
THEN
/*SET THE DATA READY BIT FOR ARRIVED DATA ID*/
DATA READY BITS (TASK POINTER, E)
 = DATA READY BITS (TASK POINTER, E) OR
 BIT MASK
/*IF TASK IS NOW READY*/
IF DATA READY BITS (TASK POINTER, E) = ALL 1
THEN
TASK READY BIT (TASK POINTER, E) = TRUE
READY FLAG = TRUE
ENDIF
ENDIF
REPEAT LOOP
REPEAT LOOP
IF READY FLAG = TRUE
THEN
CALL: TEST IF HEALTH CHECK SELECTED
INPUT/OUTPUT DATA: NONE
ENDIF
CALL: SEND MESSAGE TO TASK COMMUNICATOR
INPUT DATA: MESSAGE TYPE = MESSAGE TYPE
DATA ID = DATA ID
SEQUENCE NUMBER = SEQUENCE NUMBER
DATA VALUE = DATA VALUE
OUTPUT DATA: NONE
RETURN
END
```

Referring to the Psuedo Code program given in Table IV-E, the Record Data Ready Module functions are performed upon receipt of a Task Data Value message, or Redundant Data Value message giving a voted value. The module first determines the "data index" and "number of awaiting tasks" for the received data variable. For Task Data Value messages, a "data pointer" is set equal to the Data ID. For Redundant Data Value messages, the "data pointer" is set equal to the Data ID plus a constant offset, so that different "data pointer" values are obtained for the same Data ID numbers from Redundant Data Value and Task Data Value messages. This "data pointer" is then used to retrieve the proper Task Index from the Awaiting Tasks Table. The "number of awaiting tasks" is determined from the difference between subsequent Task Index entries.

The Record Data Ready Module then loops for each task awaiting that data variable in the Awaiting Tasks Table (A = 1 to Number of Awaiting tasks). Each data variable received may have one or more awaiting tasks, or it may have none. The awaiting task information is prepared for updating the Task Status Table. The "Task" (ID) which identifies the task is set equal to the Awaiting Task for task "A" awaiting that data variable. The Delay Integer for task "A" is added Modulo 256 to the sequence number of the received data message, to produce an "Awaiting Execution Number" for the task. The "bit mask" is set equal to the Data Ready Bit Mask for task "A" awaiting that data variable. The Awaiting Task, Delay Integer and Data Ready Bit Mask for each awaiting task are retrieved from the Awaiting Tasks Table previously discussed.

The procedure then loops for the copies of the awaiting task in each subtable of the Task Status Table 624. The Pointer to task copy M is retrieved from the Task Index Table 622. The procedure calls the subroutine Find Awaiting Execution Number, which finds the "Awaiting Execution Number" for the task copy in the Task Status Table. If the execution number is found, the entry in the Task Status Table 624 is updated by setting to one (1) the Data Ready Bits corresponding to ones in the "Data Ready Bit Mask", indicating that this data variable has now been received.

After setting the proper Data Ready Bits to one (1), the procedure checks to determine if all the data variables required for the execution of this task have been received, as indicated by all the Data Ready Bits being ones (1's). If all the Data Ready Bits are now ones, the Task Ready Bit is set to "true" and a "Ready Flag" is set to "True", to indicate that a task has become ready. The procedure then loops back and repeats for each additional task copy and each additional awaiting task.

After the loops have been completed, the Record Data Ready Module inspects the "Ready Flag", indicating if any task became ready as a result of arrival of a data variable. If a task became ready, the procedure calls the subroutine Test If Health Check Selected, given in Table IV-G, which checks if the Health Check task is currently selected by own Computer and a task selection has been performed. Finally, the received Task Data Value or Redundant Data Value message is forwarded to the Task Communicator.

TABLE IV-F
FIND AWAITING EXECUTION NUMBER

/*SEARCH TABLE FOR AWAITING EXECUTION NUMBER*/
FOUND = FALSE
/*LOOP FOR EACH EXECUTION NUMBER*/
LOOP FOR E = 1 TO EMAX
IF EXECUTION NUMBER (TASK POINTER, E)
= AWAITING EXECUTION NUMBER
THEN
FOUND = TRUE
EXIT LOOP /*RETURN*/
ENDIF
REPEAT LOOP
IF FOUND = FALSE
THEN
/*FIND OLDEST EXECUTION NUMBER*/
SAMPLE INDEX = 1
OLDEST EXECUTION NUMBER
= EXECUTION NUMBER (TASK POINTER, 1)
/*LOOP FOR EACH OTHER EXECUTION NUMBER*/
LOOP FOR E = 2 TO EMAX
/*IF THIS EXECUTION NUMBER IS OLDER*/

TABLE IV-F-continued
FIND AWAITING EXECUTION NUMBER

IF 128 > MODULO 256 (OLDEST EXECUTION NUMBER
 − EXECUTION NUMBER (TASK POINTER, E))
THEN
/*REPLACE OLDEST EXECUTION NUMBER*/
SAMPLE INDEX = E
OLDEST EXECUTION NUMBER
= EXECUTION NUMBER (TASK POINTER, E)
ENDIF
REPEAT LOOP
E = SAMPLE INDEX
/*IF THE OLDEST EXECUTION NUMBER IS OLDER
THAN THE AWAITING EXECUTION NUMBER*/
IF 128 < MODULO 256 (OLDEST EXECUTION NUMBER
 − AWAITING EXECUTION NUMBER)
THEN
/*REPLACE OLDEST EXECUTION NUMBER*/
EXECUTION NUMBER (TASK POINTER, E)
= AWAITING EXECUTION NUMBER
DATA READY BITS (TASK POINTER, E) = ALL 0
TASK READY BIT (TASK POINTER, E) = FALSE
TASK COMPLETED BIT (TASK POINTER, E) = FALSE
TASK SELECTED BITS (TASK POINTER, E) = ALL 0
FOUND = TRUE
ENDIF
ENDIF
RETURN
END

Referring to Table IV-F, the Find Awaiting Execution Number subroutine begins by searching the Execution Numbers for that task, stored in the Task Status Table, to find the "Awaiting Execution Number". If the "Awaiting Execution Number" is the same as one of the Execution Numbers currently stored in the Task Status Table, then the address (Task Pointer, E) of this Execution Number in Task Status Table is the address to be updated.

If the "Awaiting Execution Number" is not found among the Execution Numbers currently stored for that task, the subroutine finds the oldest Execution Number stored for that task copy. This is done using an "Oldest Execution Number" variable which holds the oldest Execution Number found so far, and a "Sample Index" variable which holds the index to the location of that oldest Execution Number stored in the Task Status Table. Each Execution Number stored in the Task Status Table is compared to this Oldest Execution Number.

As previously indicated, the execution numbers are assigned to each task in circular fashion, from 0 to 255, where 0 follows 255. Therefore, the oldest stored execution number is not necessarily the execution number having the lowest numerical value. To compensate for this possibility, the well known "Modulo 256" digital wrap-around logic procedure is employed.

The numerical output Y of a Modulo N (X) procedure is bounded by the values O and N such that $0 \leq Y \leq N$. The proper value Y is determined from the equation $$Y = kN + X$$

where k is a positive or negative integer selected to satisfy the Modulo N limited range of Y. To determine Modulo N (A−B), where A and B are Modulo N values, the value of X = A−B may be either positive or negative. If X has a positive value, k=0 and Y=X. However if X has a negative value, k=1 and Y=N+X. In a like manner, Modulo N (A+B), as used to determine the execution number, uses k=0 when A+B is less than N. When A+B is greater than N, k is negative one (−1) which satisfies the Modulo N limitation on Y.

The older of two execution numbers is determined by comparing the Modulo 256 value of their difference to a predetermined numerical value. A Modulo 256 value less than 128 has been found to acceptably detect the condition that the execution number being subtracted is the older of the two execution numbers.

Returning now to Table IV-F, the subroutine tentatively selects the first Execution Number (Sample Index=1) as the "Oldest Execution Number". It then sequentially subtracts the other Execution Numbers from the "Oldest Execution Number". Each difference is tested to determine if the Modulo 256 value is less than 128. If it is, this Execution Number is deemed to be older than the Oldest Execution Number (initially the first Execution Number), and this Execution Number now replaces the Oldest Execution Number. The procedure repeats the comparison until the Execution Number storage locations are exhausted. The address E=-Sample Index of the final Oldest Execution Number is the address of the oldest Execution Number.

The "Oldest Execution Number" is then tested to determine if it is older than the "Awaiting Execution Number". If it is, the oldest Execution Number stored in the Task Status Table is replaced by the "Awaiting Execution Number", and the Data Ready Bits and Task Selected Bits are all set to zero. Also, the Task Ready Bit and Task Completed Bit are set to "false", and "found" is set to true indicating that the Awaiting Execution Number is (now) in the Task Status Table. The subroutine then returns to its caller, "Record Data Ready".

TABLE IV-G
TEST IF HEALTH CHECK SELECTED

/*IF A TASK HAS BEEN SELECTED AND IF THE
SELECTED TASK IS THE HEALTH CHECK TASK*/
IF TASK SELECTED = TRUE
ANDIF OWN SELECTED TASK = HEALTH CHECK ID
THEN
CALL: SEND MESSAGE TO TASK SELECTOR
INPUT DATA: MESSAGE TYPE = DISPATCH TASK TYPE
OUTPUT DATA: NONE
ENDIF
RETURN
END

The details of the subroutine Test If Health Check Selected are given in Table IV-F. The subroutine simply tests if the Task Selected flag is "true" and Own Selected Task is the Health Check task, in the Scheduling Status Table. If both conditions are met, a Dispatch Task message is sent to the Task Selector 610. In this case, the Dispatch Task message does not identify a specific task, but just triggers the Task Selector to select a task. The Task Selector inserts the selected task in the Dispatch Task message before forwarding it to the Task Communicator.

RECORD SPECIAL TASKS READY MODULE

The details of the Record Special Tasks Ready Module 602 are shown in Table IV-I, plus its subroutines Test If Health Check Selected shown in Table IV-G, and its constant table Special Tasks Table shown on Table IV-H. The Test If Health Check Selected subroutine is the same as used in the Record Data Ready Module, and has already been discussed.

The Special Tasks Table shown in Table IV-H stores the list of special tasks of each special type, which are assigned to this Computer. The special task types are input/output tasks, startup tasks, and fail-safe tasks. There may be only one task of each type, or there may be several different tasks. As with regular tasks, each task may be assigned to more than one Computer, but not to all Computers. Some Computers may be assigned no special tasks of a task type.

TABLE IV-H

| The following item is repeated for each task of each task type: |
|---|
| Special Task |
| The following items are not repeated: |
| Input/Output Index |
| Startup Index |
| Fail-Safe Index |
| Input/Output Number |
| Startup Number |
| Fail-Safe Number |

For each special task type, the Special Tasks Table contains information for each of a variable number of tasks of that type. For each such task, the table stores the first item listed in Table IV-H. The "Special Task" is the identification number for the task (Task ID).

The Special Tasks Table also stores the last 6 items listed in Table IV-H; each of these items is a single entry. The Input/Output Index, Startup Index, and Fail-Safe Index are addresses or indexes pointing to the Special Task entry for the first task of that special task type. The Input/Output Number, Startup Number, and Fail-Safe Number entries specify the number of sequential Special Task entries for that special task type.

TABLE IV-I
RECORD SPECIAL TASKS READY MODULE

/*DETERMINE TASK INDEX AND NUMBER OF TASKS
FOR TASK TYPE*/
/*CASE OF TASK TYPE*/
IF TASK TYPE = INPUT/OUTPUT TYPE
THEN
TASK INDEX = INPUT/OUTPUT INDEX
NUMBER TASKS = INPUT/OUTPUT NUMBER
ELSE IF TASK TYPE = STARTUP TYPE
THEN
TASK INDEX = STARTUP INDEX
NUMBER TASKS = STARTUP NUMBER
ELSE /*TASK TYPE = FAIL-SAFE TYPE*/
TASK INDEX = FAIL-SAFE INDEX
NUMBER TASKS = FAIL-SAFE NUMBER
ENDIF ENDIF
/*END CASE*/
/*LOOP FOR EACH SPECIAL TASK IN THE SPECIAL
TASKS TABLE*/
LOOP FOR A = 1 TO NUMBER TASKS
TASK = SPECIAL TASK (TASK INDEX, A)
/*LOOP FOR EACH COPY OF TASK
(IN EACH MODE SUBTABLE)*/
LOOP FOR M = 1 TO TASK COPIES (TASK)
TASK POINTER = POINTER (TASK, M)
EXECUTION NUMBER (TASK POINTER, 1) =
EXECUTION NUMBER
DATA READY BITS (TASK POINTER, 1) = ALL 1
TASK READY BIT (TASK POINTER, 1) = TRUE
TASK COMPLETED BIT (TASK POINTER, 1) = FALSE
TASK SELECTED BITS (TASK POINTER, 1) = ALL 0
REPEAT LOOP
REPEAT LOOP
CALL: TEST IF HEALTH CHECK SELECTED
INPUT/OUTPUT DATA: NONE
RETURN
END

When an Initiate Special Tasks message is received from the Synchronizer 226, the Record Special Tasks Ready Module 602 performs the functions listed in Table VI-I. The procedure retrieves the proper "Task Index" and "Number Tasks" from the Special Tasks Table, selecting the " . . . Index" and " . . . Number" items corresponding to the special task type specified in the received Initiate Special Tasks message.

The Record Special Tasks Ready Module then loops for each task of that special type stored in the Special Tasks Table. As previously indicated, each Computer may be assigned one or more special tasks; however, under certain conditions a particular Computer may be assigned no special tasks of a type. The "Task" (ID) which identifies the task is set equal to the Special Task for task "A" of that special type.

The procedure then loops for each task copy, specified by Task Copies in the Task Index Table 622, updating information for the same task in each subtable of the Task Status Table 624. The Pointer to task copy M is retrieved from the Task Index Table. The first execution number entry for that task is updated by setting the Execution Number equal to the execution number specified in the Initiate Special Tasks message, setting the Task Ready Bit to "true", and setting the Task Completed Bit to "false". The Task Selected Bits and Data Ready Bits, for that task and execution number, are also set to all "0's" and all "1's", respectively. The procedure then loops back and repeats for each additional task copy and each additional special task of that type.

After the loops have been completed, the Record Special Tasks Ready procedure calls the subroutine Test If Health Check Selected, previously given in Table IV-G. It tests if the Health Check task is currently selected by own Computer and a task selection has been performed. If both conditions are met, a Dispatch Task message is sent to the Task Selector 610, as previously discussed with reference to Table IV-G.

TASK SELECTOR

The details of the Task Selector 610 are shown in Table IV-J, plus the subroutine "Record Task Selected by Own Computer" shown on Table IV-K. The Task Selector module is performed when a Dispatch Task message is received from either the Completed Task Recorder 612, the Task Unselector 616, the Record Data Ready Module 600, the Record Special Tasks Ready Module 602, or the System Status Monitor 620. In all cases, the received Dispatch Task message does not identify a specific task; it just triggers the Task Selector to select a task.

TABLE IV-J

TASK SELECTOR

/*LOOP FOR EACH TASK AND EXECUTION NUMBER
IN THE TASK STATUS SUBTABLE WHICH BEGINS AT
INDEX IN "MODE", CONTINUING UNTIL HEALTH
CHECK TASK IS REACHED*/
TASK INDEX = MODE
LOOP UNTIL EXIT LOOP
IF TASK READY BIT (TASK INDEX) = TRUE
ANDIF TASK COMPLETED BIT (TASK INDEX) = FALSE
ANDIF TASK SELECTED BITS (TASK INDEX) = ALL 0
THEN
/*SELECT THIS TASK*/
TASK = TASK ID (TASK INDEX)
EXECUTION NUMBER =
EXECUTION NUMBER (TASK INDEX)
/*MARK AS SELECTED ALL COPIES OF THIS TASK IN
THE TASK STATUS TABLE*/
LOOP FOR M = 1 TO TASK COPIES (TASK)

TABLE IV-J-continued

TASK SELECTOR

TASK POINTER = POINTER (TASK, M)
LOOP FOR E = 1 TO EMAX
IF EXECUTION NUMBER (TASK POINTER, E)
= EXECUTION NUMBER
THEN
TASK SELECTED BITS (TASK POINTER,
E, OWN COMPUTER) = TRUE
ENDIF
REPEAT LOOP
REPEAT LOOP
CALL: RECORD TASK SELECTED BY OWN COMPUTER
INPUT DATA: TASK = TASK
EXECUTION NUMBER = EXECUTION NUMBER
OUTPUT DATA: NONE
EXIT LOOP
ENDIF
TASK INDEX = TASK INDEX + 1
REPEAT LOOP
RETURN
END

The Task Selector procedure loops through successive tasks and execution numbers, stored in the Task Status Table 624, to find the highest priority task ready for execution which has not already been completed or selected by any Computer. It searches the subtable of the Task Status Table starting with the address found in the Mode item stored in that table. If no other task is ready, the Health Check task at the end of the subtable is always ready and is selected. When a ready task is found, the Task ID and Execution Number are retrieved from the Task Status Table.

The procedure then loops through the subtables (M = 1 to Task Copies) of the Task Status Table 624. It sets the Task Selected Bit which corresponds to its own Computer to "true" for the copy of this task found in each subtable, for the same execution number. The procedure then calls the subroutine Record Task Selected by Own Computer, which enters the selected task and its execution number into Own Selected Task and Own Selected Execution Number in the Scheduling Status Table 608.

TABLE IV-K

RECORD TASK SELECTED BY OWN COMPUTER

/*IF NOT SAME TASK AS PREVIOUSLY SELECTED*/
IF TASK NOT = OWN SELECTED TASK
ORIF EXECUTION NUMBER NOT = OWN SELECTED
EXECUTION NUMBER
THEN
/*REPLACE PREVIOUSLY SELECTED TASK*/
OWN UNSELECTED TASK = OWN SELECTED TASK
OWN UNSELECTED EXECUTION NUMBER
= OWN SELECTED EXECUTION NUMBER
OWN SELECTED TASK = TASK
OWN SELECTED EXECUTION NUMBER = EXECUTION
NUMBER
CALL: SEND MESSAGE TO TRANSMITTER
INPUT DATA: MESSAGE TYPE =
TASK UNSELECTED/SELECTED TASK
UNSELECTED TASK = OWN UNSELECTED TASK
UNSELECTED EXECUTION NUMBER
= OWN UNSELECTED EXECUTION NUMBER
SELECTED TASK = OWN SELECTED TASK
SELECTED EXECUTION NUMBER
= OWN SELECTED EXECUTION NUMBER
OUTPUT DATA: NONE
CALL: SEND MESSAGE TO TASK COMMUNICATOR
INPUT DATA: MESSAGE TYPE = DISPATCH TASK
TYPE
TASK = TASK
EXECUTION NUMBER = EXECUTION NUMBER
OUTPUT DATA: NONE
ENDIF

TABLE IV-K-continued
RECORD TASK SELECTED BY OWN COMPUTER
RETURN
END

The Record Task Selected by Own Computer subroutine, given in Table IV-K, first checks if the selected task and execution number are the same as previously selected, stored in Own Selected Task and Own Selected Execution Number of the Scheduling Status Table. This check is included because the Health Check task might have been selected, having previously been selected. If either the selected task or execution number are not the same, the newly selected task is placed in the Scheduling Status Table, replacing the previously selected task. The previously selected task, stored in Own Selected Task and Own Selected Execution Number, is first unselected by moving these values to Own Unselected Task and Own Unselected Execution Number, respectively. Then the selected task and execution number values are stored in Own Selected Task and Own Selected Execution Number.

A Task Unselected/Selected message is then sent to the Transmitter 212, indicating the tasks unselected and selected. Finally, a Dispatch Task message which identifies the selected task and its execution number is sent to the Task Communicator 208.

Completed Task Recorder

The details of the Completed Task Recorder 612 are given in Table IV-L, plus the included subroutine Test If Last Completed Task shown in Table IV-M.

TABLE IV-L
COMPLETED TASK RECORDER
```
/*LOOP FOR EACH COPY OF THE COMPLETED TASK
IN THE TABLE*/
LOOP FOR M = 1 TO TASK COPIES
(COMPLETED TASK)
TASK POINTER = POINTER (COMPLETED TASK, M)
/*FIND THE COMPLETED EXECUTION NUMBER
IN THE TASK STATUS TABLE*/
LOOP FOR E = 1 TO EMAX
IF EXECUTION NUMBER (TASK POINTER, E)
= COMPLETED EXECUTION NUMBER
THEN
TASK COMPLETED BIT (TASK POINTER, E,
SENDING COMPUTER) = 1
ENDIF
REPEAT LOOP
REPEAT LOOP
IF SENDING COMPUTER = OWN COMPUTER
THEN
CALL: TEST IF LAST COMPLETED TASK
INPUT DATA: COMPLETED TASK = COMPLETED TASK
COMPLETED EXECUTION NUMBER
= COMPLETED EXECUTION NUMBER
STARTED TASK = STARTED TASK
STARTED EXECUTION NUMBER
= STARTED EXECUTION NUMBER
OUTPUT DATA: NONE
ENDIF
RETURN
END
```

When a Task Completed/Started message is received from the Fault Tolerator 228, the Completed Task Recorder 612 records in the Task Status Table 624 the completion of the task identified as completed in the message. This is done whether the Task Completed/Started message was sent by its own Computer or was received from another Computer in the system.

The module begins by looping for each copy of the completed task stored in the subtables of the Task Status Table 624 (M = 1 to Task Copies). The number of Task Copies and the Pointer to each task copy are obtained from the Task Index Table. The procedure then loops for each Execution Number stored in the Task Status Table, to find the stored information for the completed execution number identified in the received Task Completed/Started message. When the same execution number is found, the Task Completed Bit for that entry is set to "true", indicating that execution this task has been completed. If the completed execution number is not found, it is assumed to be an old execution number no longer stored in the Task Status Table, and the message is ignored.

The Completed Task Recorder then tests if its own Computer is the Computer which sent the Task Completed/Started message, and is identified in the message as the sending Computer. If the message was sent by its own Computer, the procedure calls the Test If Last Completed Task subroutine given in Table IV-M, and ends.

TABLE IV-M
TEST IF LAST COMPLETED TASK
```
/*IF IS LAST TASK COMPLETED/STARTED MESSAGE
WHICH WAS SENT AND IF TASK NOT ALREADY
SELECTED*/
IF COMPLETED TASK = OWN COMPLETED TASK
ANDIF COMPLETED EXECUTION NUMBER =
OWN COMPLETED EXECUTION NUMBER
ANDIF STARTED TASK = OWN STARTED TASK
ANDIF STARTED EXECUTION NUMBER =
OWN STARTED EXECUTION NUMBER
ANDIF TASK SELECTED = FALSE
THEN
TASK SELECTED = TRUE
CALL: SEND MESSAGE TO TASK SELECTOR
INPUT DATA: MESSAGE TYPE = DISPATCH TASK TYPE
OUTPUT DATA: NONE
ENDIF
RETURN
END
```

Referring to Table IV-M, the Test If Last Completed Task subroutine first tests if the Task Completed/Started message, received from its own Computer, is the last such message which was sent. This is done by comparing the completed task and started task and their associated execution numbers, contained in the received message, with the corresponding items currently stored in the Scheduling Status Table. If all these items agree, the received message is assumed to be the last message sent. The Task Selected flag in the Scheduling Status Table is also tested for being "false", indicating that a task selection has not already been performed, as a result of receiving an earlier Task Completed/Started message from own Computer. If all the message items agree and the Task Selected flag is "false", the Task Selected flag is set to "true" and a Dispatch Task message is sent to the Task Selector 610, to cause it to select another task (for execution by own Computer when execution of the Started Task is completed). As before, the Dispatch Task message does not identify a specific task, but just triggers the Task Selector to select a task.

UNSELECTED/SELECTED TASK RECORDER

The details of the Unselected/Selected Task Recorder 614 are shown in Table IV-N, plus the included subroutines Record Task Selected shown in Table IV-O and Test If Selected Task shown in Table IV-P.

TABLE IV-N
UNSELECTED/SELECTED TASK RECORDER

```
IF SENDING COMPUTER NOT = OWN COMPUTER
THEN
/*LOOP FOR EACH COPY OF THE UNSELECTED TASK
IN THE TASK STATUS TABLE*/
LOOP FOR M = 1 TO TASK COPIES (UNSELECTED
TASK)
TASK POINTER = POINTER (UNSELECTED TASK, M)
/*FIND THE UNSELECTED EXECUTION NUNBER IN
THE TASK STATUS TABLE*/
LOOP FOR E = 1 TO EMAX
IF EXECUTION NUMBER (TASK POINTER, E)
 = UNSELECTED EXECUTION NUMBER
THEN
TASK SELECTED BITS (TASK POINTER, E,
SENDING COMPUTER) = 0
ENDIF
REPEAT LOOP
REPEAT LOOP
CALL: RECORD TASK SELECTED
INPUT DATA: SELECTED TASK = SELECTED TASK
SELECTED EXECUTION NUMBER
 = SELECTED EXECUTION NUMBER
OUTPUT DATA: NONE
ENDIF
RETURN
END
```

The Unselected/Selected Task Recorder module responds to received Task Unselected/Selected messages, and tests if the message was received from its own Computer. If the message was from own Computer, nothing is done since the selected and unselected tasks have already been recorded in the Task Status Table, by the Task Selector 610 and Task Unselector 616. However, if the message was not from own Computer, the unselected and selected tasks are recorded in the Task Status Table.

The procedure sets to zero the Task Selected Bit corresponding to the Computer which sent the message, for each copy of the unselected task stored in subtables of the Task Status Table 624. The procedure loops for each copy of the task in each subtable (M=1 to Task Copies) of the Task Status Table 624. After the task Pointer is found from the Task Index Table, the procedure loops through the stored Execution Numbers for that task, to locate the entry having the same Execution Number as the unselected task identified in the message. If the execution number is found, the Task Selected Bit associated with the sending Computer is set to zero. The loop is repeated for each execution number, and for each subtable in the Task Status Table which contains a copy of that task.

The Unselected/Selected Task Recorder finishes by calling the Record Task Selected subroutine, which records the selected task in the Task Status Table.

TABLE IV-O
RECORD TASK SELECTED

```
/*LOOP FOR EACH COPY OF THE SELECTED TASK IN
THE TABLE*/ LOOP FOR M = 1 TO TASK COPIES
(SELECTED TASK)
TASK POINTER = POINTER (SELECTED
TASK, M)
/*FIND THE SELECTED EXECUTION NUMBER IN THE
TASK STATUS TABLE*/
LOOP FOR E = 1 TO EMAX
IF EXECUTION NUMBER (TASK POINTER, E)
 = SELECTED EXECUTION NUMBER
THEN
TASK SELECTED BITS (TASK POINTER, E,
ENDIF
REPEAT LOOP
```

TABLE IV-O-continued
RECORD TASK SELECTED

```
REPEAT LOOP
IF SENDING COMPUTER < OWN COMPUTER
ANDIF SELECTED TASK NOT = HEALTH CHECK ID
THEN
CALL: TEST IF SELECTED TASK
INPUT DATA: TASK = SELECTED TASK
EXECUTION NUMBER = SELECTED EXECUTION
NUMBER
OUTPUT DATA: NONE
ENDIF
RETURN
END
```

The Record Task Selected subroutine is given in Table IV-O. This subroutine sets to 1 the Task Selected Bit corresponding to the Computer which sent the message, for each copy of the task stored in the Task Status Table 624. The subroutine first loops for each copy of the selected task in the subtables of the Task Status Table. The number of Task copies is obtained from the Task Index Table, as is the Pointer to the task copy in the subtable of the Task Status Table.

The subroutine then loops through the Execution Numbers (E=1 to Emax) currently stored for that task, to locate the Execution Number which is the same as the selected execution number of the received message. When the Execution Number is located, the procedure sets the Task Selected Bit for the sending Computer to 1. The loop is repeated for each additional Execution Number and for each additional task copy.

When the loops are completed, the subroutine checks if the priority of the Computer which sent the message is higher than the priority of its own Computer. If the other Computer has higher priority and the selected task is not the Health Check task, the Record Task Selected subroutine calls the Test If Selected Task subroutine, given in Table IV-P, to check if the task selected by the other Computer is currently selected by its own Computer.

TABLE IV-P
TEST IF SELECTED TASK

```
/*IF TASK IS NOW SELECTED*/
IF TASK = OWN SELECTED TASK
ANDIF EXECUTION NUMBER =
OWN SELECTED EXECUTION NUMBER
THEN /*UNSELECT TASK*/
CALL: SEND MESSAGE TO TASK UNSELECTOR
INPUT DATA: MESSAGE TYPE =
DISPATCH TASK TYPE
TASK = TASK
EXECUTION NUMBER = EXECUTION NUMBER
OUTPUT DATA: NONE
ENDIF
RETURN
END
```

The Test If Selected Task subroutine is listed in Table IV-P. The subroutine first compares the unselected task and its execution number, from the received message, with its Own Selected Task and Own Selected Execution Number, from the Scheduling Status Table. If they are the same, a Dispatch Task message is sent to the Task Unselector 616, to cause it to unselect the currently selected task. Note that the subroutine does not move the current Own Selected Task and Own Selected Execution Number to the Own Unselected Task and Own Unselected Execution Number, since this is subsequently done by the Task Selector 610.

TASK UNSELECTOR

The details of the Task Unselector 616 are shown in Table IV-Q.

TABLE IV-Q
TASK UNSELECTOR

/*LOOP FOR EACH COPY OF UNSELECTED
TASK IN TASK STATUS TABLE*/
LOOP FOR M = 1 TO TASK COPIES (TASK)
TASK POINTER = POINTER (TASK, M)
LOOP FOR E = 1 TO EMAX
IF EXECUTION NUMBER (TASK POINTER, E) =
EXECUTION NUMBER
THEN
TASK SELECTED BITS (TASK POINTER, E,
OWN COMPUTER) = 0
ENDIF
REPEAT LOOP
REPEAT LOOP
CALL: SEND MESSAGE TO TASK SELECTOR
INPUT DATA: MESSAGE TYPE =
DISPATCH TASK TYPE
OUTPUT DATA: NONE
RETURN
END

When a Dispatch Task message is received from the Unselected/Selected Task Recorder 614, the Task Unselector 616, shown in Table IV-Q, records the task unselection in the Task Status Table 624. The module begins by looping for each subtable (M = 1 to Task Copies) in the Task Status Table for copies of the unselected task. After the task Pointer is obtained from the Task Index Table 622, the procedure loops through the execution number entries (E = 1 to Emax) and locates the entry having the execution number of the unselected task specified in the Dispatch Task Message. The procedure then sets the Task Selected Bit corresponding to its own Computer to zero.

After the loops are completed, the Task Unselector sends the Dispatch Task message to the Task Selector 610, to cause it to select a new task and to send a Task Unselected/Selected message to the Transmitter 212, which indicates the task unselected.

TASK RELEASER

The details of the Task Releaser 618 are shown in Table IV-R.

TABLE IV-R
TASK RELEASER

/*UPDATE SCHEDULING STATUS TABLE*/
OWN COMPLETED TASK = OWN STARTED TASK
OWN COMPLETED EXECUTION NUMBER =
OWN STARTED EXECUTION NUMBER
OWN STARTED TASK = OWN SELECTED TASK
OWN STARTED EXECUTION NUMBER =
OWN SELECTED EXECUTION NUMBER
OWN SELECTED TASK = HEALTH CHECK ID
OWN SELECTED EXECUTION NUMBER =
HEALTH CHECK EXECUTION NUMBER
TASK SELECTED = FALSE
CALL: SEND MESSAGE TO TASK COMMUNICATOR
INPUT DATA: MESSAGE TYPE = RELEASE TASK TYPE
COMPLETED TASK = TASK
COMPLETED EXECUTION NUMBER
= OWN COMPLETED EXECUTION NUMBER
STARTED TASK = OWN STARTED TASK
STARTED EXECUTION NUMBER =
OWN STARTED EXECUTION NUMBER
OUTPUT DATA: NONE
CALL: SEND MESSAGE TO TASK COMMUNICATOR
INPUT DATA: MESSAGE TYPE = DISPATCH TASK TYPE
TASK = OWN SELECTED TASK
EXECUTION NUMBER =

TABLE IV-R-continued
TASK RELEASER

OWN SELECTED EXECUTION NUMBER
OUTPUT DATA: NONE
RETURN
END

The Task Releaser module is performed in response to a Task Done message, received from the Applications Computer 100, signifying that the Applications Computer has completed executing its current task. The procedure begins by updating the Scheduling Status Table 608 for the tasks completed, (to be) started, and selected. This is done by transferring the Own Started Task and Own Started Execution Number values to the Own Completed Task and Own Completed Execution Number. The procedure then transfers the Own Selected Task and Own Selected Execution Number to the Own Started Task and Own Started Execution Number. The "Health Check" task and its execution number are inserted into the Own Selected Task and Own Selected Execution Number of the Scheduling Status Table. The Selected Task flag is set to "false".

The Task Releaser procedure next sends a Release Task message instructing the Task Communicator 208 to release, to the Applications Computer for execution, the task previously dispatched. The previously dispatched task is the task just stored in the Scheduling Status Table as Own Started Task. The Task Communicator also sends, to the Transmitter 212, a Task Completed/Started message informing all of the other Computers in the system of the completed task and the new task started by this Computer.

The Task Releaser finally sends a Dispatch Task message to the Task Communicator 208, to dispatch the next task. This task is the Health Check task now selected and stored in the Own Selected Task and Own Selected Execution Number entries of the Scheduling Status Table 608.

SYSTEM STATUS MONITOR

The details of the System Status Monitor 620 are shown in Table IV-S.

TABLE IV-S
SYSTEM STATUS MONITOR

/*IF A COMPUTER WAS EXCLUDED*/
IF EXCLUDED COMPUTER NOT = 0
THEN
/*COUNT NUMER OF EXCLUDED COMPUTERS*/
COUNT = 0
LOOP FOR C = 1 TO MAXIMUM COMPUTER
IF EXCLUDED BITS (BIT C) = 1
THEN
COUNT = COUNT + 1
ENDIF
REPEAT LOOP
IF COUNT ≠ NUMBER OF EXCLUDED COMPUTERS
THEN
NUMBER OF EXCLUDED COMPUTERS = COUNT
/*DETERMINE MODE CORRESPONDING TO NUMBER OF
EXCLUDED COMPUTERS*/
/* CASE OF NUMBER OF EXCLUDED COMPUTERS*/
IF NUMBER OF EXCLUDED COMPUTERS
= DEGRADED NUMBER (1)
THEN
MODE = DEGRADED START (1)
ELSE IF NUMBER OF EXCLUDED COMPUTERS
= DEGRADED NUMBER (2)
THEN
MODE = DEGRADED START (2)
ELSE IF NUMBER OF EXCLUDED COMPUTERS

TABLE IV-S-continued
SYSTEM STATUS MONITOR

```
= DEGRADED NUMBER (3)
THEN
MODE = DEGRADED START (3)
ENDIF ENDIF ENDIF
/* END CASE*/
ENDIF
/*MARK UNSELECTED ALL TASKS SELECTED BY THE
EXCLUDED COMPUTER*/
/*LOOP FOR THE TOTAL SET OF TASK COPIES*/
LOOP FOR TASK INDEX = 1 TO LAST TASK COPY
IF TASK COMPLETED BIT (TASK INDEX) = FALSE
THEN
TASK SELECTED BITS (TASK INDEX,
EXCLUDED COMPUTER) = 0
ENDIF
REPEAT LOOP
CALL: TEST IF HEALTH CHECK SELECTED
INPUT/OUTPUT DATA: NONE
ENDIF
RETURN
END
```

The System Status Monitor module is performed in response to an Exclude Computer message received from the Fault Handler. The Exclude Computer message indentifies the newly excluded Computer, if any, and also contains the Excluded Bits which show each Computer that is currently excluded from the system. The procedure first tests if the excluded Computer identification, received in the message, indicates that a Computer has been exclued. If a Computer has been excluded, the procedure counts the number of excluded Computers, by counting the number of bits which are "1" in the "excluded bits" received in the message. If this count is greater than the current Number of Excluded Computers in the Task Status Table 624, the Number of Excluded Computers is made equal to the count. The Number of Excluded Computers thus shows the maximum number which have been excluded at one time since this Computer was last restarted.

The procedure then compares the Number of Excluded Computers with each of a set of predetermined "degraded numbers". The "degraded numbers" are the values of the Number of Excluded Computers at which the Scheduler is to switch from one mode to a successive degraded mode of fault-tolerant operation. If the Number of Excluded Computers is equal to the "degraded number" for any of the degraded modes of operation, the starting address of the subtable, in the Task Status Table 624 which contains the tasks for the proper degraded mode of operation, is entered into the Mode entry of the Task Status Table. The starting addresses are obtained from a set of predetermined "degraded start" numbers.

The procedure then loops through all of the tasks and execution numbers in the Task Status Table, to find all task and execution number combinations that have not been completed (Task Completed Bit = "false"). For each task which has not been completed, the Task Selected Bit associated with the newly excluded Computer is set to zero. This setting to zero will change from one to zero the Task Selected Bit for each task previously selected by the newly excluded Computer which has not been completed. The changing of a Task Selected Bit from one to zero signifies that this task is no longer selected and may be selected by the Task Selector 610 the next time it selects a new task, providing no other Computer selects it first.

The System Status Monitor finishes by calling the Test If Health Check Selected subroutine. As previously discussed with reference to Table VI-G, this subroutine tests if the Task Selected flag is "true" and if Own Selected Task is the Health Check task, in the Scheduling Status Table. If both conditions are met, a Dispatch Task message is sent to the Task Selector 610 to initiate selection of a new task.

START SCHEDULER MODULE

The details of the Start Scheduler Module 606 are shown in Table IV-T. The Start Scheduler Module is performed in response to a Restart Message received from the Fault Handler. The procedure first initializes the contents of the Task Status Table 624 and Scheduling Status Table 608. In the Task Status Table, the Mode address is set to the start of the subtable for normal operation, i.e. to the predetermined "normal operation start" value. All other information is set to "false" or "0" except the Task ID values, which are constant, and except the Task Ready Bit for the Health Check task. For the copies of the Health Check task, the Task Ready Bit is set to "true". In the Scheduling Status Table, the completed, started, and selected task values are set to the Health Check task values.

After initializing the tables, the Start Scheduler Module sends four messages to the Task Communicator 208. First, the Restart message is forwarded to restart the Task Communicator. Second, a Dispatch Task message is sent to dispatch the Health Check task as the first task to be executed. Third, a Release Task message is sent to release the Health Check task for execution. Finally, another Dispatch Task message is sent, to dispatch the Health Check task which was automatically selected.

TABLE IV-T
START SCHEDULER MODULE

```
/*INITIALIZE TASK STATUS TABLE*/
MODE = NORMAL OPERATION START
NUMBER OF EXCLUDED COMPUTERS = 0
/*LOOP FOR THE TOTAL SET OF TASK COPIES*/
LOOP FOR TASK INDEX = 1 TO LAST TASK COPY
EXECUTION NUMBER (TASK INDEX) = 0
DATA READY BITS (TASK INDEX) = ALL 0
TASK SELECTED BITS (TASK INDEX) = ALL 0
TASK COMPLETED BIT (TASK INDEX) = FALSE
IF TASK ID (TASK INDEX) NOT = HEALTH CHECK ID
THEN
TASK READY BIT (TASK INDEX) = FALSE
ELSE
TASK READY BIT (TASK INDEX) = TRUE
ENDIF
REPEAT LOOP
/*INITIALIZE SCHEDULING STATUS TABLE*/
OWN COMPLETED TASK = HEALTH CHECK ID
OWN COMPLETED EXECUTION NUMBER =
HEALTH CHECK EXECUTION NUMBER
OWN STARTED TASK = HEALTH CHECK ID
OWN STARTED EXECUTION NUMBER =
HEALTH CHECK EXECUTION NUMBER
OWN SELECTED TASK = HEALTH CHECK ID
OWN SELECTED EXECUTION NUMBER =
HEALTH CHECK EXECUTION NUMBER
TASK SELECTED = FALSE
/*INITIALIZE TASK DISPATCHING AND EXECUTION*/
CALL: SEND MESSAGE TO TASK COMMUNICATOR
INPUT DATA: MESSAGE TYPE = RESTART TYPE
OUTPUT DATA: NONE
CALL: SEND MESSAGE TO TASK COMMUNICATOR
INPUT DATA: MESSAGE TYPE =
DISPATCH TASK TYPE
TASK = HEALTH CHECK ID
EXECUTION NUMBER =
HEALTH CHECK EXECUTION NUMBER
OUTPUT DATA: NONE
```

TABLE IV-T-continued
START SCHEDULER MODULE

```
CALL: SEND MESSAGE TO TASK COMMUNICATOR
INPUT DATA: MESSAGE TYPE =
RELEASE TASK TYPE
COMPLETED TASK = HEALTH CHECK ID
COMPLETED EXECUTION NUMBER
= HEALTH CHECK EXECUTION NUMBER
STARTED TASK = HEALTH CHECK ID
STARTED EXECUTION NUMBER
= HEALTH CHECK EXECUTION NUMBER
OUTPUT DATA: NONE
CALL: SEND MESSAGE TO TASK COMMUNICATOR
INPUT DATA: MESSAGE TYPE =
DISPATCH TASK TYPE
TASK = HEALTH CHECK ID
EXECUTION NUMBER =
HELATH CHECK EXECUTION NUMBER
RETURN
END
```

TASK COMMUNICATOR

The function of the Task Communicator 208 is to store the current values of the data variables needed for the execution of each task assigned to the Applications Computer 100. The values of the data variables are received in Task Data Value and Redundant Data Value messages. The Task Communicator responds to the Dispatch Task and Release Task messages generated by the Scheduler 206, and makes available to the Applications Computer the data required for the task identified in the Dispatch Task message. Upon completion of each task by the Applications Computer, the computed data variables are transmitted back to the Task Communicator. Each of these values is encoded with identifying information such as the sequence number, and forwarded to the Transmitter 212 for transmission to the other Computers in a Task Data Value or Redundant Data Value message. The Task Communicator also checks the execution time of each task executed by the Applications Computer, and sends an Error message to the Transmitter 212 when the execution time is either too long or too short.

TASK COMMUNICATOR STRUCTURE

Figure 26:
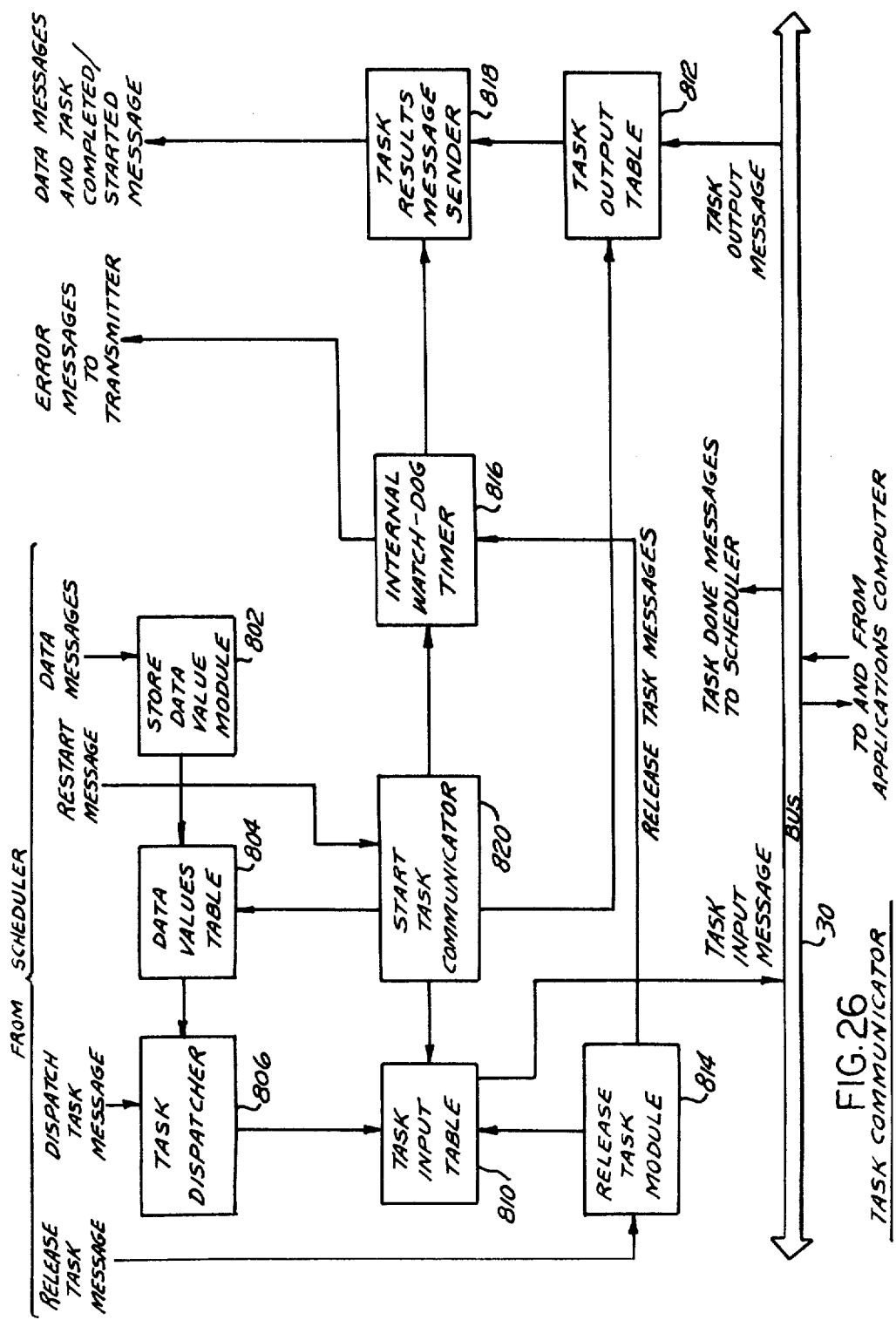
FIG. 26 is a block diagram of the Task Communicator.

A functional block diagram of the Task Communicator 208 is shown in FIG. 26. The error-free Task Data Value and Redundant Data Value messages are received by a Store Data Value Module 802, after passing through the Fault Handler 204 and Scheduler 206. The Store Data Value Module stores the data variable value and its associated sequence number in the Data Values Table 804. The Data Values Table stores information for each data variable that may be used by the Applications Computer 100.

Each Dispatch Task message sent by the Scheduler 206, containing the task and execution number of the task selected to be executed by the Applications Computer 100, is received by a Task Dispatcher 806. The Task Dispatcher finds the data in the Data Values Table 804 which is required for the execution of the identified task. The Task Dispatcher copies the required data values from the Data Values Table into the Task Input Table 810, thereby making them ready for sending to the Applications Computer 100 via the Buss 30. The Task Input Table 810 stores, in separate buffers, the input data variables for the task which the Applications Computer is currently executing and for the task it will execute after it completes the execution of the current task.

As the Applications Computer executes each task, it stores the values of data variables computed by the task in a Task Output message. The Task Output message is stored in a Task Output Table 812 via the Buss 30. When execution of a task is completed, the Applications Computer sends a Task Done message directly to the Scheduler 206. The Task Output Table stores, in separate buffers, the data variables of the task previously completed by the Applications Computer and the data variables generated by the task it is currently executing.

Each Release Task message sent by the Scheduler 206 is received by the Release Task Module 814. The Release Task Module sends a Task Input message to the Applications Computer via the Task Input Table where it is stored. The Task Input message contains the task input data previously assembled by the Task Dispatcher 806, and the starting address in the Applications Computer program memory of the instructions for executing that task. After sending the Task Input message, the Release Task message is forwarded to the Internal Watch-Dog Timer 816.

The Internal Watch-dog Timer checks the execution time of the task just completed. If the execution time is shorter than the minimum execution time or longer than the maximum execution time, the Internal Watch-dog Timer sends an Error message to the Transmitter for transmission to all Computers; this Error message indicates own Computer as the faulty Computer. When a Release Task message is received, the Internal Watch-Dog Timer starts timing the execution time of the started task, and forwards the Release Task message to the Task Results Message Sender 818.

The Task Results Message Sender 818 reeives the Release Task message and sends messages to the Transmitter 212 for forwarding to all the Computers in the system. For each data variable generated by the complete task and stored in the Task Output Table 812, either a Task Data Value message or a Redundant Data Value message is sent. After sending the data value messages, a Task Completed/Started message is sent, indicating the task completed and the new task started by the Applications Computer.

A Restart message, sent by the Fault Handler 204 via the Scheduler 206, is received by a Start Task Communicator 820. The Start Task Communicator starts or restarts the Task Communicator by initializing the data variables in the Data Values Table 804 with desired initial values, resetting the Internal Watch-dog Timer 816 to zero, and initializing the Task Input and Task Output Tables 810 and 812 respectively.

The individual blocks shown on FIG. 26 will be discussed in terms of Psuedo Code programs, as done in the previous sections. Although discussed with reference to a Psuedo Code program suitable for a microprocessor such as the Intel 8080, it is submitted that one skilled in the art could reduce each of the procedures presented to a hardware embodiment without undue effort or experimentation, as previously shown by example in the Fault Handler section.

Prior to the detailed discussion of the functional modules of the Task Communicator, the three tables shown in FIG. 26 and their contents will be discussed.

DATA VALUES TABLE

The Data Values Table 804 stores the values of data variables contained in Task Data Value and Redundant Data Value messages received by the Store Data Value Module 802. The contents of the Data Values Table 804 are listed in Table V-A. Data is stored for each data variable which is an input to any task assigned to own Computer. For each data variable, the table stores the data values for each of a predetermined number of different sequence numbers. In the example given in Table V-A, the data values are stored for four different sequence numbers. To limit storage requirements, information is only stored for the last four different sequence numbers received.

TABLE V-A

| DATA VALUES TABLE |
|---|
| For each data variable, the table stores the following items for each of four different sequence numbers: |
| Stored Sequence Number |
| Stored Data Value |

The Stored Sequence Number is the sequence number contained in a received Task Data Value or Redundant Data Value message, and the Stored Data Value is the value of the associated data variable. The Stored Data Values are stored in eight, 8-bit bytes. In a hardware implementation, the Data Values Table 804 would be a Random Access Memory (RAM) of the type known in the art.

TASK INPUT TABLE

The Task Input Table 810 stores the "Task Input" messages to be sent to the Applications Computer. A table is used for communication of the Task Input message to avoid the need to move this large message to other memory locations, by the Task Releaser 814 and by the Applications Computer Executive Program. The Task Input Table stores the input data values for tasks identified in Dispatch Task messages received by the Task Dispatcher 806. These values are copied from the Data Values Table 804. The data in the Task Input Table is made available to the Applications Computer for task execution.

The Task Input Table comprises two buffers, one storing the information for the task currently being executed by the Applications Computer and the other storing information for the next task to be executed. Each of the buffers stores the information listed in Table V-B. The Input Value item is stored for each of a predetermined maximum number of data variables. This predetermined number of data variables may be 16, as shown in the example of Table V-B.

TABLE V-B

| TASK INPUT TABLE Items stored in each buffer: | |
|---|---|
| NAME | NO. STORED |
| Input Value | 16 |
| Input Ready | 1 |
| Starting Address | 1 |
| Single item stored: | |
| Input Buffer | |

The "Input Value" is the value of the input data variable to be used by the Applications Computer, stored in eight 8-bit bytes. The "Input Ready" item is a flag bit indicating if all of the required data in a Task Input message has been stored and has not yet been used by the Applications Computer. The "Starting Address" is the location in the Application Computer's memory where the program begins for that task.

The Task Input Table also stores a single item "Input Buffer". The Input Buffer is a single bit indicating which of the buffers contains the Task Input message sent to the Applications Computer for the task currently being executed. The complement of the Input Buffer bit identifies which buffer is to receive the Task Input message for the next task to be executed by the Applications Computer.

TASK OUTPUT TABLE

The Task Output Table 812 stores the "Task Output" messages being received from the Applications Computer. It is used by the Task Results Message Sender 818 for generating Task Data Value and Redundant Data Value messages. This table stores the new values of data variables resulting from the execution of tasks by the Applications Computer. Use of a table avoids the need to move these data from one set of memory locations to another, by the Applications Computer Executive Program or Task Results Messages Sender 818.

Like the Task Input Table 810, the Task Output Table 812 comprises two buffers. One buffer stores the data variables resulting from the task presently being executed, and the other buffer stores the data variables from the preceeding executed task. Each of the buffers store the information listed in Table V-C. The first 3 items are stored for each of a predetermined maximum number of data variables. In the example of Table V-C, the predetermined number of data variables stored is 8.

TABLE V-C

| TASK OUTPUT TABLE Items stored in each buffer: | |
|---|---|
| NAME | NO. STORED |
| Output Value | 8 |
| Data ID | 8 |
| Redundant Data | 8 |
| Output Ready | 1 |
| Output Index | 1 |
| Single item stored: | |
| Output Buffer | |

The "Output Value" is the computed value of a data variable resulting from the execution of the task, stored in eight 8-bit bytes. There is one "Data ID" and one "Redundent Data" item stored for each Output Value. The Data ID is the identification number of the associated data variable, as previously described. The Redundant Data item is a flag bit which identifies the associated Output Value as either redundantly computed or not redundantly computed.

The "Output Ready" item is a flag bit showing if the buffer has been loaded by the Applications Computer, and may now be unloaded by the Task Results Message Sender 818. The "Output Index" is an integer pointing to the last data variable location in the buffer which has been filled by the current task.

The Task Output Table also stores a single item "Output Buffer". The Output Buffer is a single bit indicating which of the buffers contains the Task Output message being sent by the Applications Computer for the task currently being executed. The complement of the Output Buffer bit identifies the buffer storing the Task Output message sent by the Applications Computer after the execution of the preceeding task.

STORE DATA VALUE MODULE

The details of the Store Data Value Module 802 are shown in Table V-D.

TABLE V-D
STORE DATA VALUE MODULE

```
/*LOOK UP DATA INDEX FOR DATA ID*/
IF MESSAGE TYPE = TASK DATA VALUE TYPE
THEN
DATA INDEX = DATA ID INDEX (DATA ID)
ELSE
DATA INDEX = DATA ID INDEX (DATA ID+MAXIMUM
DATA ID+1)
ENDIF
IF DATA INDEX NOT=0 /*IF DATA VALUE STORED IN
THIS COMPUTER*/
THEN /*CHECK IF SEQUENCE NUMBER ALREADY IN
TABLE*/
FOUND = FALSE
LOOP FOR S = 1 TO 4
IF STORED SEQUENCE NUMBER (DATA INDEX, S)
 = SEQUENCE NUMBER
THEN
FOUND = TRUE
SAMPLE INDEX = S
EXIT LOOP
ENDIF
REPEAT
IF FOUND = FALSE /*IF SEQUENCE NUMBER NOT IN
TABLE*/
THEN /*FIND OLDEST SEQUENCE NUMBER IN TABLE*/
OLDEST SEQUENCE NUMBER
 = STORED SEQUENCE NUMBER (DATA INDEX, 1)
SAMPLE INDEX = 1
LOOP FOR S = 2 TO 4
IF 128>MODULO 256 (OLDEST SEQUENCE NUMBER -
STORED SEQUENCE NUMBER (DATA INDEX,S))
THEN
OLDEST SEQUENCE NUMBER =
STORED SEQUENCE NUMBER
(DATA INDEX, S)
SAMPLE INDEX = S
ENDIF
REPEAT
/*IF NEW NUMBER IS NEWER THAN OLDEST NUMBER*/
IF 128 > MODULO 256 (SEQUENCE NUMBER -
OLDEST SEQUENCE NUMBER))
THEN /*STORE NEW SEQUENCE NUMBER*/
STORED SEQUENCE NUMBER (DATA INDEX,
SAMPLE INDEX) = SEQUENCE NUMBER
FOUND = TRUE
ENDIF
ENDIF
IF FOUND = TRUE /*IF SEQUENCE NUMBER NOW IN
TABLE*/
THEN /*STORE NEW DATA VALUE*/
STORED DATA VALUE (DATA INDEX, SAMPLE INDEX)
 = DATA VALUE
ENDIF
ENDIF
RETURN
END;
```

The Store Data Value procedure is performed in response to receiving either a Task Data Value or Redundant Data Value message. The procedure first looks up a "Data Index" which points to the entry in the Data Values Table 804 corresponding to the data identification number (DATA ID) contained in the message. This is done using an array of constant "Data ID Index" values, which store the proper "Data Index" for each data variable (redundant and non-redundant) used in the system. If a Task Data Value message was received, the "Data Index" is set equal to the "Data ID Index" for the received Data ID value. For a Redundant Data Value message, the "Data Index" is set equal to the "Data ID Index" for the received Data ID value plus the predetermined maximum (non-redundant) Data ID value plus one.

If the data value is to be stored in the Data Value Table (i.e., if the Data Index is not equal to 0), the procedure searches to determine if data with the same sequence number is already stored in the Data Values Table. This is done by looping for each sequence number stored. If data with the same sequence number is found (if Found=True), the data value previously stored is replaced with the new data value.

If the sequence number of the received data value is not found among the Stored Sequence Numbers for that data variable (if Found=False), the procedure finds the oldest Stored Sequence Number stored for that data variable, and replaces this oldest entry with the new data value and its sequence number. The procedure used to find the oldest sequence number is the Modulo 256 procedure previously described with reference to the subroutine Find Awaiting Execution Number used in the Scheduler.

TASK DISPATCHER

The details of the Task Dispatcher 806 are listed in Table V-F. The module uses a private Task Data Table, the contents of which are listed in Table V-E. The Task Data Table stores constant Task Data Index values and associated Delay Integers for each task capable of being executed by its own Applications Computer 100.

TABLE V-E
TASK DATA TABLE

The following item is stored for each task (each Task ID):
Input Index
For each of the maximum number of input data variables
for each task which is assigned to own computer, the
following items are stored:
Task Data Index
Delay Integer The "Input Index" item is an index into the second part of this table for the first input data variable for the corresponding task. The "Task Data Index" items are indices into the Data Values Table 804 indicating where the proper input data variables for that task are stored. The "Delay Integer" items are the desired differences between the data sequence number and the task execution number. This Delay Integer is the same as the Delay Integer previously discussed with reference to the Awaiting Tasks Table 602 of the Scheduler. The Task Data Table may be implemented by a Read Only Memory (ROM).

TABLE V-F
TASK DISPATCHER

```
LOAD BUFFER = COMPLEMENT (INPUT BUFFER)
/*LOOP FOR EACH POSSIBLE INPUT DATA
VARIABLE*/
LOOP FOR I = 1 TO MAXIMUM INPUTS
/*LOOK UP DATA INDEX FOR TASK INPUT*/
DATA INDEX = TASK DATA INDEX (INPUT INDEX
(TASK), I)
IF DATA INDEX = 0 /*IF NOT ANOTHER INPUT TO
TASK*/
THEN
EXIT LOOP
ELSE
/*CHECK IF DESIRED SEQUENCE NUMBER IS
IN TABLE*/
DESIRED SEQUENCE NUMBER = MODULO 256
(EXECUTION NUMBER - DELAY INTEGER
(INPUT INDEX (TASK), I))
FOUND = FALSE
```

TABLE V-F-continued
TASK DISPATCHER

```
LOOP FOR S = 1 TO 4 /*LOOP FOR EACH SAMPLE*/
IF STORED SEQUENCE NUMBER (DATA INDEX, S)
 = DESIRED SEQUENCE NUMBER
THEN
FOUND = TRUE
SAMPLE INDEX = S
EXIT LOOP
ENDIF
REPEAT
IF FOUND = FALSE /*IF NUMBER NOT IN TABLE/*
THEN /*FIND NEWEST SEQUENCE
NUMBER IN TABLE*/
NEWEST SEQUENCE NUMBER
 = STORED SEQUENCE NUMBER
(DATA INDEX, 1)
SAMPLE INDEX = 1
LOOP FOR S = 2 TO 4 /*FOR EACH SAMPLE*/
IF 128 > MODULO 256 (NEWEST SEQUENCE
NUMBER - STORED SEQUENCE
(NUMBER DATA INDEX, S))
THEN
NEWEST SEQUENCE NUMBER =
STORED SEQUENCE NUMBER
(DATA INDEX, S)
SAMPLE INDEX = S
ENDIF
REPEAT
ENDIF
/*STORE DATA VALUE*/
INPUT VALUE (LOAD BUFFER, 1) = STORED DATA
VALUE (DATA INDEX, SAMPLE INDEX)
ENDIF
REPEAT
RETURN
END;
```

The Task Dispatcher procedure is performed in response to a Dispatch Task message received from the Scheduler 206, identifying the task and the execution number of the task selected for execution. The module copies the values of the input data variables for the dispatched task from the Data Values Table 804 to the Task Input Table 810. These data values are copied into the buffer identified by the complement of the Input Buffer bit. As indicated in the discussion of the Task Input Table, the complement of the Input Buffer bit identifies the empty buffer awaiting a new Task Input message.

Referring to Table V-F, the procedure loops for each data variable required for the execution of the task identified in the Dispatch Task message. For each data variable, a "Data Index" into the Data Values Table is looked up in the Task Data Table. The Task identification number and the input number I are used as indices into the array of Input Index values. The Input Index gives an index into the array of Task Data Index values, which is the proper "Data Index". If there is another input data variable, i.e., if the "Data Index" is not equal to zero, the "desired sequence number" of the data variable is computed by subtracting (Modulo 256) the associated Delay Integer stored in the Task Data Table from the task execution number contained in the Dispatch Task message.

After computing the "desired sequence number" of the data value, the procedure loops through the Data Values Table to locate that sequence number among the Stored Sequence Numbers for that data variable. If the "desired sequence number" is found (if Found=True), the data value is copied from the Data Values Table 804 into the buffer in the Task Input Table 810.

If the sequence number is not found (if Found-=False), the procedure finds the newest sequence number in the Data Values Table for that particular data variable, using the previously described Modulo 256 procedure. The Stored Data Value from the entry in the Data Values Table having the newest Stored Sequence Number is then copied into the Task Input Table 810. The loop for each input data variable is repeated until all of the required data is stored in the Task Input Table.

RELEASE TASK MODULE

The details of the Release Task Module 814 are shown in Table V-G.

TABLE V-G
RELEASE TASK MODULE

```
/*SEND TASK INPUT MESSAGE TO APPLICATIONS
COMPUTER*/
INPUT BUFFER = COMPLEMENT (INPUT BUFFER)
TASK ADDRESS (INPUT BUFFER) =
TASK INITIAL ADDRESS (STARTED TASK)
INPUT READY (INPUT BUFFER) = TRUE
CALL: SEND MESSAGE TO INTERNAL WATCH-DOG
TIMER
INPUT DATA: MESSAGE TYPE = RELEASE TASK TYPE
COMPLETED TASK = COMPLETED TASK
COMPLETED EXECUTION NUMBER =
COMPLETED EXECUTION NUMBER
STARTED TASK = STARTED TASK
STARTED EXECUTION NUMBER =
STARTED EXECUTION NUMBER
OUTPUT DATA: NONE
RETURN
END;
```

The Release Task Module is performed in response to a Release Task message received from the Scheduler 206. A Task Input message is first sent to the Applications Computer 100. The Task Input message is stored in the buffer in the Task Input Table 810 where the input data variables were previously stored by the Task Dispatcher 806. The Task Input message also includes the Task Address where the program for this task begins in the Applications Computer program memory. The Task Address is obtained from a constant (predetermined) array of "Task Initial Address" values, which stores the proper Task Address value for each Task capable of being executed by its own Applications Computer.

The Task Input message is "sent" by setting the Input Ready flag to true. The number (0 or 1) of the buffer in the Task Input Table, where the Task Input message being sent is stored, is first placed in Input Buffer by complementing its previous value. After sending the Task Input message, the Release Task Module forwards the Release Task message to the Internal Watch-Dog Timer 816.

TASK RESULTS MESSAGE SENDER

The details of the Task Results Message Sender 818 are shown in Table V-H.

TABLE V-H
TASK RESULTS MESSAGE SENDER

```
UNLOAD BUFFER = COMPLEMENT (OUTPUT BUFFER)
/*LOOP FOR EACH OUTPUT DATA VARIABLE*/
LOOP FOR M = 1 TO OUTPUT INDEX (UNLOAD
BUFFER)
/*SEND A DATA MESSAGE*/
IF REDUNDANT DATA (UNLOAD BUFFER, M) = TRUE
THEN
MESSAGE TYPE = REDUNDANT DATA VALUE TYPE
ELSE
MESSAGE TYPE = TASK DATA VALUE TYPE
```

TABLE V-H-continued
TASK RESULTS MESSAGE SENDER

ENDIF
CALL: SEND MESSAGE TO TRANSMITTER
INPUT DATA: MESSAGE TYPE = MESSAGE TYPE
DATA ID = DATA ID (UNLOAD BUFFER, M)
SEQUENCE NUMBER =
COMPLETED EXECUTION NUMBER
DATA VALUE = OUTPUT VALUE (UNLOAD
BUFFER, M)
OUTPUT DATA: NONE
REPEAT
CALL: SEND MESSAGE TO TRANSMITTER
INPUT DATA:
MESSAGE TYPE = TASK COMPLETED/STARTED TYPE
COMPLETED TASK = COMPLETED TASK
COMPLETED EXECUTION NUMBER =
COMPLETED EXECUTION NUMBER
STARTED TASK = STARTED TASK
STARTED EXECUTION NUMBER =
STARTED EXECUTION NUMBER
OUTPUT DATA: NONE
/*INITIALIZE HALF OF TASK OUTPUT TABLE*/
OUTPUT INDEX (UNLOAD BUFFER) = 0
OUTPUT READY (UNLOAD BUFFER) = FALSE
RETURN
END;

The Task Results Message Sender procedure is performed in response to a Release Task message received from the Internal Watch-dog Timer 816. The module begins by determining the "unload buffer", which identifies the buffer in the Task Output Table 812 containing the Task Output message generated by the completed task. This "unload buffer" is the complement of the Output Buffer bit in the Task Output Table. The procedure then loops for each output data variable computed by the completed task, and stored in the Task Output Table (M=1 to Output Index).

The Redundant Data flag bit is tested to determine if a Task Data Value or Redundant Data Value message is to be sent. If the Redundant Data flag is "true", then the message sent is a Redundant Data Value message; if it is "false", the message sent is a Task Data Value message. The procedure then sends the message to the Transmitter 212, giving the message type, the Data ID, the sequence number equal to the completed task execution number, and the Output Value.

The loop is repeated until all of the data variables stored in the buffer have been extracted and the corresponding messages sent. A Task Completed/Started message is then sent to the Transmitter, identifying the task completed and the new task started. The buffer in the Task Output Table 812 from which this data was taken is then initialized, by setting the Output Index to zero and the Output Ready flag to "false".

INTERNAL WATCH-DOG TIMER

The details of the Internal Watch-Dog Timer 816 are shown in FIG. 27. The Internal Watch-Dog Timer comprises a Starter 822, an Internal Watch-Dog Timer Table 824 and a Counter 826. The operation of the Internal Watch-Dog Timer 816 will be discussed with reference to the procedures Starter given in Table V-I and Counter given in Table V-J.

The Internal Watch-Dog Timer Table 824 stores the "Remaining Internal Time", which is the remaining time in the internal watch-dog timer for the task being executed by the Applications Computer. The maximum execution time for the task is loaded into this table when the task is started. The remaining time is then decremented at predetermined time intervals.

TABLE V-I
STARTER

/*IF EXECUTION TIME WAS TOO SHORT*/
MAXIMUM EXECUTION TIME =
MAXIMUM INTERNAL TIME (COMPLETED TASK)
MINIMUM EXECUTION TIME =
MINIMUM INTERNAL TIME (COMPLETED TASK)
IF REMAINING INTERNAL TIME > (MAXIMUM
EXECUTION TIME - MINIMUM EXECUTION TIME)
THEN
CALL: SEND MESSAGE TO TRANSMITTER
INPUT DATA: MESSAGE TYPE=ERROR MESSAGE
TYPE
ERROR TYPE CODE = MINIMUM TIME ERROR
FAULTY COMPUTER = OWN COMPUTER
OUTPUT DATA: NONE
ENDIF
/*START TIMER FOR STARTED TASK*/
REMAINING INTERNAL TIME =
MAXIMUM INTERNAL TIME (STARTED TASK)
CALL: SEND MESSAGE TO TASK RESULTS
MESSAGE SENDER
INPUT DATA: MESSAGE TYPE = RELEASE TASK
TYPE
COMPLETED TASK = COMPLETED TASK
COMPLETED EXECUTION NUMBER =
COMPLETED EXECUTION NUMBER
STARTED TASK = STARTED TASK
STARTED EXECUTION NUMBER =
STARTED EXECUTION NUMBER
OUTPUT DATA: NONE
RETURN
END;

The Pseudo Code for the Starter 822 is listed in Table V-I. This procedure is performed when a Release Task message is received from the Release Task Module 814. Referring to Table V-I, the Starter checks the Remaining Internal Time stored in Internal Watch-Dog Timer Table 824 to determine if the execution time of the previous task was too short. The maximum and minimum execution times for the task identified as completed in the message are first looked up from constant (predetermined) arrays of "Maximum Internal Time" and "Minimum Internal Time" values for each task. Then the Remaining Internal Time is compared with the difference between the maximum execution time and the minimum execution time.

If the Remaining Internal Time is greater than the above time difference, an Error message is sent to the Transmitter 212 to inform the other Computers in the system that this Computer has detected a minimum time error by its own Computer. If the Remaining Internal Time is less than the computed difference, the procedure does not send an Error message but directly proceeds to restart the Internal Watch-Dog Timer as indicated. The Internal Watch-Dog Timer is then restarted by placing the "Maximum Internal Time" for the started task into the Watch-Dog Timer Table 824. Finally, the procedure sends the Release Task message on to the Task Results Message Sender 818.

The "Minimum Internal Time" integral used by the Starter are selected so that they will be decremented to zero by the Counter at the end of an actual time period corresponding to the maximum execution time for the task.

TABLE V-J
COUNTER

/*IF TIMER NOT EXPIRED*/
IF REMAINING INTERNAL TIME NOT = 0

TABLE V-J-continued

| COUNTER |
|---|
| THEN |
| REMAINING INTERNAL TIME = |
| REMAINING INTERNAL TIME − 1 |
| /*IF TIMER NOW EXPIRED*/ |
| IF REMAINING INTERNAL TIME = 0 |
| THEN |
| CALL: SEND MESSAGE TO TRANSMITTER |
| INPUT DATA: |
| MESSAGE TYPE=ERROR MESSAGE TYPE |
| ERROR TYPE CODE = |
| INTERNAL MAXIMUM TIME ERROR |
| FAULTY COMPUTER = OWN COMPUTER |
| OUTPUT DATA: NONE |
| ENDIF |
| ENDIF |
| RETURN |
| END; |

The details of the Counter 826 are shown in Table V-J. The procedure is performed at predetermined time intervals, such as every 0.1 second. Referring to Table V-J, the Remaining Internal Time of the Internal Watch-Dog Timer Table 824 is decremented if it is not zero. After decrementing the Remaining Internal Time, it is tested to determine if it is now zero. If the Remaining Internal Time is not zero, it will again be decremented at the end of the next predetermined time interval and again checked for zero. A Remaining Internal Time equal to zero indicates that the execution time was longer than the maximum execution time. When this happens, the module sends an Error message to the Transmitter 212, identifying the error detected as an internal maximum time error.

START TASK COMMUNICATOR

The details of the Start Task Communicator 820 are shown in Table V-K.

TABLE V-K

| START TASK COMMUNICATOR |
|---|
| /*INITIALIZE DATA VALUES TABLE*/ |
| /*LOOP FOR EACH DATA VARIABLE*/ |
| LOOP FOR D = 1 TO MAXIMUM DATA INDEX |
| /*LOOP FOR EACH STORED SEQUENCE NUMBER*/ |
| LOOP FOR S = 1 TO 4 |
| STORED SEQUENCE NUMBER (D, S) = 0 |
| STORED DATA VALUE (D, S) = |
| INITIAL DATA VALUES (D) |
| REPEAT |
| REPEAT |
| /*INITIALIZE INTERNAL WATCH-DOG TIMER TABLE*/ |
| REMAINING INTERNAL TIME = 0 |
| /*INITIALIZE TABLES WITH DATA FOR EACH BUFFER*/ |
| LOOP FOR B = 0 TO 1 /*LOOP FOR EACH BUFFER*/ |
| /*INITIALIZE TASK INPUT TABLE*/ |
| INPUT READY (B) = FALSE |
| /*INITIALIZE TASK OUTPUT TABLE*/ |
| OUTPUT READY (B) = FALSE |
| OUTPUT INDEX (B) = 0 |
| REPEAT |
| RETURN |
| END; |

The Start Task Communicator procedure is performed in response to the initial application of electrical power, or to a Restart message from the Fault Handler via the Scheduler. The Start Task Communicator first initializes the contents of the Data Values Table 804. The procedure loops for each data variable storage location (D) and each sequence number (S) in the Data Values Table, and sets each Stored Sequence Number to zero. It also places the "initial data value" from a constant (predetermined) array of "initial data values" into the Stored Data Value locations of the Data Values Table 804. These loops are repeated until initial values are stored in all the locations of the Data Values Table.

The Internal Watch-Dog Timer Table 824 is then initialized by setting the Remaining Internal Time to zero. The module then initializes the Task Input Table 810 and Task Output Table 812, by setting the Input Ready flags of the Task Input Table to "false", the Output Ready flags of the Task Output Table to "false", and each Output Index of the Task Output Table to zero.

The Task Communicator is now ready to forward to the Applications Computer 100 the "initial data values" of the input data variables for each task dispatched and released by the Scheduler 208 during system start up.

APPLICATIONS COMPUTER EXECUTIVE PROGRAM

The Applications Computer requires an "Executive Program" to initiate the execution of the Tasks selected by the Operations Controller. This Executive Program may also conveniently provide the interface to the Task Communicator, sending and receiving messages thereto. A suitable Applications Computer Executive Program which performs these functions is shown in Table VI.

TABLE VI

| APPLICATIONS COMPUTER EXECUTIVE PROGRAM |
|---|
| LOOP FOREVER /*LOOP FOR EACH TASK TO BE EXECUTED*/ |
| /*RECEIVE TASK INPUT MESSAGE FROM TASK COMMUNICATOR*/ |
| LOOP WHILE INPUT READY (INPUT BUFFER) = FALSE |
| DO NOTHING |
| REPEAT |
| CALL: TASK AT TASK ADDRESS (INPUT BUFFER) |
| INPUT DATA: INPUT BUFFER = INPUT BUFFER |
| OUTPUT BUFFER = OUTPUT BUFFER |
| OUTPUT DATA: TASK = TASK |
| /*FINISH RECEIVING TASK INPUT MESSAGE*/ |
| INPUT READY (INPUT BUFFER) = FALSE |
| CALL: SEND MESSAGE TO SCHEDULER |
| INPUT DATA: MESSAGE TYPE = TASK DONE TYPE |
| TASK = TASK |
| OUTPUT DATA: NONE |
| /*SEND TASK OUTPUT MESSAGE TO TASK COMMUNICATOR*/ |
| OUTPUT READY (OUTPUT BUFFER) = TRUE |
| OUTPUT BUFFER = COMPLEMENT (OUTPUT BUFFER) |
| REPEAT |
| END; |

After the power is turned "on", the Applications Computer Executive Program repeats forever a set of actions which include executing the next Task selected by the Scheduler. The procedure first receives a Task Input message from the Task Communicator. The procedure waits until a message is available in the Task Input Table, as indicated by the Input Ready flag being true. As previously indicated, the Task Input message contains the starting Task Address for the task program in the Applications Computer's program memory. The Input Buffer item specifies the buffer in the Task Input Table 810, where the input data variables required for the execution of the released task are stored.

The program then proceeds to execute the selected task, by calling the Task (as a subroutine) at the specified Task Address. As the task is being executed, the Applications Computer obtains the values of the input data variables for the task from the Task Input Table, from the buffer identified by the Input Buffer bit. The task stores values of its output data variables into the Task Output Table, into the Buffer identified by the Output Buffer bit.

When execution of the task is completed, the Applications Computer Executive Program finishes receiving the Task Input message by setting the Input Ready flag to false. It also sends a Task Done message to the Scheduler 206, signifying that the Applications Computer has completed the execution of the current task. As previously described, the Scheduler 206 responds to the Task Done message and sends a Release Task message which causes the Task Communicator to release the next scheduled task to the Applications Computer.

The Applications Computer Executive Program then sends a Task Output message to the Task Communicator, before proceeding to the next task. This Task Output message is stored in the Task Output Table 812 and includes the new values for data variables computed by the execution of the completed task. This message sending could move the task results from Applications Computer memory to the Task Output Table 812 via the buss 30. Alternately, the Task programs could directly store the task results in the Task Output Table as they are computed. This latter procedure is the preferred approach and is the one shown in Table VI. In this case, sending the Task Output message only requires setting the Output Ready flag to True, indicating that the Task Output message has been completed. The Output Buffer bit is complemented so that the Task Output message from the next task will be placed in the other buffer of the Task Output Table.

MICROPROCESSOR-BASED IMPLEMENTATION OF OPERATIONS CONTROLLER

The Operations Controller has been described in terms of several subsystems (Fault Handler, Synchronizer, Fault Tolerator, Scheduler, Task Communicator), each of which consists of several modules. As previously discussed, each module may be implemented with discrete digital circuits or by means of programmed microcomputers. When implemented by means of individual circuits, the modules would operate in parallel or simultaneously.

The preferred implementation for the Operations Controller is a microprocessor or microcomputer which executes a computer program to perform the module functions, plus requisite memory and interface modules such as the Receivers 202 and Transmitters 212. A separate microprocessor may be used for each module. Alternately, one microprocessor may perform the functions of several modules, sharing the processor execution time between those modules, thereby reducing the number of microprocessors in the system. Additionally, the Applications Computer functions might also be performed by one of these microprocessors.

The use of one microprocessor to perform the functions of several modules is within present technology and reduces cost. However, current advances in microprocessor technology are making it more and more attractive to use multiple small microprocessors, each microprocessor dedicated to a single module or function. On the other hand, large microprocessors are becoming more and more powerful, permitting one microprocessor to perform more functions in the same period of time.

The main limitation upon sharing a microprocessor is speed. It is not desirable to perform two or more module functions in one microprocessor when this will significantly reduce overall system speed, i.e., the rate at which tasks can be dispatched to, and executed by, the associated Applications Computer. For this reason, the Applications Computer should not be used to perform many of the Operations Controller module functions.

A good assignment of modules to microprocessors depends upon the specific system application, as well as upon current microprocessor technology. The number of messages per second of each type, which must be handled by the Operations Controller, depends upon many application-related features, including the number of Computers used, execution times of tasks, number of Task Data Value messages produced by a task, and number of Redundant Data Value messages produced by a task. The number of executions per second required for each module depends, in turn, upon the number of messages of appropriate types. Thus, it is not appropriate to specify a particular assignment of modules to microprocessors. The number of microprocessors to be used must be determined by analysis of the application requirements, with respect to the specific microprocessors to be used, so as to provide a suitable system speed. This number will be different for different microprocessor speeds and for different application types.

When choosing the modules to be assigned to a given microprocessor, preference should be given to modules which communicate with each other. Such communications include use of the same data table and messages between modules. When modules which communicate via a table are assigned to one microprocessor, the table may be stored in the memory associated with that processor. Similarly, when modules communicate via a message, that message may be stored in memory associated with the processor executing those modules. The module which produces the message stores the message contents in memory and sets a flag bit in memory indicating that a message is currently stored. The module which uses the message reads the message contents from memory, and resets the flag bit in memory indicating that the message has been used. The "Executive Program," discussed hereinafter, can check the flag bit in memory to determine if such a message has been generated.

Provision must be made for communication between Operations Controller modules assigned to different microprocessors within one Computer. The preferred implementation is to provide some memory which is accessible to all processors within one computer. Such shared memory is well known in the art; for example, the Intel SBC 80/20 microcomputer boards allow several such computers to share access to a standard memory board. Alternatively, communication between microcomputers could be provided using communication links between the computers. Such communication links may be implemented in a variety of ways; one possibility would be similar to the communication links between Computers used in this Fault-Tolerant Multi-Computer System.

Using shared memory, communication between modules can be performed as previously described for a single microprocessor. However, care must be taken if a table is accessed by modules implemented by different microprocessors, to prevent two or more processors from simultaneously modifying and accessing the same portion of a table. Such mutual exclusion can be obtained by storing a flag bit in memory for each table. The flag bit is used to indicate whether any module is currently accessing that table. Before accessing a table, each module checks the flag bit and waits until the table is not being used. The module then changes the flag bit to show current use, performs its access, and changes the flag bit back to show non-use. Such mutual exclusion is a well-known problem with several known solutions, including DijKstra's "semaphone" as discussed in "Multiprogramming Coordination" by Leon Presser, Computing Surveys, Vol. 7, No. 1 March 1975, pp. 21–44.

When a microprocessor is used to implement one or more modules, each microprocessor requires an "Executive Program", in addition to the module function programs previously defined. This Executive Program must initiate the execution of each module program whenever its execution is needed.

The basic form of such an Executive Program is shown in Table VII-A. The Executive Program consists of a sequence of actions which are repeated endlessly, since the Operations Controller operates continuously. Each action starts with a test whether a message of a particular type has arrived or has been generated, since the

TABLE VII-A

| GENERAL EXECUTIVE PROGRAM |
|---|
| LOOP FOREVER |
| IF MESSAGE A HAS ARRIVED |
| THEN: CALL: MODULE P PROGRAM |
| ENDIF |
| IF MESSAGE B HAS ARRIVED |
| THEN: CALL: MODULE Q PROGRAM |
| ENDIF |
| etc. |
| IF MESSAGE N HAS ARRIVED |
| THEN: CALL: MODULE Z PROGRAM |
| ENDIF |
| REPEAT |
| END | functions of a module are generally required when a message is received. If a message of the proper type has arrived, or if another condition for module execution is fulfilled, the Executive Program calls the program which performs the functions of the appropriate module. For example, the Reasonable Limits Checker program will be called when an (error-free) Task Data Value message has arrived from the Message Format Checker. The module function programs are coded as subroutines, which return after their execution to the Executive Program at the point following the subroutine call.

The basic Executive Program for a microprocessor includes one such action sequence for each module whose functions are performed by that microprocessor. If a microprocessor executes just one module, the Executive Program would include just one such action sequence. The conditions for the execution of each module are tabulated in Table VII-B. In the table, the left column lists all Operations Controller modules, the center column lists the message or other condition for module execution, and the right column lists the sender of that message.

When one microprocessor executes multiple modules, a standard general-purpose Executive Program could alternately be used. A number of such Executive Programs are commercially available, such as the Intel RMX-80 Real-Time Multi-Tasking Executive. To use RMX-80, each message path between two modules in the same microprocessor would be implemented by a message "exchange" in RMX-80. Each module would be implemented as a "task" program scheduled by RMX-80; each "task" program would have the form shown in Table VII-C. The "task" program repeats two actions indefinitely. The first action is to wait for and receive a message from the appropriate "exchange". Execution of the "task" will not continue until a message has been received. The second action is to call the module program, as previously defined for the appropriate module. (The terms "exchange" and "task" in this paragraph are from RMX-80; other Executive Programs use different terms and operations. The term "task" in this paragraph is not the same as the tasks discussed in the rest of this patent application.)

TABLE VII-B

| CONDITIONS FOR MODULE EXECUTION | | |
|---|---|---|
| MODULE | MESSAGE OR CONDITION | MESSAGE SOURCE |
| Message Format Checker | Any Inter-Computer message | Receivers |
| Reasonable Limits Checker | Task Data Value message | Message Format Checker |
| Redundant Value Voter | Redundant Data Value message | Message Format Checker |
| Task Unselected/Selected Message Module | Task Unselected/Selected message | Message Format Checker |
| Task Completed/Started Message Module | Task Completed/Started message | Start Watch-Dog Timer Module |
| Watch-Dog Timer Checker | Time increment passed | — |
| Start Watch-Dog Timer Module | Task Completed/Started message | Message Format Checker |
| Start Synchronizer Module | Computer starting, or Restart message | Check Sampling Timer Module or Record Error Module |
| Check Sampling Timer Module | Time increment passed | — |
| Find Sampling Number Agreement Module | Sampling Number message | Message Format Checker |
| Send Good Message Module | Task Data Value message, Task Completed/Started message, or Task Unselected/Selected message | Reasonable Limits Checker, Task Completed/Started Message Module, Task Unselected/Selected Message Module |
| End Time Period Module | Time increment passes | — |
| Check Error Message Agreement Module | Error message | Message Format Checker |
| Record Error Module | Record Error message | Message Format Checker Reasonable Limits Checker, |

TABLE VII-B-continued

| MODULE | CONDITIONS FOR MODULE EXECUTION | |
|---|---|---|
| | MESSAGE OR CONDITION | MESSAGE SOURCE |
| | | Redundant Value Voter, Record Voted Value (Redundant Value Voter), Task Unselected/Selected Message Module, Task Completed/Started Message Module, Watch-Dog Timer Checker, Find Sampling Number Agreement Module (Record Voted Sampling Number), or Check Error Message Agreement Module |
| Start Fault Handler Module | Computer starting, or Restart message | Record Error Module or Check Sampling Timer Module |
| Record Data Ready Module | Task Data Value message, or Redundant Data Value message | Send Good Message Module, or Redundant Value Voter (Record Voted Value) |
| Record Special Tasks Ready Module | Initiate Special Tasks message | Find Sampling Number Agreement Module (Record Voted Sampling Number), Check Sampling Timer Module, or Start Synchronizer Module |
| Completed Task Recorder | Task Completed/Started message | Send Good Message Module |
| Unselected/Selected Task Recorder | Task Unselected/Selected message | Send Good Message Module |
| Task Unselector | Dispatch Task message | Unselected/Selected Task Recorder (Test if Selected Task) |
| Task Selector | Dispatch Task message | Record Data Ready Module, (Test if Health Check Selected), Record Special Tasks Ready Module (Test if Health Check Selected), System Status Monitor (Test if Health Check Selected), Completed Task Recorder, (Test if last Completed Task) or Task Unselector |
| System Status Monitor | Exclude Computer message | Record Error module, or End Time Period Module |
| Start Scheduler Module | Computer Starting, or Restart message | Check Sampling Timer Module, or Record Error Module |
| Task Releaser | Task Done message | Applications Computer Executive Program |
| Store Data Value Module | Task Data Value message, or Redundant Data Value message | Record Data Ready Module |
| Task Dispatcher | Dispatcher Task message | Task Releaser, Task Selector (Record Task Selected by Own Computer), or Start Scheduler Module |
| Release Task Module | Release Task message | Task Releaser, or Start Scheduler Module |
| Task Results Message Sender | Release Task message | Starter |
| Starter | Release Task message | Release Task Module |
| Counter | Time increment passed | — |
| Start Task Communicator | Restart message | Start Scheduler Module |

TABLE VII-C

| GENERAL "TASK" PROGRAM |
|---|
| LOOP FOREVER |
| WAIT (EXCHANGE A) |
| CALL: MODULE P PROGRAM |
| REPEAT |
| END |

Most standard Executive Programs currently available are not efficient enough for use in the Operations Controller for a control system. However, the efficiencies of such programs, and of the microprocessors that execute them, are improving. It is likely that this alternative will become practical in a few years.

If one microprocessor executes several modules, refinement of the basic Executive Program and its use is often possible, to improve efficiency. These variations are possible when one module produces the messages used by another module which is executed by the same microprocessor. (For this and previously discussed reasons, it is useful to often assign to one microprocessor the modules which produce and consume a message).

Rather than sending a message, the module program which normally sends such a message could directly call (as a subroutine) the module program which uses that message. Alternately, when the module which produces a message always produces such a message, the Executive Program could call the module program which uses that message, immediately following the call to the first module. This would avoid the need for the Executive Program to check whether that message has arrived. Other possible variations will be clear to a person skilled in the art.

As an example, Table VII-D shows an Executive Program for a microprocessor to which is assigned all modules of the Fault Handler. This Executive Program is based upon modifying the module function programs of the Fault Handler to directly call the other modules of the Fault Handler as subroutines, rather than sending messages to them. The changes needed are tabulated in Table VII-E. In table VII-E, the left column lists the current Pseudo Code lines for sending a message to another Fault Handler module, and the center column lists the corresponding modified Pseudo Code lines for directly calling the other Fault Handler module. The right column lists the modules in which each line occurs. In the left column, a few Psuedo Code lines are listed within parenthesis. These lines are listed in order to identify the previously listed line, where the same line of Psuedo Code appears more than once in the same module or subroutine. The lines listed in parenthesis need not be changed or deleted.

Referring to Table VII-D, the Fault Handler Executive Program execution is started when operation of the Fault Handler microcomputer is started, when power is turned on in that Computer. The Executive Program first calls an "initial health check" program. The "initial health check" program checks for proper operation of the microcomputer performing the Fault Handler functions, as is known in the art. Execution of the "initial health check" program is repeated until a "health check succeeded" flag, returned by the "initial health check" program, indicates that the microcomputer is operating correctly. Alternately, this "initial health check" could be omitted when less fault-tolerance is needed.

The Fault Handler Executive Program then calls the Start Synchronizer Module given in Table III-M and the Start Fault Handler Module given in Table III-Y. These modules initialize the various tables in the Fault Handler as previously discussed. After the various tables in the Fault Handler have been initialized and the Fault Handler started, the Executive Program begins to

TABLE VII-D
FAULT HANDLER EXECUTIVE PROGRAM

```
LOOP UNTIL HEALTH CHECK SUCCEEDED = TRUE
  CALL: CHECK HEALTH INITIALLY
  INPUT DATA: NONE
  OUTPUT DATA: HEALTH CHECK SUCCEEDED = SAME
REPEAT
CALL: START SYNCHRONIZER MODULE
INPUT/OUTPUT DATA: NONE
CALL: START FAULT HANDLER MODULE
INPUT/OUTPUT DATA: NONE
LOOP FOREVER
  LOOP FOR COMPUTER = 1 TO MAXIMUM COMPUTER
  /*PROCESS A MESSAGE*/
    CALL: INPUT MESSAGE FROM RECEIVER
    INPUT DATA:SOURCE = COMPUTER
    OUTPUT DATA: MESSAGE CHARACTERS (N) = INPUT
    RECEIVER STATUS = SAME
    CALL: MESSAGE FORMAT CHECKER
    INPUT DATA: MESSAGE CHARACTERS (N) = SAME
    RECEIVER STATUS = SAME
    OUTPUT DATA: NONE
    IF A TIME INCREMENT HAS PASSED
    THEN
      CALL: WATCH-DOG TIMER CHECKER
      INPUT/OUTPUT DATA: NONE
      CALL: CHECK SAMPLING TIMER MODULE
      INPUT/OUTPUT DATA: NONE
      CALL: END TIME PERIOD MODULE
      INPUT/OUTPUT DATA: NONE
    ENDIF
  REPEAT
REPEAT
END
``` loop indefinitely. Within each of these loops, it loops for each Computer in the system. It first calls for inputting a message from the Receiver 202 receiving messages from the identified Computer. The procedure then calls the Message Format Checker (as a subroutine). The received message is then checked and processed. The program then checks if a predetermined time period has passed; each time that time period has elapsed, the Watch-dog Timer Checker, Check Sampling Timer Module, and End Time Period Module are executed.

It is not intended that the invention be limited to the disclosed embodiment. It is believed that those skilled in the art could use inter-computer messages having different formats and content, as well as other methods of performing comparable Operations Controller functions, without departing from the spirit of the invention.

TABLE VII-E

| Present Pseudo-Code Line | Module Modifications Modified Pseudo-Code Line | Modules/Subroutines |
|---|---|---|
| CALL: SEND MESSAGE TO FAULT TOLERATOR MESSAGE TYPE = RECORD ERROR CHECKER, | CALL: RECORD ERROR MODULE | MESSAGE FORMAT CHECKER, REASONABLE LIMITS |
|  |  | REDUNDANT VALUE VOTER RECORD VOTED VALUE, TASK UNSELECTED/SELECTED MESSAGE MODULE, TASK COMPLETED/STARTED MESSAGE MODULE, WATCH-DOG TIMER CHECKER, RECORD VOTED SAMPLING NUMBER, AND CHECK ERROR MESSAGE AGREEMENT MODULE |
| CALL: SEND MESSAGE TO FAULT TOLERATOR (MESSAGE = TASK DATA VALUE MESSAGE) | CALL: SEND GOOD MESSAGE MODULE | REASONABLE LIMITS CHECKER |
| CALL: SEND MESSAGE TO FAULT TOLERATOR (MESSAGE = TASK UNSELECTED/SELECTED | CALL: SEND GOOD MESSAGE MODULE | TASK UNSELECTED/SELECTED MESSAGE MODULE |

TABLE VII-E-continued

| Present Pseudo-Code Line | Module Modifications Modified Pseudo-Code Line | Modules/Subroutines |
|---|---|---|
| MESSAGE) CALL: SEND MESSAGE TO FAULT TOLERATOR (MESSAGE = TASK COMPLETED/STARTED MESSAGE) | CALL: SEND GOOD MESSAGE MODULE | TASK COMPLETED/STARTED MESSAGE MODULE |
| CALL: SEND MESSAGE TO FAULT TOLERATOR (MESSAGE = RECEIVED MESSAGE) | CALL: CHECK ERROR MESSAGE AGREEMENT MODULE | MESSAGE FORMAT CHECKER |
| CALL: SEND MESSAGE TO REASONABLE LIMITS CHECKER | CALL: REASONABLE LIMITS CHECKER | MESSAGE FORMAT CHECKER |
| CALL: SEND MESSAGE TO REDUNDANT VALUE VOTER | CALL: REDUNDANT VALUE VOTER | MESSAGE FORMAT CHECKER |
| CALL: SEND MESSAGE TO EXECUTION TIME CHECKER | CALL: START WATCH-DOG TIMER MODULE | MESSAGE FORMAT CHECKER |
| CALL: SEND MESSAGE TO MESSAGE SEQUENCE CHECKER | CALL: TASK UNSELECTED/ SELECTED MESSAGE MODULE | MESSAGE FORMAT CHECKER |
| CALL: SEND MESSAGE TO SYNCHRONIZER | CALL: FIND SAMPLING NUMBER AGREEMENT MODULE | MESSAGE FORMAT CHECKER |
| CALL: SEND MESSAGE TO MESSAGE SEQUENCE CHECKER | CALL: TASK COMPLETED/ STARTED MESSAGE MODULE | START WATCH-DOG TIMER MODULE |
| CALL: SEND MESSAGE TO START FAULT HANDLER MESSAGE TYPE = RESTART TYPE | CALL: START FAULT HANDLER MODULE | CHECK SAMPLING PERIOD MODULE |
| CALL: SEND MESSAGE TO START SYNCHRONIZER MODULE MESSAGE TYPE = RESTART TYPE | CALL: START SYNCHRONIZER MODULE | CHECK SAMPLING PERIOD TIMER MODULE |
| CALL: SEND MESSAGE TO FAULT TOLERATOR (MESSAGE = REDUNDANT DATA VALUE MESSAGE) | CALL: SEND MESSAGE TO SCHEDULER | RECORD VOTED VALUE |
| CALL: SEND MESSAGE TO SYNCHRONIZER MESSAGE TYPE = RESTART TYPE | CALL: START SYNCHRONIZER MODULE | RECORD ERROR MODULE |
| CALL: SEND MESSAGE TO START FAULT HANDLER MODULE MESSAGE TYPE = RESTART TYPE | CALL: START FAULT HANDLER MODULE | RECORD ERROR MODULE |

What is claimed is:

1. A fault-tolerant multi-computer system architecture, responsive to intercomputer messages and to inputs from external sources for executing a predetermined set of tasks to produce an output to at least one external device, comprising:
  a plurality of computers for collectively executing the predetermined set of tasks in a coordinated manner to produce outputs to the at least one external device in response to the inputs from the external sources and the intercomputer messages, each of said computers having an assigned subset of the tasks which it is capable of selecting and executing in a predetermined order of priority, each task in said predetermined set of tasks being included in more than one of said assigned subset so that each task is capable of being selected and executed by more than one computer; and
  a like plurality of communication links, one associated with each computer, each communication link transmitting only the intercomputer messages sent by the associated computer to all of the computers which require any message generated by the associated computer; and
  wherein each of said plurality of computers comprises:
  operations controller means for controlling the operation of its own computer in coordination with like operations controllers in the other computers, each operations controller including: receiver means for receiving intercomputer messages, fault handler means for checking said intercomputer messages to detect the faulty operation of any computer in the system, and to exclude from further processing the messages received from faulty computers, scheduler means responsive to the receipt of all the data variables for the execution of at least one of its assigned tasks for selecting from its assigned subset the tasks to be executed, task communicator means responsive to the task selected by the scheduler means for assembling the data variables required for the execution of the selected task and transmitter means responsive to said fault handler means, said scheduler means and said task communicator means for sending intercomputer messages to all of the computers in the system, said messages containing an identification of the faulty computers, identification of the tasks it has selected, and the values of the data variables resulting from the execution of the selected tasks required for the execution of a subsequent task; and applications computer means for executing the tasks selected by said scheduler means using the data assembled by said task communicator means.

2. The fault-tolerant multi-computer system of claim 1 further including combiner/voter means for combining the corresponding outputs from said plurality of computers to produce a single combined output, and to produce a voted output indicative of the output of the majority of computers when more than two computers execute the tasks generating said output to the at least one external device.

3. The fault-tolerant multi-computer system of claim 1 wherein each of said applications computer means comprises:

program memory means for storing a set of instructions for the execution of each task in said assigned subset of tasks;

central processing means, responsive to the task selected by said scheduler means, for executing the set of instructions stored in said program memory means corresponding to the selected task using values of said data variables assembled by said task communicator means, said central processing means generating values for said data variables through the execution of each task;

data storage means for storing intermediate variable and fixed data values as required by said sets of instructions for each task in said assigned subset of tasks; and input/output means for transferring to said central processing means the inputs from the external sources required for the execution of the selected tasks and for outputting to the at least one external device the data values resulting from the executed tasks, when instructed by the central processor means.

4. The fault-tolerant multi-computer system of claim 1 wherein said receiver means comprises a plurality of receivers, each receiver connected to one communication link and each receiver receiving only the messages sent by the computer associated with the communication link.

5. The fault-tolerant multi-computer system of claim 4 wherein said receiver means further includes a receiver connected to the communication link associated with its own computer and receiving only the messages sent by its own computer.

6. The fault-tolerant multi-computer system of claim 1 wherein said fault handler means includes:

checker means for checking each message received by said receiver means and for generating an error signal identifying each received message containing an error and the computer which sent the message; and fault tolerator means responsive to the error signals generated by said checker means and messages received from other computers identifying which computers are considered to be faulty, for passing on for further processing only error free messages received from non-faulty computers, said fault tolerator means further including means responsive to said error signal for enabling said transmitter means to send messages identifying the computers deemed to be faulty.

7. The fault-tolerant multi-computer system of claim 1 wherein said fault tolerator means further includes means for cancelling the fault status of a computer previously identified as faulty when said computer sends error free messages for a predetermined period of time.

8. The fault-tolerant multi-computer system of claim 1 wherein said scheduler means comprises:

status table means for storing current status information for each task capable of being executed by the computer, said status table means storing said tasks in their order of execution priority;

means for recording in said status table means the tasks selected, and the values of the data variables contained in messages received from all the computers in the system, said means for recording further including means for generating a dispatch signal when all the data required for the execution of a task has been recorded as received;

system status monitor means responsive to said messages identifying which computers are considered to be faulty for recording in said status table means as unselected each task previously recorded as being selected by the computer identified as faulty, said system status monitor means further including means for generating a dispatch signal in response to the unselecting of a task in said status table;

scheduling status table means for storing the tasks selected in the order in which they are selected; and task selector means responsive to said dispatch signals for selecting from the status table means the highest priority task ready for execution, said task selector means further including means for recording said selected task in said scheduling status table means, means for sending a dispatch task signal identifying the selected task to said task communicator means and means for enabling said transmitter means to send a message to all of the computers identifying the task selected.

9. The fault-tolerant multi-computer system of claim 6 wherein each of said messages has a predetermined format containing information identifying the message type and the computer than sent the message, said checker means includes a message format checker for checking the format of each received message to generate said error signal when an error in the message format is detected.

10. The fault-tolerant multi-computer system of claim 9 wherein each of said operations controller means further sends started/completed messages identify the tasks completed and the new task started by its applications computer means, said checker means further includes execution time checker means responsive to said completed/started message for checking the execution time of each task executed by each applications computer means in the system to generate said error signal when the execution time exceeds predetermined limits.

11. The fault-tolerant multi-computer system of claim 10 wherein said intercomputer messages is a task data value message containing the value of a data variable, said checker means further includes reasonable limits checker means for checking the value of the data variable contained in each task data value message against predetermined maximum and minimum values to generate said error signal when the value of the data variable in the received task data value message is outside said predetermined maximum and minimum values.

12. The fault-tolerant multi-computer of claim 10 wherein said intercomputer messages include a redundant data value message containing a value for data variable redundantly computed by more than two computers, said checker means further includes redundant value voter means responsive to the redundant data value messages received from said more than two computers for finding a voted data value when the value of the data variable contained in a predetermined number of redundant data value messages agree to generate said error signal identifying each computer which sent a redundant data value message containing a value which did not agree with the voted data value.

13. The fault-tolerant multi-computer system of claim 10 wherein said intercomputer messages include a task selected message containing an identification of the task selected by the computer sending the message, said checker means further includes message sequence checker means responsive to task selected and completed/started messages for checking the proper sequence in which the tasks are selected and executed by each computer to generate said error signal when the selection and execution of tasks does not follow a correct sequence.

14. The fault-tolerant multi-computer system of claim 13 wherein each computer is assigned a priority for the execution of tasks and wherein said scheduler further includes means for unselecting a previously selected task selected by a higher priority computer and selecting a new task in response to a message received from a computer having a higher priority identifying that the higher priority computer has selected the same task and means for sending a task unselected/selected message identifying the task unselected and the new task selected, said message sequence checker is responsive to said task unselected/selected message and said completed/started message.

15. The fault-tolerant multi-computer system of claim 1 wherein said fault handler means further includes synchronizer means responsive to intercomputer messages for synchronizing the operation of its own computer with all of the other computers in the system.

16. The fault-tolerant multi-computer system of claim 14 wherein said fault handler further includes synchronizer means responsive to intercomputer messages for synchronizing the operation of its own computer with all of the other computers in the system.

17. The fault-tolerant multi-computer system of claims 15 or 16 wherein said synchronizer means comprises:
- timer means for repetitively generating sampling periods and a sampling number indicative of the current sampling period;
- means for enabling said transmitter means to send sampling number messages at the end of each sampling period containing said sampling number indicative of said current sampling period;
- voter means for finding a voted sampling number indicative of a sampling number contained in a predetermined number of sampling number messages received from like synchronizer means in the other computers;
- means responsive to the finding of a voted sampling number for correcting said generated sampling number to agree with said voted sampling number; and
- means responsive to time within each sampling period when said voted sampling number is found for correcting the duration of the sampling period currently being generated to cause the end of the current sampling period to coincide with the end of the sampling periods in said like synchronizers in the other computers.

18. The fault-tolerant multi-computer system of claim 17 wherein said synchronizer further includes means response to the sampling numbers contained in the sampling number messages received from the other computers for generating said error signal identifying each computer which sent a sampling number message containing a sampling number which disagrees with said voted sampling number.

19. The fault-tolerant multi-computer system of claim 8 wherein said applications computer generates a task done signal each time it completes the execution of a task, said scheduler means further includes task releaser means for sending a release task signal to the task communicator means in response to said task done signal, said release task signal identifying the selected task stored in said scheduling status table means.

20. The fault-tolerant multi-computer system of claim 17 wherein said fault tolerator means further includes means for cancelling the fault status of a computer previously identified as faulty when said computer sends error free messages for a predetermined period of time.

21. The fault-tolerant multi-computer system of claim 19 wherein each task communicator means includes means for enabling said transmitter means to send a task completed-started message identifying the task completed and the new task started by its applications computer each time the execution of a task is completed and a new task started, said scheduler means further includes completed task recorder means for recording in said status table means the completed status of the tasks identified in said task completed/started messages.

22. The fault-tolerant multi-computer system of claim 1 wherein said task communicator means comprises:
- a data values table storing with respect to each data variable the values of that data variable;
- store data value means for recording in said data values table the values of the data variables contained in the error-free messages received from non-faulty computers passed on by said fault handler means;
- task input means for communicating from said store data values table to said applications computer means the values of the data variables required for the execution of the task selected by said scheduler means;
- task results sender means for enabling said transmitter to send data value messages to all of the computers containing the values of the data variables resulting from the task executed by the applications computer means; and
- task output means for communicating from said applications computer means to said task results sender means the values of the data variables resulting from the execution of each task.

23. The fault-tolerant multi-computer system of claim 22 wherein said task input means comprises:
- a task input table for storing the values of the data variables required for the execution of tasks;
- task dispatcher means responsive to the task selected by said scheduler means for recording in said task input table the data values stored in said data values table required for execution of the selected task; and
- task releaser means responsive to said applications computer means completing the execution of a preceeding task for communicating from said task input table to said applications computer means the values of the data variables stored in said task input table.

24. The fault-tolerant multi-computer system of claim 16 wherein each task communicator means includes means for enabling said transmitter means to send a task completed/started message identifying the task completed and the new task started by its applications computer means, said scheduler means comprises:

status table means for storing current status information for each task capable of being executed by said applications computer, said status table means storing said tasks in their order of priority;

record data value means receiving said data value messages for recording in said status table that the data identified in the messages is currently available for execution, said record data value means further including means for generating a dispatch signal when all the data required for the execution of a task has been recorded as received;

completed task recorder means responsive to said task completed/started messages for recording in said status table means that the task identified as completed in the received completed/started message has been completed;

25. The fault-tolerant multi-computer system of claim 24 wherein said applications computer means generates a task done signal each time it completes the execution of a task, said scheduler means further includes task releaser means for sending a release task signal to the task communicator means in response to said task done signal, said release task message identifying the task stored in said scheduling status table means which has been selected for execution.

26. The fault-tolerant multi-computer system of claim 25 wherein said system has a normal mode of operation, and at least one degraded mode of operation, said system status monitor means further generates a mode signal indicative of the system's current mode of operation determined from the number of computers considered to be faulty and wherein said status table means comprises a plurality of task status tables, each task status table corresponding to one of said modes of operation, said mode signal identifying for said task selector means the task status table from which the tasks are to be selected.

27. The fault-tolerant multi-computer system of claims 22 or 23 wherein said task output means comprises a task output table storing the value of the data variables resulting from the task currently being executed; and wherein said task results message sender means enables said transmitter to send said messages containing the values of the data variables stored in said task output table after the execution of the current task is completed.

28. The fault-tolerant multi-computer system of claim 25 wherein said task communicator means comprises:

a data values table storing the values of the data variables;

store data values means for recording in said data values table the value of the data variables contained in the messages received from all the computers;

task input means for communicating from data values table to said applications computer means the values of the data variables required for the execution of the task identified in the release task signal;

task results sender means responsive to said release task signal for enabling said transmitter means to send to all of the computers data value messages containing the values of the data variables resulting from the execution of the task completed by said applications computer means; and task output means for communication from said applications computer to said task results sender means the values of the data variables resulting from the execution of each task.

29. The fault-tolerant multi-computer system of claim 28 wherein said tank input means comprises:

a task input table for storing the values of the data variables required for the execution of at least two tasks;

task dispatcher means responsive to said release task signal for recording in said task input table the values of the data variables stored in said data values table required for the execution of the identified task; and task releaser means responsive to said release task signal for communicating to said applications computer means the values of the data variables stored in said task input table recorded in response to the preceeding release task signal.

30. The fault-tolerant multi-computer system of claim 29 wherein said task output means comprises a task output table storing the values of the data variables resulting from the task currently being executed by the applications computer means; and wherein said task results message sender means enables said transmitter to send said data value messages containing the values stored in said task output table in response to said release task signal.

31. The fault-tolerant multi-computer system of claims 22 or 28 wherein said task communicator means further includes watch-dog timer means responsive to said applications computer completing the execution of each task for monitoring the execution time of each task executed by said applications computer to generate an error signal when the execution time for a task is not within predetermined limits.

32. The fault-tolerant multi-computer system of claims 22 or 28 wherein said messages containing values of the data variables further contain sequence numbers indicative of the sequence in which the values were generated to distinguish data values resulting from the execution of the same task at different times and using different values of the data variables, said data values table stores values of each data variable for a predetermined number of different sequence numbers, said task dispatcher means includes means for computing the sequence numbers of the data variables required for the execution of the selected task to communicate only the values of the data variables to the applications computer means having the computed sequence numbers, and wherein said messages containing values of the data variables sent by said task results message sender means further include a sequence number corresponding to the execution number of the executed task.

33. A method for controlling the operation of each computer in a fault tolerant multiple computer system wherein the system includes a communication network whereby each computer can send error, data value, task selection and task completed/started messages to every other computer in the system and each computer has an operations controller and applications computer and wherein each computer further has a set of tasks it is capable of selecting and executing, comprising the steps of:

checking for error with said operations controller all messages received by each computer from all the computers in system to generate an error signal identifying each computer which sent the message containing an error;

sending error messages to all of the other computers in response to said error signals identifying as a faulty computer each computer which sent a message containing an error;

recording in said operations controller as faulty each computer which sent a message containing an error in response to said error signals and each computer identified in error messages received from a predetermined number of other computers to generate a fault status table;

discarding all messages containing errors and messages received from computers recorded as faulty in said fault status table;

recording in a status table contained within said operations controller the status information contained in the task data value, task selection and task completed/started messages which were not discarded, said status table listing said tasks and their associated status information in their order of execution priority;

detecting when all the information required for the execution of any task is recorded in said status table to generate an dispatch signal;

recording as unselected in said status table, each task which was previously recorded as selected by a computer which has subsequently been recorded as faulty in said fault status table;

generating by said operations controller a dispatch signal to signify the tasks unselected are ready for execution;

selecting by said operations controller from said status table the highest priority task ready for execution and not selected by another computer in response to said dispatch signal;

recording in said operations controller the selected task as selected in said task status table;

sending to all of the computers a task selected message containing the identity of the task selected;

generating in said operations controller a release task signal containing the identify of the selected task in response to the computer signifying it has completed the execution of a preceeding task;

recording in a data values table contained within said operations controller the value of the data variable contained in each non discarded data value message received from all the computers;

communicating from said data values table to the applications computer the value of the data variables required for the execution of the selected task in response to said release task signal;

executing in the applications computer the selected task using the communicated values of the data variables to generate values for new data variables;

sending to all of the computers by said operations controller, data value messages containing the values of the new data variables received from the applications computer; and sending to all of the computers by said operations controller a task completed/started message identifying the computer, the task completed, and the new task started by the identified computer after the execution of the task is completed.

34. The method of claim 33 wherein said messages sent between the computers include sampling number messages containing a sampling number identifying the current sampling period of that computer, said method further includes the steps of:

sequentially generating with a sampling period timer sampling periods having a predetermined time duration;

storing a current sampling number identifying the current sampling period;

comparing the sampling numbers contained in the sampling number messages received from all the computers to find a voted sampling number having a value which is the same as the value of the sampling numbers contained in a predetermined number of sampling number messages;

recording said voted sampling number as said current sampling number;

comparing the time remaining in the current sampling period, when said voted sampling number is found, with predetermined maximum and minimum values to determine if the sampling period timer is synchronized with like sampling period timers in the computer which sent the sampling number messages from which the voted sampling number was found;

correcting the remaining time in the sampling period timer when the current remaining time is outside said maximum and minimum values to synchronize the sampling period timer with like sampling period timers in the other computers;

recording in said status table as ready predetermined tasks to be executed once during each sampling period in response to the finding of said voted sampling number;

incrementing by one the stored current sampling number and restarting the sampling period timer at the end of each sampling period;

sending sampling number messages containing the current sampling number incremented by one; to all of the other computers at the end of each sampling period in which a voted sampling number is obtained;

generating a restart signal at the end of each sampling period in which no voted sampling number is obtained; and initializing the current sampling number to a predetermined number in response to said restart message.

35. The method of claim 34 wherein said method further includes the steps of:

comparing the voted sampling number with the sampling numbers contained in the sampling number messages received from the other computers to generate an error signal identifying each computer which sent a message containing a sampling number which disagrees with the voted sampling number;

recording in the fault status table as faulty in response to said error signals each computer which sent a sampling number message containing a sampling number which disagreed with the voted sampling number; and sending error messages to all the computers in response to said error signals identifying each computer which sent a sampling number message containing a sampling number which disagreed with said voted sampling number.

36. The method of claim 34 wherein the computer is assigned at least one predetermined input task which samples the input data being received from at least one external source or at least one output task which outputs data to an external device, and wherein said predetermined input and output tasks are to be executed once during each sampling period said method further includes the step of generating an initiate input/output task signal recording said predetermined input and output tasks as ready in said status table.

37. The method of claim 33 wherein the computer is assigned at least one start-up task which performs predetermined functions required to facilitate the starting of the computer system when the whole system is being started or when the particular computer is being restarted said method further includes the step of detecting the first finding of a voted sampling number following the start up of the computer or the generation of a restart signal to generate an initiate start-up task signal recording said predetermined start-up task as ready in said status table.

38. The method of claim 33 wherein each computer has a plurality of receivers and each receiver can only receive messages from one associated computer, and wherein each message has a predetermined format which includes a message type code identifying the message type and a computer identification code identifying the computer which sent the message, said step of checking includes the step of checking the format of each received message, to generate an error signal when the message type code contained in the message is not a valid message type code and to generate said error signals when the computer associated with the receiver which received the message is not the same as the computer identified by the computer identification code contained in the message.

39. The method of claim 33 wherein said message type includes task data value messages said step of checking includes the step of comparing the value of the data variable contained in each task data value message with at least one predetermined limit value to generate said error signal when the value of the data variable contained in the message does not have a predetermined relationship to said predetermined limit value.

40. The method of claim 39 wherein said step of comparing compares the value of the data variable contained in each task data value message with predetermined maximum and minimum values to generate said error signal when the value of the data variable contained in the message is outside said predetermined maximum and minimum values.

41. The method of claim 33 wherein said messages include redundant data value messages containing values for data variables redundantly computed by more than two computers, said step of checking includes the steps of:
comparing the values contained in said redundant data value messages with the values received from other computers for the same data variable to find a voted data value when the values contained in a predetermined number redundant data value messages agree; and
comparing the voted data value with the value received in each redundant data value message containing a value for the same data variable, to generate said error signal identifying each computer which sent a message containing a value for the same redundantly computed data variable which disagrees with the voted data value.

42. The method of claim 33 wherein said step of checking includes the steps of:
monitoring the time required by each computer to execute the tasks identified in sequentially received task completed/started messages from the same computer; and
comparing the monitored execution time with at least one predetermined time to generate said error signal when the execution time exceeds said predetermine time.

43. The method of claim 42 wherein said messages include sampling number messages containing a sampling number identifying the current sampling period of the computer which sent the message, said method further includes the step of:
sequentially generating sampling periods having a predetermined time duration;
storing a current sampling number identifying the current sampling period;
comparing the sampling numbers contained in the sampling number messages received from all the computers to find a voted sampling number having a value which is the same as the value of the sampling numbers contained in a predetermined number of sampling number messages received from other computers;
recording said voted sampling number as said current sampling number;
comparing the time remaining in the current sampling period, when said voted sampling number is found, with predetermined maximum and minimum values to determine if the sampling period is synchronized with like sampling periods in the computers which sent the sampling number messages from which the voted sampling number was found;
correcting the remaining time in the sampling period when the current remaining time is outside said maximum and minimum values to synchronize the sampling period with like sampling periods in the other computers;
recording in said status table as ready predetermined tasks which must be executed in approximate synchronization with the other computers in the system in response to finding said voted sampling number;
comparing the voted sampling number with the sampling numbers contained in the sampling number message received from the other computers to generate said error signals identifying each computer which sent a sampling number message containing a sampling number which disagrees with the voted sampling number;
recording in the fault status table as faulty in response to said error signals each computer which sent a sampling number message containing a sampling number which disagreed with the voted sampling number;
sending error messages to all of the computers in response to said error signals identifying each computer which sent a sampling number message which disagreed with the voted sampling number;
incrementing by one the stored current sampling number and starting the sampling period at the end of each sampling period;

sending sampling number messages containing the current sampling number incremented by one to all of the other computers at the end of each sampling period in which a voted sampling number is obtained;

generating a restart signal at the end of each sampling period in which no voted sampling number is obtained; and initializing the current sampling number to a predetermined number, in response to said restart message.

44. The method of claims 33 or 43 wherein said step of recording faulty computers in the fault status table further includes the step of storing for each computer recorded as faulty an elapsed time indicative of the time since the computer was last detected to be faulty; and recording in the fault status table as no longer faulty each computer previously recorded as faulty whose elapsed time exceeds a predetermined time.

45. The method of claim 33 wherein said step of checking includes the step of checking the sequence in which the tasks are selected, started, and completed by each computer as identified in sequentially received task selected and task completed/started messages to generate said error signal identifying each computer whose scheduling sequence does not follow a correct sequence.

46. The method of claim 43 wherein the data variables required for the execution of any task may be generated at different times, and several values for the same data variable may be generated before the task is executed requiring an earlier generated value for that data variable, and wherein said step of sending task data value messages further includes sending a task data value message containing the value of the data variable and a sequence number indicative of the sequential order in which the value of the data variable was generated, and wherein said status table includes a plurality of entries for each task and each entry for the same task further storing a different execution number for that task, said step of recording in said status table includes the steps of:

identifying each task which requires the value of the data variables contained in each message;

computing an execution number for each identified task from the sequence number contained in the message;

searching the status table to find an entry for the identified task having the same execution number as the computed execution number;

recording in the entry for the identified task having the computed execution number that the value of the data variable contained in the received message has been received when the computed execution number is found;

searching when the computed execution number is not found the entries for the identified task to find the oldest execution number;

recording the computed execution number in the entry having the oldest execution number when the oldest execution number found is older than the computed execution number; and recording that the value of the data variable contained in the message has been received in the entry in which the computed execution number is recorded; and repeating the above steps for each identified task until the reception of the value of the data variable is recorded for every task which requires the value of the data variable contained in the data value message;

and wherein said data values table includes a plurality of entries for each data variable and each entry stores the value of the data variable and the sequence number contained in received data value messages, said step of recording in said data values table includes the steps of;

searching said data values table to find an entry for the data variable identified in the received message having the same sequence number as the sequence number contained in the received message;

recording the value of the data variable contained in the message in the data variable entry having the same sequence number when a data variable entry having the same sequence number is found;

searching when the sequence number contained in the message is not found the entries for the data variable identified in the message to find the oldest sequence number;

recording the sequence number contained in the message in the entry having the oldest sequence number when the sequence number contained in the message is newer than the oldest sequence number; and recording the value of the data variable contained in the message in the entry in which the newer sequence number was recorded;

said step of communicating the values of the data variables to said applications computer comprising the steps of:

identifying from the task identified in said release task signal the data variables required for the execution of that task;

computing from the execution number of the identified task the sequence number of each data variable required for the execution of the identified task;

communicating the value of the data variable from the entry in the data values table having the computed sequence number to said applications computer;

repeating the above steps until the value of each identified data variable is communicated to the applications computer.

47. The method of claim 46 wherein said step of communicating the value of the data variable having the computed sequence number comprises the steps of:

copying the value of the data variable from the entry in the data values table having the computed sequence number into a task input table storing the values of data variables for at least two tasks in response to said release task signal; and releasing to the applications computer the values of the data variables copied into the task input table by the preceeding release task signal in response to said release task signal;

wherein while the values of the data variables required for the execution of the task identified in the release task signal are being copied into the task input table the values of the data variables for the preceeding task simultaneously being released to said applications computer.

48. The method of claim 33 wherein each computer is assigned a priority for the execution of its assigned tasks said step of recording in said status table further includes the steps of:

comparing the task identified as selected in each task selected message with task selected but not started by the computer receiving the message;

comparing the priority of the computer which sent in the task selected message with the priority of the computer which received the message when both computers have selected the same task to identify which computer has the higher priority;

recording in said status table that the selected task is unselected by the receiving computer when the computer which sent the message has a higher priority than the computer receiving the message; and selecting from said status table the highest priority task ready for execution and not selected by any computer, when the computer which sent the message has a higher priority than the computer receiving the message;

and wherein said step of sending a task selected message sends in response to the unselection of a task and the selection of a new task a task unselected/selected message further identifying both the task unselected and the new task selected by that computer.

49. The method of claim 47 wherein said step of copying the values of data variables in to the task input table further includes the step of copying into said task input table, from a private table storing the starting address in the applications computer's program memory where each tasks begins, the starting address for the task identified in said release task signal to generate a task input message containing both the starting address of the identified task and the values of the data variables; and wherein said step of releasing releases said task input message to said applications computer.

50. The method of claim 33 or 49 wherein the system has a normal mode of operation, and at least one degraded mode of operation said method further includes the step of computing from the number of computers recorded as faulty in said fault status table a mode signal indicative of the system current mode of operation;

and wherein said status table comprises a plurality of task status tables, each task status table corresponding to one of said modes of operation, said step of selecting from said status table is further responsive to said mode signal and selects said tasks from the task status table corresponding to the mode of operation identified by said mode signal.

51. The method of claim 50 further including the step of monitoring the execution time of each task executed by its own applications computer to generate an error signal when the execution time for a task is not within a predetermined time limit.

52. The method of claim 51 wherein predetermined data variables are redundantly computed by more than two tasks executed by more than two computers, said step of sending data value messages sends two different types of data value messages, task data messages containing the values of the data variables singularly computed, and redundant data value messages containing the values of the data variables which are redundantly computed.

* * * * *